US010610792B2

(12) United States Patent
Adekunle et al.

(10) Patent No.: US 10,610,792 B2
(45) Date of Patent: Apr. 7, 2020

(54) GAMING ROBOT

(71) Applicant: REACH ROBOTICS LIMITED, Bristol (GB)

(72) Inventors: Silas Adedotun Adekunle, Bristol (GB); Christopher James Beck, Bristol (GB); Arnaud Didey, Bristol (GB); John Lee Rees, Bristol (GB); Jonathan Quinn, Bristol (GB)

(73) Assignee: Reach Robotics Limited, Bristol (GB)

( * ) Notice: Subject to any disclaimer, the term of this patent is extended or adjusted under 35 U.S.C. 154(b) by 0 days.

(21) Appl. No.: 15/917,329

(22) Filed: Mar. 9, 2018

(65) Prior Publication Data
US 2018/0256989 A1    Sep. 13, 2018

Related U.S. Application Data

(63) Continuation of application No. PCT/GB2016/052745, filed on Sep. 6, 2016.
(Continued)

(51) Int. Cl.
*A63F 13/98* (2014.01)
*B62D 57/032* (2006.01)
(Continued)

(52) U.S. Cl.
CPC .......... *A63F 13/98* (2014.09); *A63F 13/2145* (2014.09); *A63F 13/235* (2014.09);
(Continued)

(58) Field of Classification Search
None
See application file for complete search history.

(56) References Cited

U.S. PATENT DOCUMENTS 4,603,853 A * 8/1986 Satterthwaite ........... A63B 9/00
                                                      482/35
2003/0232649 A1* 12/2003 Gizis ...................... A63F 13/12
                                                      463/40
(Continued)

FOREIGN PATENT DOCUMENTS

WO    2011011084 A1    1/2011

OTHER PUBLICATIONS

Eric Schweikardt et al. "Learning about Complexity with Modular Robots", Digital Games and Intelligent Toys Based Education, 2008 Second IEEE International Conference, Piscataway, NJ, Nov. 17, 2008, pp. 116-123.
(Continued)

*Primary Examiner* — Ronald Laneau
(74) *Attorney, Agent, or Firm* — EIP US LLP

(57) ABSTRACT

Examples of a gaming robot are described. The gaming robot may be controlled by a computing device such as a smartphone or tablet. The gaming robot may be used in solo or group gaming activities. In one case a gaming robot has one or more primary modules. These include a main module with a main processing module to control at least one locomotion module of the gaming robot in response to commands received from the computing device. Secondary modules may be attached to the primary modules via mechanical couplings and electrical interfaces. The main processing module is configured to obtain data identifying the secondary module from the secondary module via the electrical interface, and transmit the data to the computing device. The computing device alters the commands sent to the main processing module based on the data obtained from the secondary module such that control of at least one locomotion module is modified based on connection of the secondary module.

20 Claims, 26 Drawing Sheets

Related U.S. Application Data

(60) Provisional application No. 62/216,282, filed on Sep. 9, 2015, provisional application No. 62/216,284, filed on Sep. 9, 2015, provisional application No. 62/216,289, filed on Sep. 9, 2015.

(51) Int. Cl.
| | | |
|---|---|---|
| *A63F 13/803* | (2014.01) | |
| *A63F 13/65* | (2014.01) | |
| *A63F 13/35* | (2014.01) | |
| *A63F 13/2145* | (2014.01) | |
| *A63F 13/235* | (2014.01) | |
| *A63H 30/04* | (2006.01) | |
| *A63H 33/04* | (2006.01) | |
| *A63F 13/85* | (2014.01) | |
| *A63H 11/00* | (2006.01) | |
| *A63H 11/18* | (2006.01) | |

(52) U.S. Cl.
CPC .............. *A63F 13/35* (2014.09); *A63F 13/65* (2014.09); *A63F 13/803* (2014.09); *A63F 13/85* (2014.09); *A63H 11/00* (2013.01); *A63H 11/18* (2013.01); *A63H 30/04* (2013.01); *A63H 33/04* (2013.01); *A63H 33/042* (2013.01); *B62D 57/032* (2013.01); *Y10S 901/01* (2013.01); *Y10S 901/02* (2013.01); *Y10S 901/28* (2013.01)

(56) References Cited

U.S. PATENT DOCUMENTS

2013/0109267 A1     1/2013   Schweikardt et al.
2018/0370025 A1*   12/2018   Didey ................. B25J 9/08

OTHER PUBLICATIONS

International Search Report dated Dec. 21, 2016 issued on related PCT Application No. PCT/GB2016/052745, filed Sep. 6, 2016.

* cited by examiner

GAMING ROBOT

CROSS-REFERENCE TO RELATED APPLICATIONS

This application is a continuation of International Application No. PCT/GB2016/052745, filed Sep. 6, 2016, which claims the benefit of U.S. Provisional Application No. 62/216,282, filed Sep. 9, 2015, U.S. Provisional Application No. 62/216,284, filed Sep. 9, 2015, and U.S. Provisional Application No. 62/216,289, filed Sep. 9, 2015. Each of the above-referenced patent applications is incorporated by reference in its entirety.

BACKGROUND OF THE INVENTION

Field of the Invention

The present invention relates to a gaming robot. In particular, but not exclusively, the present invention relates to methods and systems for controlling the gaming robot. The gaming robot may be controlled by a computing device such as a smartphone or tablet. The gaming robot may be used in solo or group gaming activities.

Description of the Related Technology

Computer or video gaming systems have traditionally revolved around a virtual world that is generated by a gaming device and displayed on a computer monitor or television screen. The gaming device may be a gaming console, personal computer, or, more recently, a smartphone or tablet device. Gaming consoles are typically controlled using a game controller in the form of a gamepad or joystick; personal computers may be controller with a joystick or keyboard; and smartphones or tablets may use a touchscreen interface. Over time, virtual worlds and characters created by gaming systems have become more and more detailed and elaborate, moving from the simple two-dimensional graphics of early gaming computers to huge three-dimensional worlds with lifelike entities, realistic physics and lighting engines.

Although gaming systems have become more advanced over time, there is often a lack of intimacy or connection with the virtual world of the game, and the characters within said game. Despite the rise of online gaming and the ability to communicate with other users around the world while playing computer games, a user still often interacts with the game using a game controller and screen configuration that has remained constant for over thirty years.

There have been limited attempts to increase the intimacy or connection with the virtual characters or world of the game. U.S. Pat. No. 5,766,077 describes a "highly entertaining game apparatus" wherein three-dimensional toy bodies and a game machine are combined. The toy bodies correspond to fighting characters displayed on a monitor placed nearby and thereby make it easier for players to empathize with the fighting characters and make the game more interesting. Characters corresponding to the toy bodies are displayed on a monitor using a game main unit. A robot toy is connected to the game main unit via a cabled interface. A controller is provided for controlling movements of the character displayed on the monitor. The toy bodies or "robot toys" have a principal robot part (body part) and a plurality of robot parts (arm parts or a leg part), the latter being removably attached to the principal robot part. The principal robot part has non-volatile memory in which self-related data is stored and each of the robot parts has an identification part for identifying itself. The game main unit has reading-out means (reading-out part) for reading out data from the non-volatile memory of the principal robot part and specifying means (reading-out part) for decoding the identification part of each of the toy body parts and individually specifying the toy body parts. It also has controlling means (control part) for controlling movements of the character according to the data read out by the data reading-out means and the details specified by the specifying means and manipulation of the controller.

WO 2016/075081 A1 describes a system and method for automatic computer aided optical recognition of toys, for example, construction toy elements. Toys built from construction toy elements may be recognised from digital images and used to generate a virtual representation of the toy within a virtual game world.

However, these attempts at increasing intimacy or connection still result in a gap between the physical world of the game and the virtual world displayed on screen. This feels increasingly distant as virtual worlds and characters become richer and more lifelike.

SUMMARY

According to a first aspect of the present invention, there is provided a gaming robot comprising one or more primary modules. The one or more primary modules include a main module comprising a main processing module to control at least one locomotion module of the gaming robot in response to commands received from a computing device. At least one of the one or more primary modules comprises a secondary module mechanical coupling for connecting a secondary module, and a secondary module electrical interface for accessing data stored within electronic circuitry of the secondary module, said data identifying the secondary module. The main processing module is configured to obtain the data from the secondary module via the electrical interface, and transmit the data to the computing device. The computing device alters the commands sent to the main processing module based on the data obtained from the secondary module such that control of at least one locomotion module is modified based on connection of the secondary module.

Thus certain examples described herein relate to a relatively new type of consumer robot called a gaming robot. These are used in conjunction with video games to merge physical and virtual worlds. This may be achieved with the help of augmented reality. This gaming robot may thus be used to represent a physical presence of a virtual game that is played on the computing device. Hence, the gaming robot combines physical and virtual gaming action. The gaming robot may be controlled in the physical world to complete augmented reality game missions or battles, e.g. certain virtual gaming elements in a virtual world may interact with physical elements of the real world. In these augmented reality worlds, the gaming robot has consistent physical and virtual character attributes. By attaching a secondary module, a user can modify the behaviour of the gaming robot in both physical and virtual worlds, i.e. in a closed loop manner. In this way physical modifications to the robot, e.g. attaching a part that has negligible physical impact on the robot, may result in a virtual modification to the attributes or characteristics of the gaming robot, which manifest in modified physical behaviour, such as modified movement and/or sequences of prime mover activations.

In one case, the computing device may comprise a communicatively coupled mobile device, such as a smartphone or tablet coupled by a wireless connection. In other cases, the computing device may comprise a remote (data) server, whereby the gaming robot couples to the remote server, either directly or via a limited game controller. For example, in this case, the main processing module may comprise a WiFi interface to enable it to connect to the Internet and the remote server. In a third case, the computing device may comprise both a communicatively coupled mobile device and a remote server, e.g. the gaming robot may connect to the mobile device and then to the remote server through a connection of the mobile device. In this case, certain processing tasks may be distributed between the mobile device and the remote server.

In use, the gaming robot may comprise a number of primary and secondary modules. Primary modules may comprise at least one of: the aforementioned main module, one or more locomotion modules, a body module and a battery module. Each of the primary modules may be couple-able to another primary module and/or one or more secondary modules. In one example, the gaming robot may have secondary modules comprising removable shields that attach to the legs of the robot and/or weapons that attach to a body of the robot. A shield that is deemed "heavy" or "light" may be identified using the data stored within electronic circuitry of the shield, e.g. an unique identifier or string sequence stored within a microcontroller memory; however, both "heavy" and "light" shields may have a comparable physical mass (or masses that have a small physical effect on the motion of the leg module). The computing device receives the data from the shield and determines whether it is "heavy" or "light". In one case the data comprises an identifier indicating a type of secondary module. The computing device then modifies or alters the commands sent to the main processing module of the gaming robot, e.g. as compared to a base case where no shields are attached, such that the leg motion slows or is otherwise modulated in proportion to a virtual mass of the shield. For example, a "heavy" shield may double the virtual mass of the gaming robot and the robot may thus be sent commands that move it with half the acceleration of the base case where the gaming robot has no attached shields.

In one case, the one or more primary modules comprise at least one locomotion module to provide robot motion, wherein the at least one locomotion module comprises the secondary module mechanical coupling and the secondary module electrical interface. For example, the locomotion module may be a leg module comprising at least a hip and a thigh, and the secondary module may be a removable shield component that electrically and mechanically attaches to the leg module.

In one case, a first secondary module is connectable to the secondary module mechanical coupling and commands received from the computing device control the at least one locomotion module to move at a first speed based on data identifying the first secondary module transmitted by the main processing module. For example, this first secondary module may have a first virtual mass (be a "heavy" shield or weapon) and thus if a force is assumed to be constant, an acceleration will be reduced. The computing device in this case is configured to evaluate equations of motion for the gaming robot, e.g. to move the robot forward or backwards, and use the result to compute the commands for the gaming robot, e.g. move to relative x, y or x, y, z positions (e.g. [+5, +10] or [+5, +10, +20]) in time t (e.g. 10 s). These commands may include a rotation element. The main processing module of the gaming robot is configured, e.g. via firmware of an embedded controller, to receive these commands and compute a series of prime mover rotations (e.g. pulse-width modulation signals) to achieve this motion.

In this case, a second secondary module may also be connectable to the secondary module mechanical coupling. The second secondary module may be connectable in place of the first secondary module, e.g. the first secondary module may be removed and replaced with the second secondary module. Commands received from the computing device control the at least one locomotion module to move at a second speed based on data identifying the second secondary module transmitted by the main processing module. For example, the second secondary module may have a second virtual mass (be a "light" shield or weapon) and thus if a force is assumed to be the same as when the first secondary module is attached (e.g. the gaming robot is deemed to have the same underlying joint movement power), an acceleration will be reduced by a lesser extent. When the computing device evaluates equations of motion for the gaming robot to compute the commands for the gaming robot then the time may be reduced to get to the same position (as the acceleration will be greater). This may result in a high-level command such as, e.g. move to relative x, y, z position (e.g. [+5, +10, +20]) in time t (e.g. 7.5 s). Again, the main processing module of the gaming robot is configured to receive these commands and compute a series of prime mover rotations (e.g. pulse-width modulation signals) to achieve this motion (e.g. via faster rotations).

As discussed above the primary modules may comprise locomotion modules which in turn may comprise a plurality of leg modules. In this case the gaming robot may be a "legged" gaming robot, e.g. with four legs. Each leg module may comprise a plurality of prime movers to rotate portions of the leg module about a respective plurality of axes. In one case, the leg module comprises a "thigh" section with two prime movers ("knee" and "angle" joints) and a "hip" section with one prime mover (for the "hip" joint). In these cases, by having a plurality of independently-controllable leg modules, each having a plurality of independently-controllable prime movers, a large number of complex robot motions may be enacted. In this manner, the gaming robot may enact in the physical world, complex animations or character motions of a virtual gaming world or environment. In this way, lifelike movements (e.g. fluid motions mimicking those performed by animals such as spiders, crabs, lizards or mammals) may be seen both in the physical and virtual worlds, bridging the gap between those two worlds and providing an immersive experience for a user.

In one case, the main processing module is configured to receive high-level commands from the computing device and the main processing module is configured to receive kinematic feedback from control circuitry within each leg module. In this case, the main processing module comprises a kinematics engine to generate low-level commands in response to the high-level commands using the received kinematic feedback. For example, as described above, a high-level command may comprise a command to move to a particular relative position (e.g. in comparison to the pose of the gaming robot) or absolute position (e.g. within a defined three-dimensional space modelling the physical environment around the robot). This high-level command may be time-based (e.g. within x seconds), in which case the kinematics engine may compute required prime mover velocities and accelerations; or may be defined in terms of one or more of: scalar speeds, vector velocities, and scalar and/or vector accelerations. For example, a high-level command may comprise activation of a pre-defined sequence of movements within supplied kinematic constraints or a sequence of movements defined in time (e.g. either linear or non-liner motions between defined points in space-time).

This control system has advantages in translating virtual movement into physical movement, while allowing complex and fluid motion. For example, time and position information may be output with minimal modification from a gaming engine running on the computing device. This allows the gaming engine to run at real-time rates on portable computing devices, e.g. smartphones and the like. Comparatively, systems that require the kinematics of the robot prime movers to be computed on the computing device would be difficult to run at real time rates due to the processing overhead and the lack of optimising control libraries for specific robot devices. This division of processing also reduces the information that needs to be sent over a communication link from the computing device to the gaming robot; e.g. a command such as "go to position [x, y, z] at time t" is much smaller than a set of low-level prime mover instructions that are required to implement the movement.

In certain examples, the secondary module electrical interface comprises a power supply interface and a data communication interface. In these cases, the secondary module may comprise one or more active electronic components that are powered via the power supply interface, wherein the main processing module is configured to control said active electronic components. For example, the secondary module may comprise a screen, a motor or one or more light-emitting-diodes (LEDs). In certain cases, the data identifying the secondary module comprises a unique identifier; and an indication of active electronic features forming part of the secondary module. The data identifying these active electronic components may enable the main processing module to detect and control the components based on stored instruction sets. For example, the main processing module may flash one or more coloured LEDs while performing a movement instructed by the computing device. In certain cases, the mechanical coupling and electrical interfaces may be implemented by a common structural component, for example magnetic clasps and/or pin/socket electrical connectors.

According to a second aspect of the present invention, a gaming robot system is provided that comprises the gaming robot of any one of the examples described herein and a computing device implementing a gaming robot software application. In this case, the gaming robot software application may receive the data identifying the secondary module and compute the commands that are sent to the main processing module of the gaming robot. For example, the computing device may be configured to update attributes of the gaming robot in a game environment within the gaming robot software application based on the data transmitted from the main processing module of the gaming robot.

In one example, the computing device comprises a connective device. The connective device may be a portable computer, such as a smartphone or tablet. In another case, the connective device may be a laptop or desktop computer. In yet another case, the connective device may be a dedicated game controller. In these cases, the connective device may comprise a processor to implement the gaming robot software application; a wireless interface for communicating with the main processing module of the gaming robot; a display screen to display a user interface of the gaming robot software application; and a game controller to submit user commands to the gaming robot software application. A user (i.e. a game player) may use the game controller to control the gaming robot in both the real and virtual worlds. The gaming robot software application may generate commands to move the gaming robot in response to user commands received via the game controller. For example, by pressing forward on a control pad of the game controller, a representation of the gaming robot may advance forward in a virtual world, e.g. a model of the gaming robot may be advanced in a non-visualised dimensional space, and commands may be sent to the gaming robot to advance a proportional amount in the real world. In certain cases, the game controller may be implemented using a touchscreen of the connective device, e.g. a virtual joystick or control pad may be provided on the user interface shown on the display screen.

In certain cases, the gaming robot software application comprises a smart module system to collect a status of any secondary modules connected to the gaming robot based on data received from the main processing module of the gaming robot via the wireless interface and a battle system to receive data from the smart module system and compute an outcome of a simulated battle involving at least the gaming robot based on the data from the smart module system. For example, a shield module, as well as modulating the attributes of the gaming robot (e.g. mass, speed or acceleration), may provide an increased number of defence points in the game environment. Similarly, a weapon module, as well as modulating the attributes of the gaming robot (e.g. mass, speed or acceleration), may enable a particular attack move in the game environment. In one case, the attack move may have a corresponding set of physical movements that are activated by the main processing module following high-level commands from the gaming robot software application. The simulated battle may be between: two or more gaming robots physically co-located (e.g. in the same room or geographical area); two or more gaming robots that are physically remote (e.g. different rooms or geographical areas); and/or one or more gaming robots (e.g. co-located or remotely located) and one or more virtual entities in the game environment (e.g. virtual representations of gaming robots). This enables flexible gameplay between geographically remote users, e.g. users do not need to be physically co-located to experience physical and virtual gameplay. For co-located gaming robots, "battles" may be simulated in a common physical space with co-ordinated sequences of physical movements, these sequences being produced as multiple, communicatively-coupled connective devices synchronise a shared game environment and individually send commands to respect gaming robots. This enables the synchronised control of multiple gaming robots to represent the battle taking place within the virtual world. Further, real world objects may be integrated into the game environment based on sensor measurements received from the gaming robots (e.g. infra-red (IR) or ultrasonic distance sensors), e.g. an object may occlude a line of sight for a weapon preventing damage to another gaming robot within range.

In one example, the gaming system further comprises a data server communicatively coupled to the computing device via an active internet connection, the data server comprising a robot database to store data relating to the gaming robot. In this case the data server receives the data identifying the secondary module from the computing device, verifies said data and stores said data in the robot database. For example, the data identifying the secondary module may comprise an n-bit globally unique identifier, e.g. a number, string or bit sequence, which is loaded into a microcontroller memory during production. In this case, the data server may store a list of identifiers and compare data received from the computing device with this list. If an identifier obtained (e.g. read) from the secondary module, via the main processing module and computing device, matches an entry in the list then the secondary module may be verified. In one case, the data server may communicate with the computing device to indicate that the secondary module may be activated. Activation may comprise enabling modification of gaming robot attributes, e.g. mass and abilities. The computing device may send a command to the main processing module to activate the functionality of active electronic components of the secondary module, e.g. flag that LEDs or the like are active and may be sent control values.

In one example, the main processing module is configured to transmit gaming robot status data to the computing device, and the computing device is configured to transmit said data to the data server for storage in a robot profile in the robot database. The gaming robot status data comprises at least one of: distance travelled by the gaming robot; calibration data for the gaming robot; faults experienced by the gaming robot; and secondary modules connected to gaming robot. This status data may be used to update robot attributes as used by the gaming robot software application.

In certain cases, the gaming robot software application comprises a virtual items system to determine a status of one or more virtual items, wherein the computing device alters the commands sent to the main processing module based on the data obtained from the secondary module and based on any current virtual items. For example, a shield may be attached to the gaming robot to modify physical movement, plus physical movement may be further modified by activation of a virtual "speed booster".

In certain examples, the main processing module comprises a memory and is configured to receive a movement program, the movement program comprising a sequence of prime mover actions and being associated with the disconnectable secondary module. For example, the movement program may comprise physical actions that replicate an animation or movement within the game environment, e.g. a "jumping" motion wherein a body module is repeatedly raised and lowered via leg module movements or a "firing" motion wherein a backward, staggering motion replicates a weapon recoil action. In this example, the main processing module is configured to store said movement program in the memory and selectively load and implement the movement program in response to at least one command from the computing device if the disconnectable secondary module is connected. Movement programs may be loaded into memory during production and/or via over-the-air updates, e.g. as received from a coupled computing device. In one case, one or more movement programs may be transmitted to the gaming robot in response to verification of the secondary module by the aforementioned data server. The movement programs may be stored as data within the gaming robot software application or may be downloaded from the data server.

In one example, the main module comprises a set of leg mechanical couplings and leg electrical interfaces for connecting the plurality of leg modules to the main module, wherein each leg module comprises a microcontroller comprising a memory to store data identifying the leg module; a main module mechanical coupling for connecting the leg module to one of the leg mechanical couplings of the main module; and a main module electrical interface for electrically coupling the leg module to one of the leg electrical interfaces of the main module; wherein the microcontroller is in electrical communication with the main processing module via the main module electrical interface. The main module mechanical coupling and electrical interface may form part of a "hip" coupling to a body module of the gaming robot, wherein each leg module comprises integrated hip and thigh components. In this case, the microcontroller may control prime mover actions for prime movers located within the leg module, e.g. "hip" rotation about a vertical axis, "thigh" rotation about a horizontal axis and "knee" rotation about another horizontal axis. In this case, the main module electrical interface of each leg module comprises at least one power line and at least one data line that are electrically coupled to a respective secondary module electrical interface of each leg module. In this manner, the main processing module may have an electrical connection via the data line to a microcontroller of a secondary module, enabling the main processing module to read or otherwise obtain data from said microcontroller. In another case, the main processing module may communicate with the microcontroller of the leg module, which may in turn read or otherwise obtain data from the microcontroller of the secondary module. In one case, each leg electrical interface comprises a data line to indicate that a leg module is connected. The main processing module may be configured to indicate a desired position and speed of a prime mover to a given leg microcontroller. Each leg module microcontroller in turn may transmit data to the main processing module over the main module electrical interface. This data may comprise a unique identifier for the leg module; joint status data; and secondary module data including data identifying any connected secondary modules, wherein the main processing module is configured to transmit joint movement data to a given leg module microcontroller, said joint movement data comprising position and speed instructions. In this way, leg module may be removed and replaced with different modules, e.g. legs with wheel or flying modules, yet retaining a common control structure.

With the gaming robot described above, the computing device may be configured to transmit a high-level command to the main processing module via the wireless interface, the high-level command indicating at least a desired spatial position for the gaming robot. In certain cases, a time to make the movement or explicit speed or acceleration data may also be provided. In one case, the high-level command is provided as a values in a homogeneous transformation matrix. In this case, the main processing module may be configured to convert said high-level command to a low-level command indicating at least a desired joint position for at least one locomotion module. In certain cases, a speed or time of movement may also be provided as part of the low-level command. Also the gaming robot software application may be configured to receive a user command from the game controller, the user command indicating at least a desired direction of movement for the gaming robot; and compute the high-level command for the gaming robot using a kinematic function, the kinematic function taking as input attributes of the gaming robot retrieved using the data obtained from the secondary module.

According to a third aspect of the present invention there is provided a method of controlling a gaming robot comprising: receiving, at a computing device from the gaming robot, data identifying a disconnectable module of the gaming robot, the disconnectable module being mechanically and electrically coupled to the gaming robot, the data being obtained from an electronic component of the disconnectable module; updating, at the computing device, attributes of the gaming robot in a game environment implemented by the computing device based on the data received from the gaming robot; receiving, at the computing device, a user command entered using a game controller of the computing device; computing, at the computing device, commands for the gaming robot as a function of the attributes of the gaming robot and the user command; and transmitting, from the computing device to the gaming robot, said commands, wherein said commands are useable to control movement of the gaming robot in response to the user command.

Thus this method enables the physical configuration of a modular gaming robot to be detected and used to selectively modulate the actions and movements of the gaming robots as the robot is controlled using the game controller. For example, a gaming robot may move in a manner that is dependent on the secondary modules that are attached, e.g. angles of the joints may be controlled such that a body module rides lower when certain weapons or "screens" are attached and the robot is moved forwards, backwards or to the side, or one secondary module may be associated with a "hopping" forward motion, whereas another secondary module may only enable side-ways crab-like movements. Secondary modules may also modify the speed and/or acceleration of the gaming robot when moving within its physical environment.

In certain examples, the method comprises: receiving, at a main processing module of the gaming robot, the commands from the computing device; converting, at the main processing module, the commands into kinematic commands for one or more prime movers using a kinematics engine; and controlling, at the gaming robot, said one or more prime movers using the kinematic commands to effect a movement of the gaming robot in response to the user command, wherein the movement is dependent on the mechanical and electrical coupling of disconnectable module. Kinematic commands may comprise one or more pulse-width modulation signals for one or more respective electric motors, said electric motors implementing respective prime movers of the gaming robot. As discussed above, the commands from the computing device may comprise high-level commands in the form of position and timing information.

In one example, the method comprises: disconnecting the disconnectable module from the robot device; receiving, at the computing device from the gaming robot, an indication of the absence of the disconnectable module; updating, at the computing device, the attributes of the gaming robot based on said indication; wherein said updated attributes are used by the computing device to generate an altered set of comments to control movement of the gaming robot in response to the user command. In a similar case, the disconnectable module may comprise a first disconnectable module, wherein the method may comprise: disconnecting the first disconnectable module from the gaming robot; connecting a second disconnectable module to the gaming robot; receiving, at the computing device from the gaming robot, data identifying the second disconnectable module, the data being obtained from an electronic component of the second disconnectable module; updating, at the computing device, the attributes of the gaming robot based on data identifying the second disconnectable module; wherein said updated attributes are used by the computing device to generate an altered set of comments to control movement of the gaming robot in response to the user command.

The attributes, as described above, may comprise a mass of the gaming robot. This may be artificially altered based on a particular secondary module that is attached, e.g. when the secondary module is removed a mass may be reduced. This mass may not equal the actual mass of the robot, e.g. a secondary module may have an actual mass of 20 g but be modelled as having a mass of 200 g. The mass may be used within equations of motion that are computed by the gaming robot software application and that are used to move the gaming robot in a (virtual) game environment, and in turn generate the commands sent to move the gaming robot within a physical space.

In one example, the data identifying the disconnectable module comprises a unique identifier and the method comprises: cross referencing, at the computing device, the unique identifier against a database to verify a legitimacy of the disconnectable module.

According to a fourth aspect of the present invention there is provided a gaming robot system comprising: a gaming robot and a connective device. In this aspect the gaming robot comprises: a plurality of primary modules each comprising a mechanical coupling and an electrical interface, said plurality of primary modules including a plurality of leg modules, each leg module comprising a plurality of prime movers to rotate portions of the leg module about a respective plurality of axes; and a main module comprising a main processing module to control said plurality of leg modules. The gaming robot also comprises at least one disconnectable secondary module comprising: a mechanical coupling engaged, in use, with a mechanical coupling on one of the plurality of primary modules; an electrical interface electrically coupled, in use, with an electrical interface on said one of the plurality of primary modules; and electronic circuitry to store a unique identifier identifying the secondary module. The connective device is communicatively coupled to the gaming robot and comprises: a processor implementing a gaming robot software application, said gaming robot software application being configured to send high-level commands to the main processing module of the gaming robot to control said plurality of leg modules; and a game controller to submit user commands to the gaming robot software application. The main processing module of the gaming robot is configured to: obtain the unique identifier from the disconnectable secondary module via the electrical interface, and transmit the unique identifier to the gaming robot software application implemented on the connective device; wherein the gaming robot software application is configured to: update attributes of the gaming robot in a game environment within the gaming robot software application based on the unique identifier; compute high-level movement commands based on the updated attributes and user commands received from the game controller; and transmit the high-level movement commands to the main processing module of the gaming robot, wherein the main processing module is further configured to compute low-level commands to control the prime movers of the plurality of leg modules based on the received high-level movement commands.

Further features and advantages of the invention will become apparent from the following description of preferred embodiments of the invention, given by way of example only, which is made with reference to the accompanying drawings.

BRIEF DESCRIPTION OF THE DRAWINGS

FIG. 14b shows a locomotion module of the example gaming robot of FIG. 14a;

FIG. 15b shows a locomotion module of the example gaming robot of FIG. 15a;

FIG. 28b is a schematic diagram of an example system architecture of the example gaming robot system of FIG. 28a.

DETAILED DESCRIPTION OF CERTAIN INVENTIVE EMBODIMENTS

Figure 1:
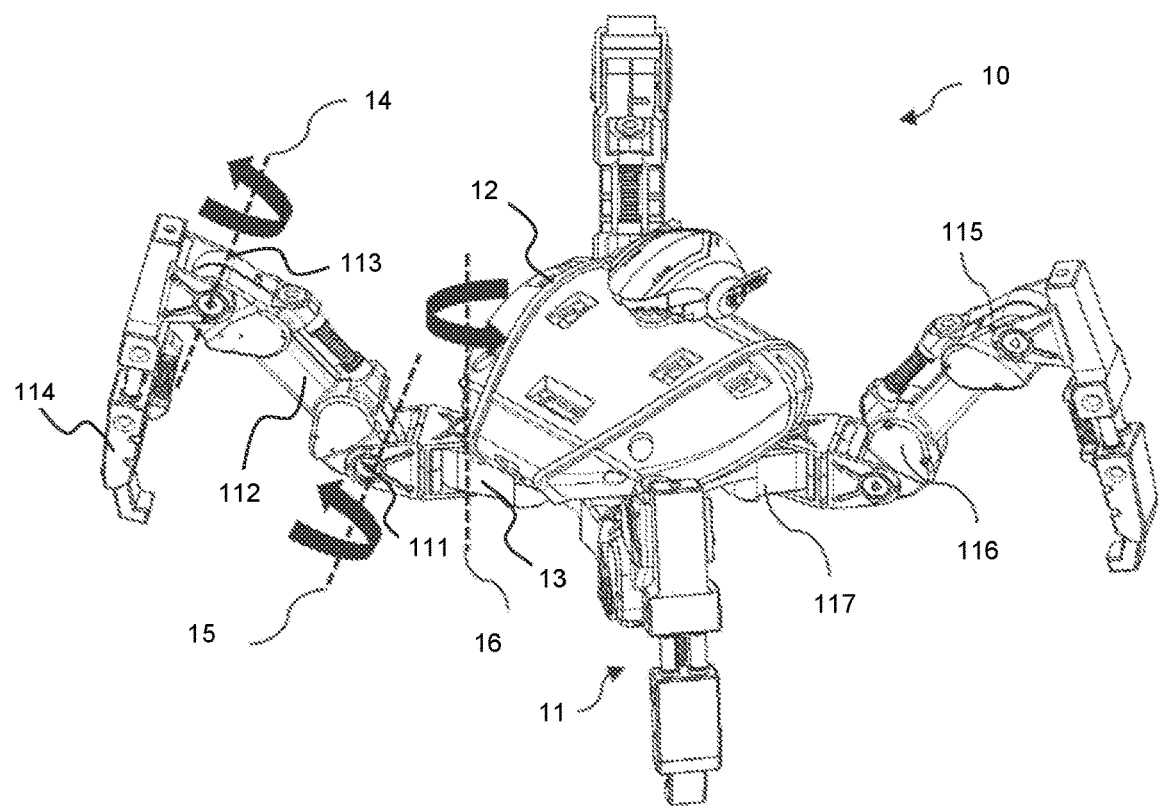
FIG. 1 shows an example gaming robot.

Certain examples described herein relate to modular consumer robots and ways of controlling the same. In certain cases, both the physical appearance and behaviour of a gaming robot may be personalised by attaching a variety of locomotion and/or secondary modules. For example, a user may transform the physical behaviour of a gaming robot by users by adding new modules styled in the form of weapons and shields, or may transform a legged robot into a wheeled robot or a flying robot.

In one described example, a modular robot may comprise a main module and one or more location modules. In certain cases, a body module provides an interface between the main and location modules; in other cases the locomotion modules may be removably coupled to the main module, e.g. may comprise a leg module with integrated thigh and hip portions. The main module may have a battery compartment or attachable battery module.

One advantage of a modular robot as described in certain examples is that both primary and secondary modules are designed to be compatible with each other and interchangeable with limited tooling or technical skills. For example, a mechanical coupling may be a "push-to-fit" or magnetic coupling. This allows users of all ages and technical abilities to enjoy modular robots. For example, without redesign of the gaming robot's control systems, it is possible to transform a walking robot into a flying or a rolling robot, or to change the functionality of a robot with different weapons or shields. This is achieved by means of specific dis-connectable mechanical and electrical interfaces.

Particular examples relate to designs of legged consumer robots with integrated motorised modules designed to actuate the robot joints. In some examples, prime movers are fully integrated within the design of the robot components (such as arms, legs or body). Control of these prime movers may be modified based on attached secondary modules. In this manner, the gaming robot has an advanced functionality as compared to other forms of "toy" or "hobbyist" robot.

Certain examples of gaming robots described herein may be considered "intelligent", wherein details of the physical implementation of such an intelligent gaming robot are described herein. An intelligent gaming robot is operated under the control of a user (who also may be referred to as a player or gamer). The gaming robot is "intelligent" in that it implements semi-autonomous control functions that operate in conjunction (and communicate) with a computing device, also referred to herein as an intelligent connective device, which is used by the user to control the gaming robot. The connective device that may take the form of a modern mobile phone (e.g. smartphone), a tablet computer or a pair of augmented reality goggles. The intelligent connective devices can receive inputs from the user via either a physical or a virtual gamepad (e.g. video game controller) consisting of a multiple of buttons and one or more joysticks. Using the gamepad of the connective device, the user is able to send top-level commands wirelessly to the intelligent robot (e.g. move forward, turn left, fire a weapon, kneel, jump . . . ). Top-level commands from the user are processed by the connective device and sent to the gaming robot, where they are interpreted by a kinematics engine of the gaming robot to produce low-level commands and control the intelligent robot joints. In examples described herein, the connective device generates sets of high-level commands based on the top-level commands from the user, e.g. as input via the game controller, and based on a set of robot attributes. These attributes may model physical attributes of the gaming robot. However, in examples, these attributes are artificially modified based on the presence of secondary modules such that they have values that deviate from the actual measured attributes of the gaming robot. For example, one attribute may comprise a mass of the gaming robot. Without a set of attached secondary modules, this mass may approximate the actual physical mass of the robot device, or at least be proportional to said physical mass. Different secondary modules, as identified for example with a unique identifier or descriptor string, may have approximately equal physical masses (or masses that are within a given range), however, they may be modelled with different attribute values indicating different virtual masses (e.g. where at least one of the masses is outside the given range). For example, they may change a modelled mass of the gaming robot independently of their actual physical mass. As the attributes are used to compute the commands sent to the gaming robot using kinematic equations (i.e. equations of motion), e.g. in the form of high-level positioning and timing information, then these virtual masses influence how the gaming robot moves in the physical environment. In simple terms, a "heavy" shield attached to the gaming robot may result in slow movement and acceleration while a "light" shield may result in faster movement and acceleration (the trade-off being that a "heavy" shield adds more defensive points for a game environment battle engine).

In certain examples described herein a gaming robot is "intelligent" in that at least one of, and in certain cases both, the primary and secondary modules are "smart". These modules are "smart" in that they contain electronic circuitry, e.g. in the form of a printed circuit board (for example comprising a resistor network and/or microcontroller). These smart modules embed electronic circuits that allow for their identification either by active means (such as digital or analogue wired electrical connection) or by passive means (such as wireless radiofrequency transmission). Identification of the various modules may be useful in a number of ways. A first benefit of smart modules is to allow the gaming robot software interface to update the gaming attributes of the robot based on the type of modules connected. A second benefit of smart modules is to verify the legitimacy of the modules in use, protecting against counterfeiting by fitting every module electronic circuit with an encrypted identifier and cross referencing such identifier with a database via the gaming robot software application.

As discussed above, gaming robots as discussed herein may comprise a modular robot that can be personalised by the user with a variety of removeable smart secondary modules (e.g. weapons, boosters, shields, leg module, wheel module). This electronic circuitry at least contains data identifying the secondary module, which may used to detect the presence of attached secondary modules and communicate this information to the connective device so that the attributes of the gaming robot are taken into account during gameplay. Certain secondary modules may also be "smart" in that they contain active electronic components, such as LEDs and/or motors that are controllable by the gaming robot (e.g. either by way of a microcontroller within the secondary module and/or signals from a microcontroller of the gaming robot). In addition to the physical secondary modules that the user may attach to the gaming robot, a number of virtual items (e.g. healing potions, speed booster) may be obtained by the user and used during gameplay. These virtual items may modify attributes of the gaming robot and affect the physical control of the robot in a similar manner, e.g. a "speed booster" may temporarily reduce the modelled mass of the gaming robot. Virtual items may also be used in combination with attached secondary modules, e.g. if "heavy" shields are attached their effect may be temporarily abated using a "speed booster" virtual item.

The use of smart, interchangeable robot modules, e.g. secondary and locomotion modules, enables users of all ability to personalise the appearance, operation and physical movement (for example) of their own robot with various versions of weapon, shield, head, display or locomotion modules. It also enables a non-technical user to service and maintain the gaming robot easily. This is particularly relevant in the case of locomotion modules that are complex mechanical and electrical devices subjected to a high duty cycle and are prone to wear and failure over time. The modularity concept allows to only replace components of the robot that are damaged and in particular the primary modules that are essential to the function of the robot, making repair easier and allowing the user and manufacturer to extend the life of a gaming robot without needing to source a new robot. For a manufacturer of a gaming robot, modularity enables different modules to be developed, manufactured and tested in parallel, before a simple final assembly stage.

In certain examples, the gaming robot is capable of detecting its environment (e.g. other robots, obstacles) and relaying wirelessly this information to the connective device to be incorporated within the gameplay. The detection system of the intelligent robot may, for example, rely on infrared sensors, an on-board video camera and/or sound detection. When more than one gaming robot and user are playing together they may "battle" each other through the gaming robot. A "battle" as discussed herein is simulated and gaming robots do not sustain physical damage, damage is instead virtual and managed within the gaming robot software application. Gaming robots and connective devices may be wirelessly coupled, e.g. in a peer-to-peer ad-hoc mesh network or via a co-ordinating game server coupled to a local or wide-area network, to further enhance the gaming experience. Based upon the configuration of each gaming robot (e.g. attached secondary modules, virtual items available and robot environment) and the inputs and skills of each user, the battle systems within the connective devices used, e.g. implemented as part of the gaming robot software application, compute the outcome of each battle.

In certain examples, the gaming robot may form part of an augmented reality system. In certain cases the gaming robot features a tracking system that allows the connective device to compute the position, orientation, scale and attitude of the robot in the field of view of a connective device camera. When the connective device is equipped with a video camera and an adequate display screen, it may track the robot and augment reality through its display screen by adding for example special effects (e.g. explosions, fire, laser beams), virtual opponents or a virtual environment. In certain cases an augmented reality experience may be improved by translating virtual special effects into the physical realm, e.g. by controlling the physical movement of the gaming robot. For example, a gaming robot software application may be configured to detect an explosion within the game environment and notify the gaming robot accordingly, e.g. through the transmission of a high-level command. This high-level command may be received by the main processing module of the gaming robot and used to initiate a sequence of movements that simulate a nearby explosion. The distance of the robot from the effect may modulate the action performed, e.g. a distance as calculated (for example) by the Euclidean distance between the explosion centre and a gaming robot position may be used to scale the amplitude or power of movements in a sequence. The connective device may send the distance or the relative locations of the action and the robot. The effect is that a close explosion or "direct hit" results in large movements of the robot (e.g. modelled chaotic movements or the effect of a shockwave), whereas a distant explosion or projectile results in smaller movements of the robot. Similarly, the gaming robot may be notified of a weapon firing command (e.g. in the form of a weapon type and timing information), which may be used to activate a sequence of physical movements of the gaming robot that simulate weapon firing. For example, a "large mortar" may have a different set of actions (e.g. a movement to angle the robot followed by a large recoil) to a "flamethrower" (e.g. small vibrations and side-to-side movements). A movement sequence may only be available if an appropriate secondary module is attached and detected (and in certain cases verified), e.g. the "flamethrower" movement sequence may only be available if a flamethrower" secondary module is mechanically and electrically coupled and a unique identifier is verified against a robot database. Similarly, weapon features may only be available in the game environment if the appropriate secondary module is attached. Augmented reality is particularly relevant to improve the single player experience, when the user would play by himself or herself with only one gaming robot.

In certain examples, a "cloud" infrastructure for the intelligent gaming robot and connective device is described. In this case "cloud" is considered to mean one or more remote servers that are communicatively coupled to one or more networks, such as the Internet, that are used to store, manage, and process data in place of local servers or personal computers. Both the intelligent robot and the connective device have the ability to wirelessly communicate with the cloud. The cloud comprises of a database where both user and robot data is stored. This data may for example consist of an inventory of the robots, secondary modules, virtual items, skills and game statistics. User data may also be stored to build a profile of each user based on usage statistics, demographic and robot ownership. This data may be used as inputs to a skills engine designed to manage the allocation/granting of skills to users as they progress through the game. This data would also be used as inputs/metrics to an analytics engine within the cloud which would be analysed to identify patterns to improve/tailor the gaming robot game experience. The cloud also includes functions to obtain new robot, physical and virtual items or spares. The cloud also acts as a portal to external entities enabled to provide additional content, either physical (such as third-party shields and weapons) or virtual (such as new games and virtual items). The cloud also acts as a portal to the community, where users may access each other's user and robot profiles or exchange information using forums or social media.

The examples described herein relate to a gaming robot. A gaming robot is a form of consumer rather than industrial robot, i.e. is designed to be obtained and used by members of the public as opposed to provide useful industrial output. It may be considered a form of toy or entertainment robot, although comprising functionality that is advanced for comparative "toys". A gaming robot may be supplied in a ready-to-use form, e.g. not requiring substantive assembly as is required with certain "hobbyist" robot kits. Use of a gaming robot requires no specialist technical knowledge, e.g. as compared to an industrial robot. A gaming robot is also designed to be handled and operated by a single user, e.g. in use comprise one or more units that may be manually lifted and carried. The range of functionality of the gaming robots described herein is large as compared to alternative "toys", for example, the gaming robots have a wider, more complex range of movements, whereas comparative "toy" robots may have relatively little freedom of movement (e.g. a range of 1-10 movements) and/or relatively little ability to be controlled (e.g. operate within narrow behavioural ranges—such as move forward or back along a track). Comparative "toy" items are also designed to be disposable as a single unit, rather than modular in construction. Certain comparative "toys" may be available as modular construction kits, however these kits typically also have relatively little freedom of movement (e.g. simple motor rotation) and/or relatively little ability to be controlled (e.g. limited to on or off). Certain examples described herein provide a gaming robot with versatility, freedom of movement and serviceability, and which can also be manufactured inexpensively and be aesthetically pleasing.

Example Gaming Robot Design

Figure 2:
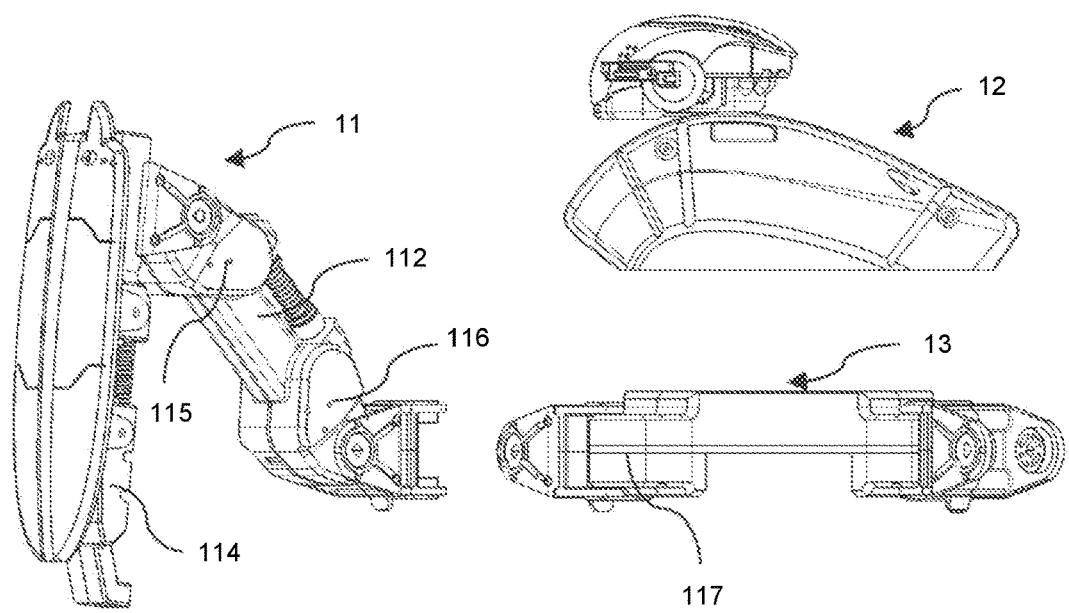
FIG. 2 shows a main module, a leg module and a body module of the example gaming robot of FIG. 1.

FIG. 1 shows an example robot 10 according to a first embodiment. The robot 10 is a legged robot having four identical legs. The robot 10 is modular, and comprises three distinct module types (four leg modules 11, one main module 12 and one body module 13). FIG. 2 shows each type of module 11, 12, 13 (leg, main and body) separately.

Each of modules 11, 12 and 13 may be considered to be a primary module, wherein the leg module is a particular implementation of a locomotion module. A primary module may be considered to comprise core functions of a gaming robot, e.g. in this particular example, a main module, a body module and four leg modules are required for the modular robot to function. The locomotion modules need not be limited to only one type of locomotion and may take several forms including leg module(s) to create a walking modular robot, wheel module(s) to create a rolling modular robot or propeller module(s) to create a flying modular robot.

Each leg module 11 comprises a hip 111, a thigh 112, a knee 113, and a lower leg 114. Each of the legs is actuated by three prime movers 115, 116 and 117, which are each fully integrated within the robot 10. Each of the prime movers 115, 116 and 117 confers to each leg three degrees of freedom, allowing the leg to rotate about three axes of rotation 14, 15 and 16. Two prime movers 115, 116 are integrated into each thigh 112. The remaining prime movers 117 are contained in the body module 13. The number of prime movers 117 comprised in the body module 13 corresponds to the number of legs the robot 10 has. The main module 12 contains the main controller of the robot 10.

Figure 3A:
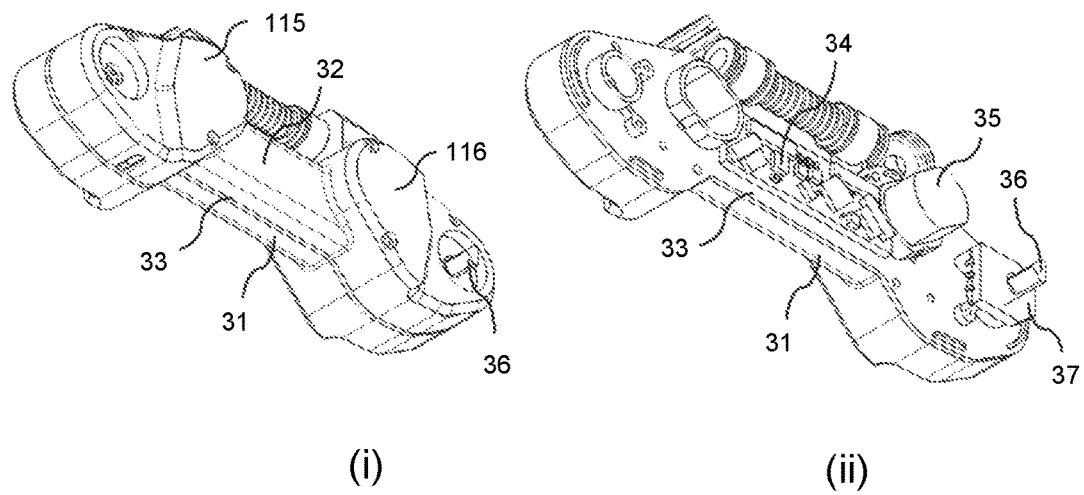
FIGS. 3a-c show an example thigh of the example leg module of FIG. 2.
Figure 3B:
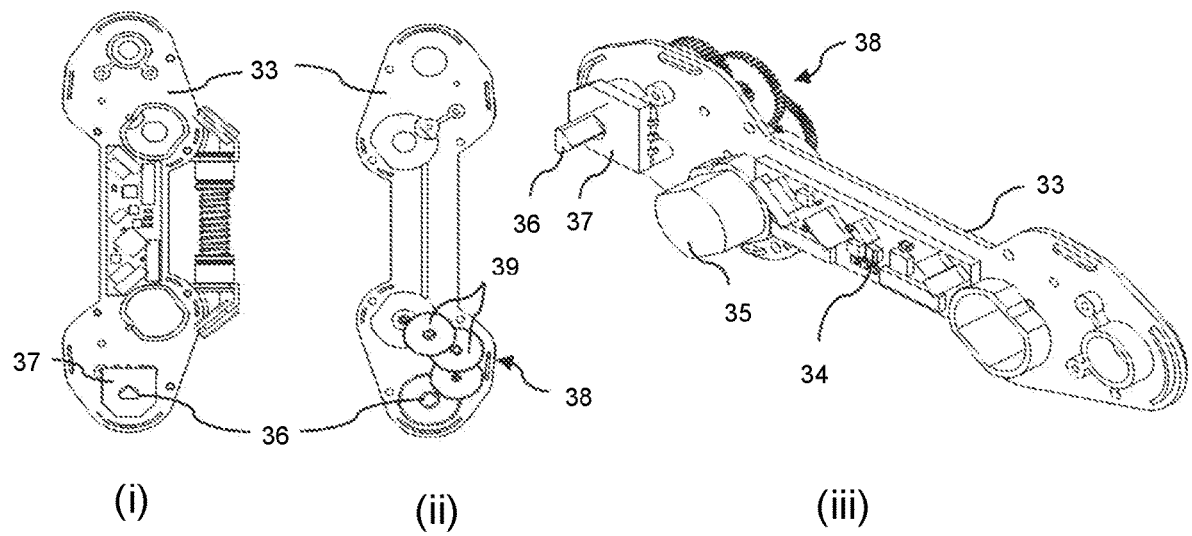
Figure 3C:
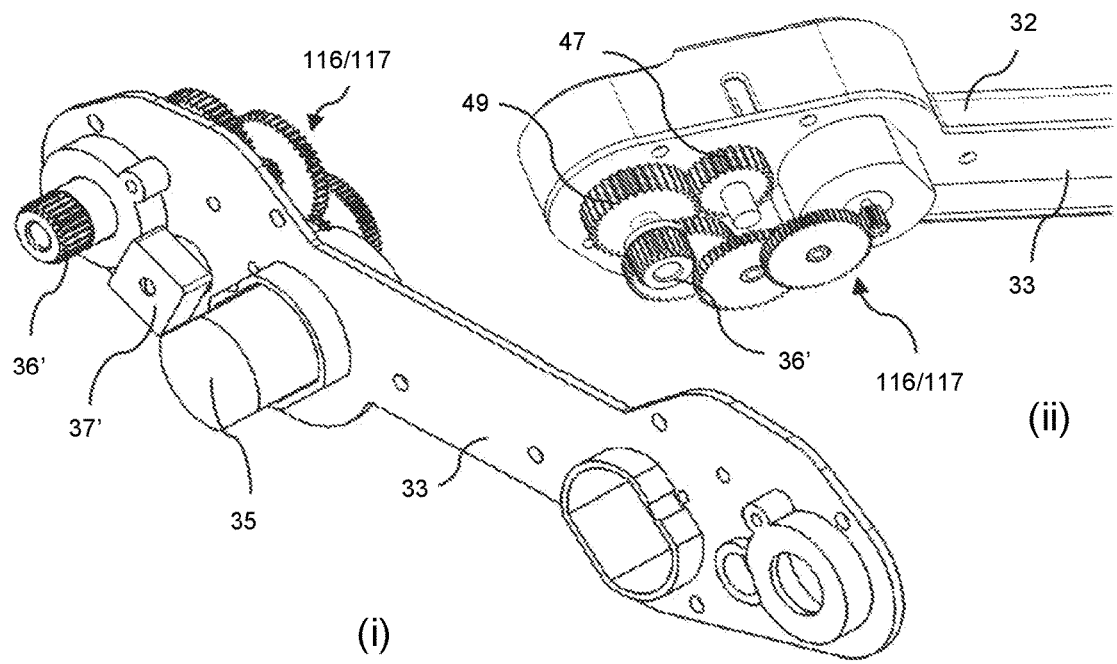

FIGS. 3a-c show the thigh 112 of an example leg module 11, and the two prime movers 115, 116 comprised therein, in more detail. In this embodiment, the thigh 112 is formed of three main structural components—two outer shells 31 and 32 and a thigh carrier plate 33. Part (ii) of FIG. 3a shows the thigh 112 with the shell 32 removed, to show the carrier plate 33 more clearly. For clarity only the components of one prime mover 115 are illustrated (prime mover 116 is intentionally omitted). It can be seen from FIG. 3b that the thigh carrier plate 33 provides a mechanical interface with the components of the prime mover 115. In the particular illustrated example the components of the prime mover 115 comprise a thigh electronics board 34 arranged to drive both prime movers 115 and 116 independently, a motor 35, an output shaft 36, and a position sensor 37. Prime mover 115 also includes a gearbox 38 (visible in FIG. 3b (ii) and (iii)) comprising gears 39 to mechanically gear the output torque of motor 35.

FIG. 3b provides a further detailed view of the prime mover 115 of thigh 112 with both shells 31 and 32 removed. The power train of prime mover 115 comprises the motor 35 and, in this particular example, a four stage parallel axis gearbox 38 with an overall gearing ratio of approximately 320:1. The control of prime mover 115 is governed by the thigh electronic board 34 and the position sensor 37. Mirrored version of the components of the prime mover 115 may be provided at the opposite end of the thigh 112 to form prime mover 116.

FIG. 3c shows an alternative arrangement for the position sensor. The position sensor 37 depicted in FIGS. 3a and 3b is a type of position sensor known as "through-hole" or "shaft-less", which is designed to allow a shaft, in this case the prime movers output shaft 36, to pass through the position sensor 37. This facilitates a dual output shaft design. However; an alternative arrangement (that is, the arrangement shown in FIG. 3c) is also possible in which a position sensor 37' relies on an idler gear 47 that meshes with a gear 49 of an output shaft 36'. In the example depicted, the idler gear 47 has a smaller pitch diameter than gear 49 which helps improve the sensitivity of position sensor 37'. A gearing ratio of 1:1 between gear 49 and idler 47 may however be preferable if the range of motion of the position sensor 37' is limited.

Figure 4A:
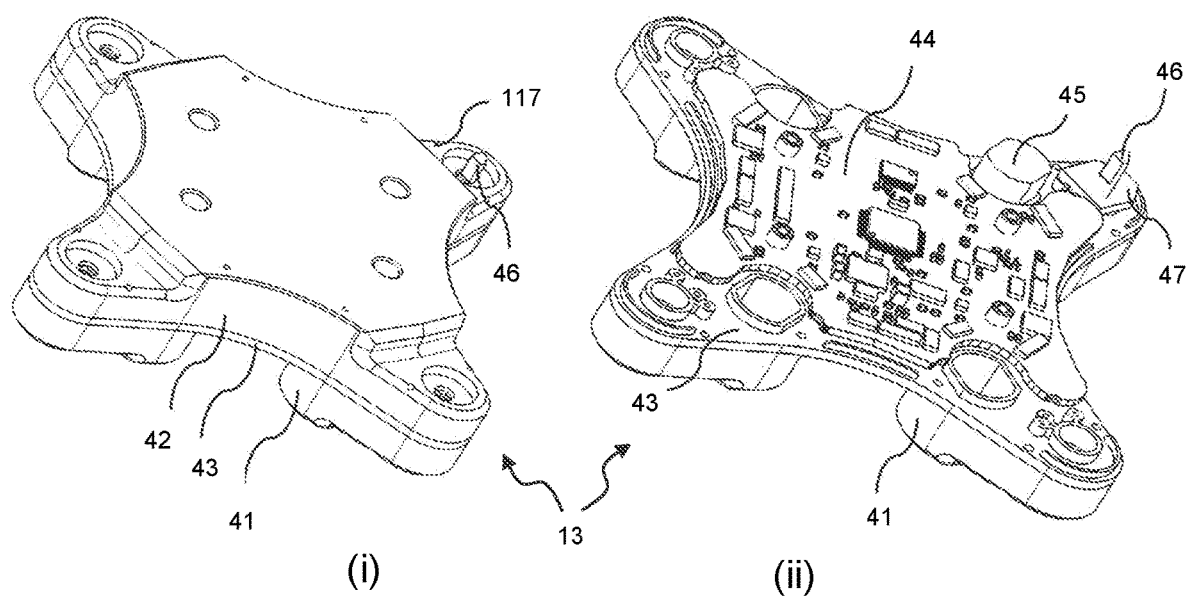
FIGS. 4a-b show the example body module of FIG. 2.

FIGS. 4a (i) and (ii) provide a detailed view of the integrated body module 12 and one of its four prime movers 117. For clarity the other three prime movers housed within the body module 12 are not depicted. The construction of the body module 12 is similar to the construction of the thigh 112, with the exception that the thigh 112 houses two prime movers whereas the body module 12 houses four prime movers. The body module 12 is formed of three main structural components—two outer shells 41 and 42 and a body carrier plate 43. Part (ii) of FIG. 4a depicts the body module 12 with shell 42 removed. For clarity only the components of one prime mover 117 are illustrated (the other three prime movers 117 are intentionally omitted).

The body carrier plate carrier 43 provides a mechanical interface with the components of the prime movers 117. The prime mover components shown in FIG. 4a are a body electronics board 44 that is arranged to drive all four body prime movers 117 independently, a motor 45 of prime mover 42, a body output shaft 46, and a position sensor 47. It should be noted that in this particular embodiment, and to reduce the cost of manufacture, the components of the prime movers 117 are identical to the corresponding components of the prime movers 115 and 116 in the thigh. The prime mover 117 also includes a gearbox (visible in FIG. 4b) to mechanically gear the output torque of the motor 45. The components of the illustrated prime mover 117 may be duplicated to form the remaining three prime movers 117 of the body module.

Figure 4B:
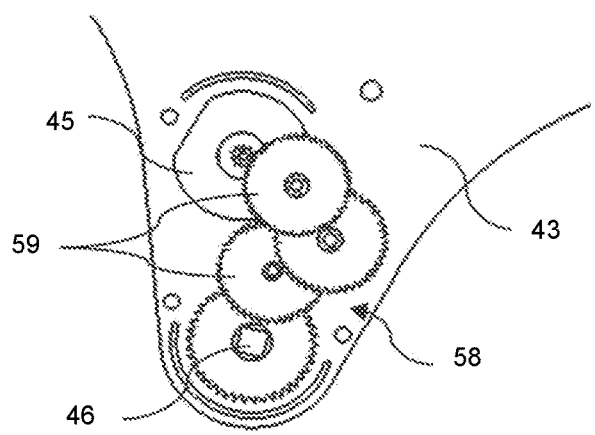

FIG. 4b provides a further detailed view of the gearbox 58 of one of the four prime movers 117 of the body module 12 with both shells 41, 42 removed. The power train of prime mover 117 comprises a motor 45 and in this particular example a four stage gearbox 58 comprising four parallel axis gears 59 with an overall gearing ratio of approximately 320:1 and an output torque of approximately 0.5 Nm.

In certain alternate embodiments, the prime mover 117 may be integrated into the leg module 11, wherein the leg module 11 is coupled to the body carrier plate 43 (e.g. the hip portions of outer shells 41 and 42 are moved to the end of the leg module 11 and removeable couple with the body module 13). In certain embodiments the main module 12 and body module 13 may be integrated into a single main module.

Figure 5:
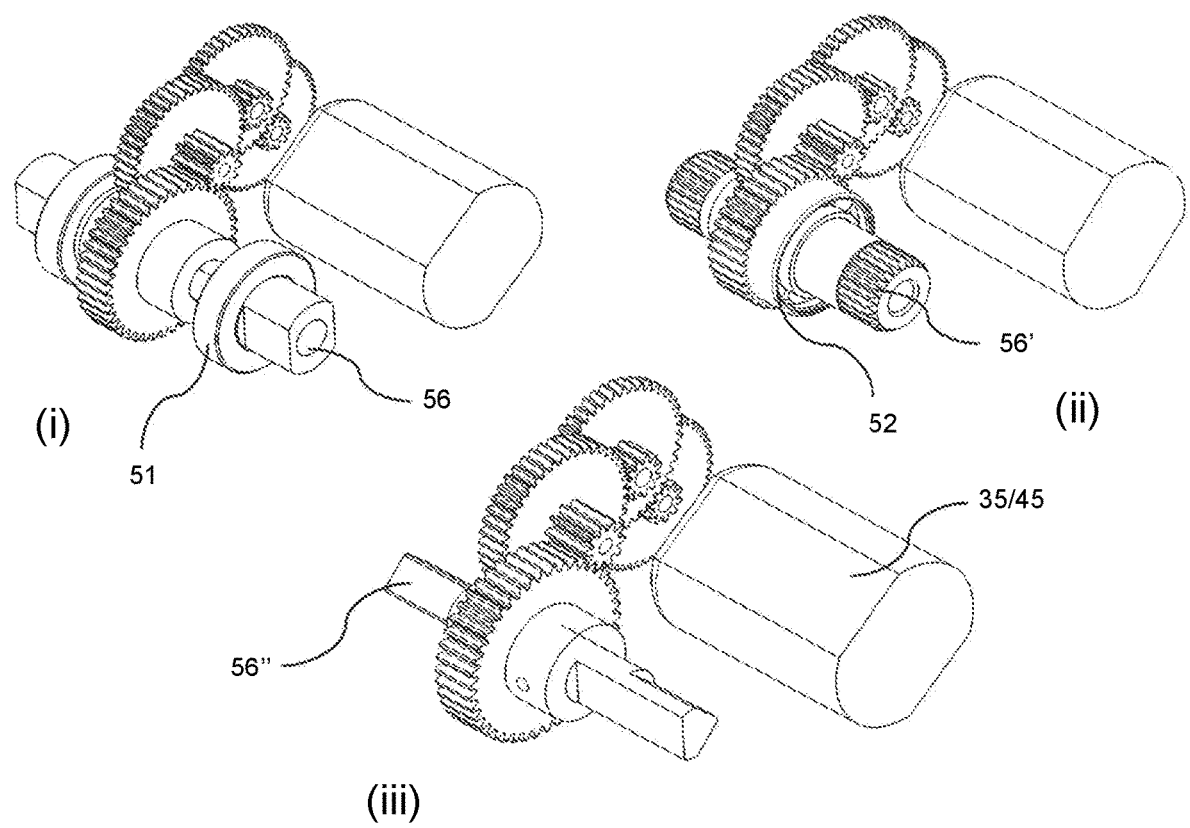
FIG. 5 shows various arrangements for an example prime mover output shaft.

FIG. 5 details various arrangements of the output shaft of the prime movers 115, 116 and 116 found in the thigh 112 and the body module 13. In particular, FIG. 5 shows different possible configurations of a coupling and a bearing for a first example output shaft 56. FIG. 5(i) depicts how one or more bushings 51 are used inside a thigh or body module (not depicted) to support the first example output shaft 56. In this example the output shaft 56 comprises a type of spline known as a parallel key spline. FIG. 5(ii) shows one or more ball-bearings 52 being used inside the thigh 112 or body modules 13 (not depicted) to support a second example output shaft 56'. The second example output shaft 56' comprises a type of spline known as an involute spline. FIG. 5(iii) shows a third example output shaft 56" which comprises a type of spline known as a parallel key spline. The prime movers 115, 116, 117 may comprise output shafts having the features of any of the first, second or third example output shafts 56, 56', 56", or any other suitable output shaft arrangement.

Figure 6:
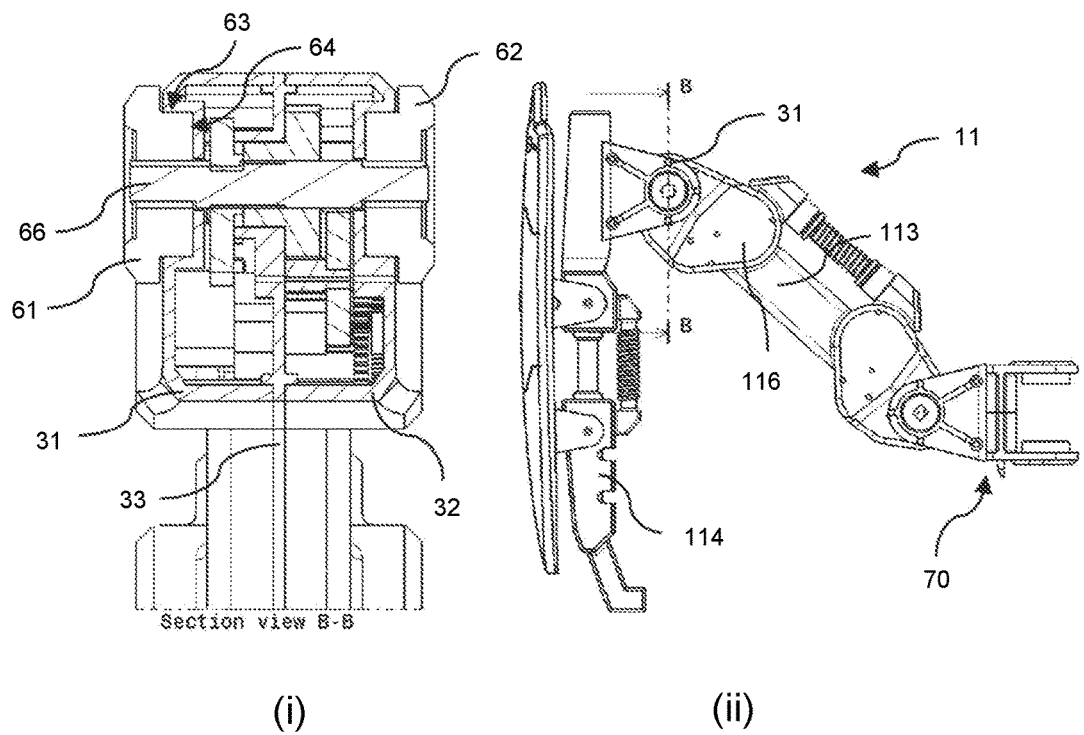
FIG. 6 shows an example leg module.
Figure 10A:
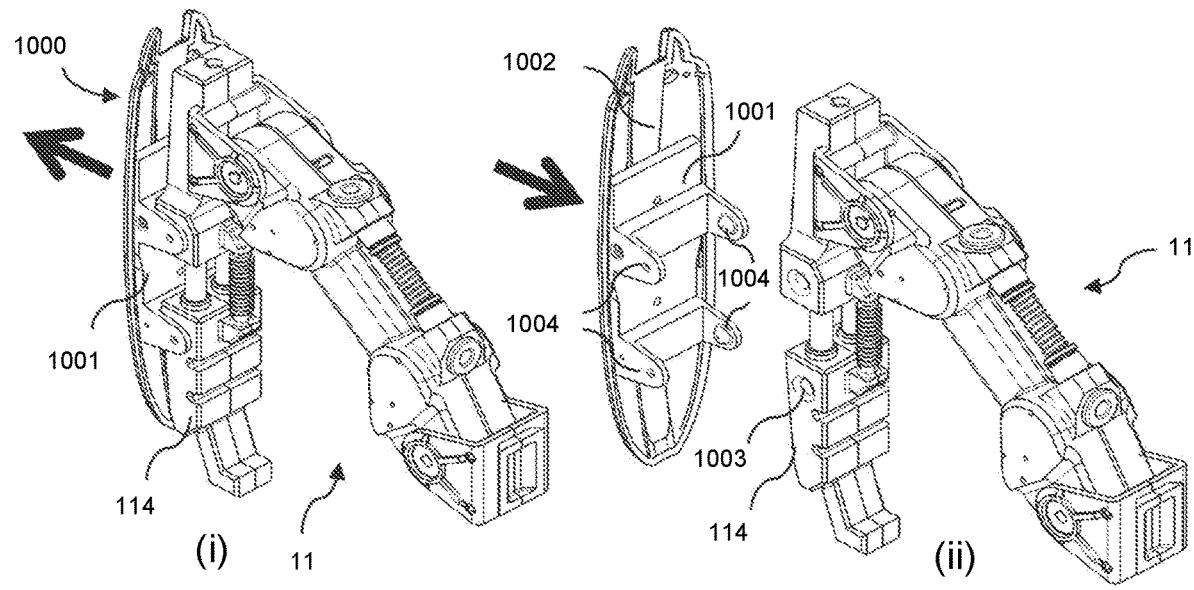
FIGS. 10a-b show an example leg module and an example shield secondary module.
Figure 10B:
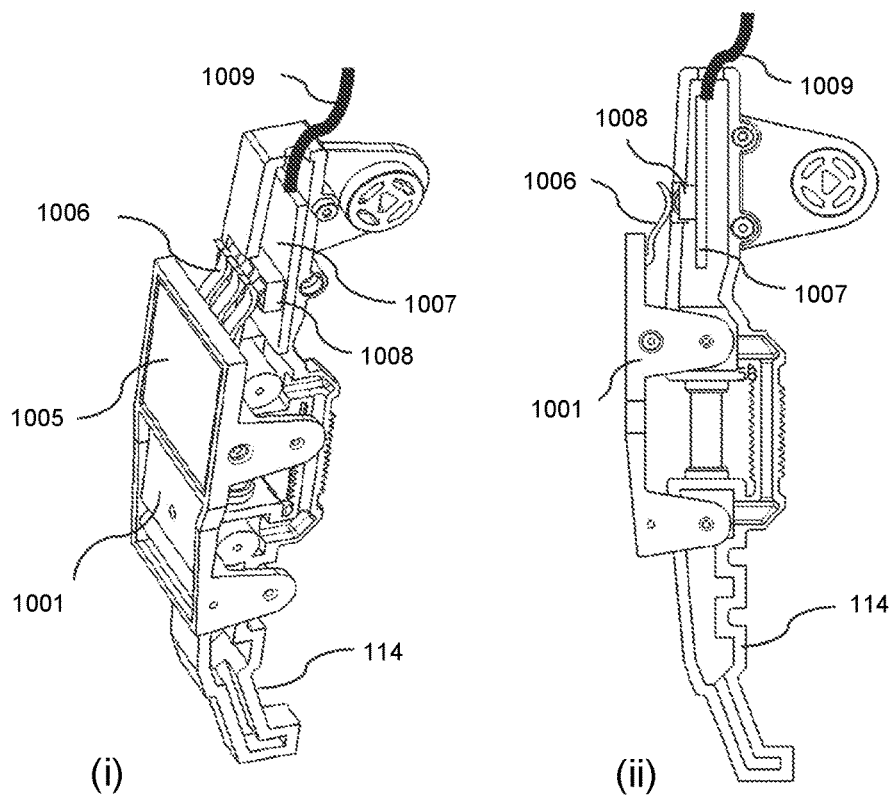

FIG. 6 illustrates an alternative arrangement of a leg module 11 in which no ball bearings and no bushings are used inside the leg module 11 (similarly, no ball bearings and no bushings may be used inside the body module 13). Instead, links 61 and 62, which are comprised in a coupling to connect the thigh 112 to the lower leg 114, also act as bearing surfaces. FIG. 6(i) shows a cross-section of a thigh 112 and a lower leg 116, from which it can be seen that the link 61 is keyed onto an output shaft 66 of a prime mover (e.g. the prime mover 115). The links 61 and 62 provide a bearing surface 63 for radial load and a bearing surface 64 for axial load by bearing against thigh shells 31 and 32. FIG. 6 also depicts a coupling pair 70 (which in this example comprises a set of links) at the opposite end of the thigh 112. The coupling pair 70, which is further detailed in FIGS. 10a and 10b, is used to mechanically interface the leg module 11 with the body module 13.

The three joints of the above example are actuated using three separate prime movers, to provide the leg with three degrees of freedom and allow the robot to walk with a fluid motion. In these examples the joints are not coupled, e.g. there are no linkages or any other suitable mechanism. This greatly increases the range of possible movements and movement sequences as compared to examples where the number of prime movers is reduced and only restricted movement is possible.

Figure 7A:
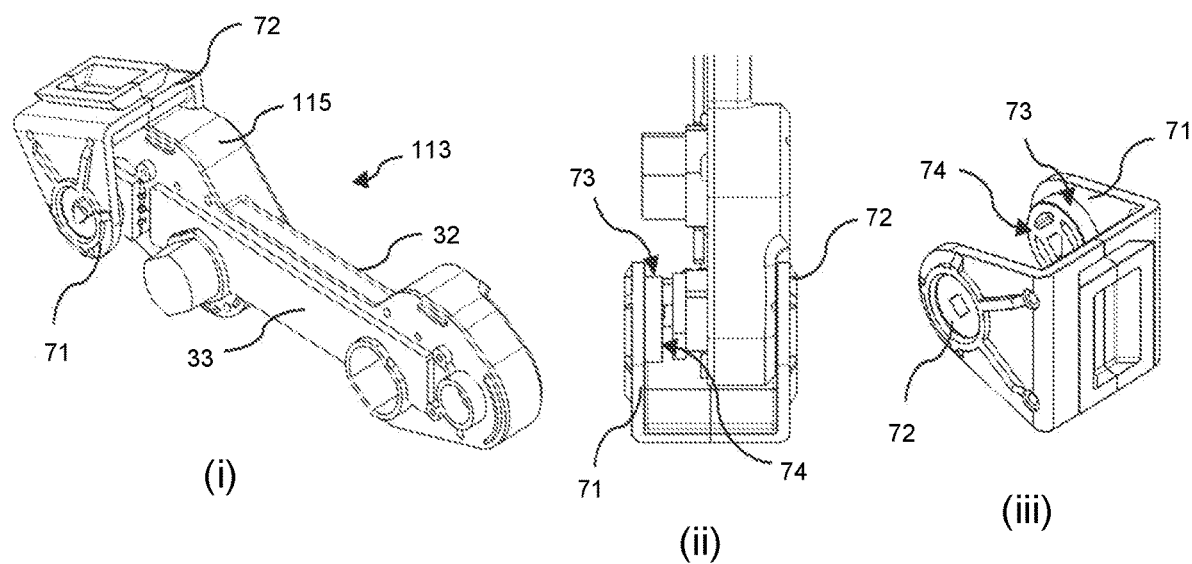
FIG. 7a shows a thigh of the example leg module of FIG. 6.

FIG. 7a provides a view of thigh 112 with only one prime mover 115 illustrated for clarity. In a similar arrangement to the links 61 and 62 for connecting the thigh 112 to the lower leg 114, FIG. 7a shows a pair of links 71 and 72 for connecting the thigh 112 to the body module 13. In this particular embodiment the links 71, 72, provide bearing surfaces 73 and 74, which are similar to the bearing surfaces 63 and 64 provided by the links 61 and 62.

Quick-Disconnect for Robot Modules

Figure 7B:
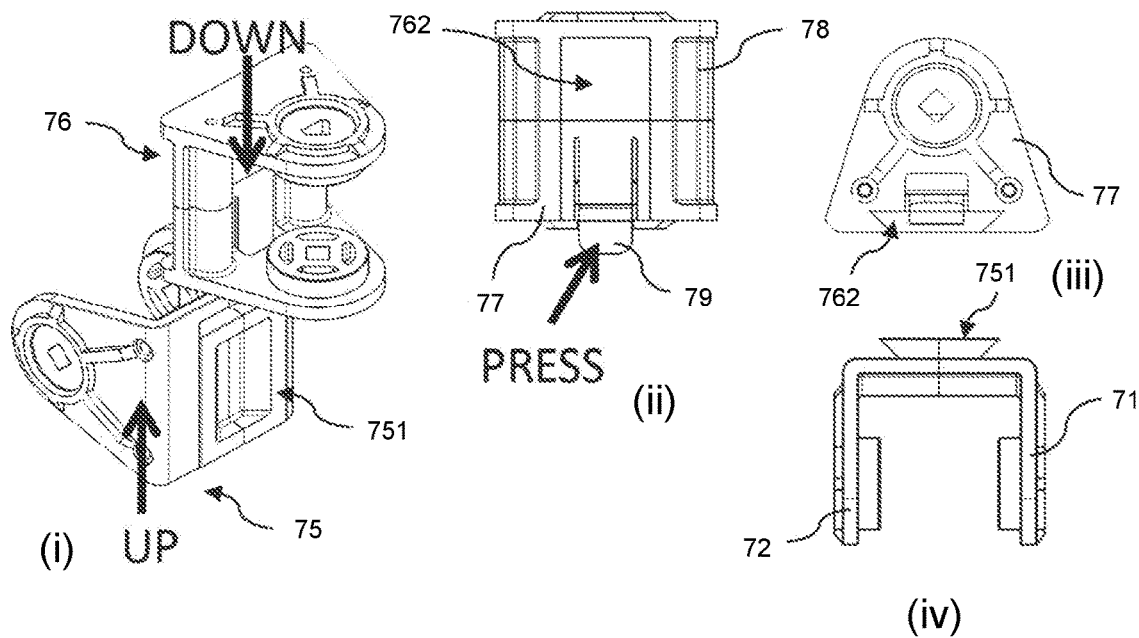
FIG. 7b shows an example coupling pair for connecting two robot modules.

FIG. 7b shows various views of the coupling pair 70. The coupling pair 70 connects the leg module 11 to the body module 13 and comprises of two couplings 75 and 76. In this example, each coupling 75, 76 comprises a pair of links. The coupling 75 forms part of the leg module 11 and mechanically interfaces with one of the prime movers 116, 115 of each thigh 112. The coupling 75 comprises of individual links 71 and 72. The coupling 76 forms part of the body module 13 and mechanically interfaces with the output shaft of any of the four prime movers 117 of the body module 13. The coupling 76 comprises individual links 77 and 78. In the embodiment of the coupling pair 70 depicted in FIG. 7b, the couplings 75 and 76 can be decoupled (or disengaged/ disconnected) by pressing on a spring latch 78 to allow key 751 of coupling 75 to engage with keyway 762 of coupling 76. In this particular embodiment coupling 75 engages (or respectively disengages) from coupling 75 in an upward (or respectively downward motion). Spring latch 78 is designed to flex when pressed (to engage or disengage coupling 75 from coupling 76) and to spring back into its original position to retain coupling 75 and coupling 76 in engagement. The link set 70 may therefore be considered to be a quick-release or quick-disconnect link set.

Figure 7C:
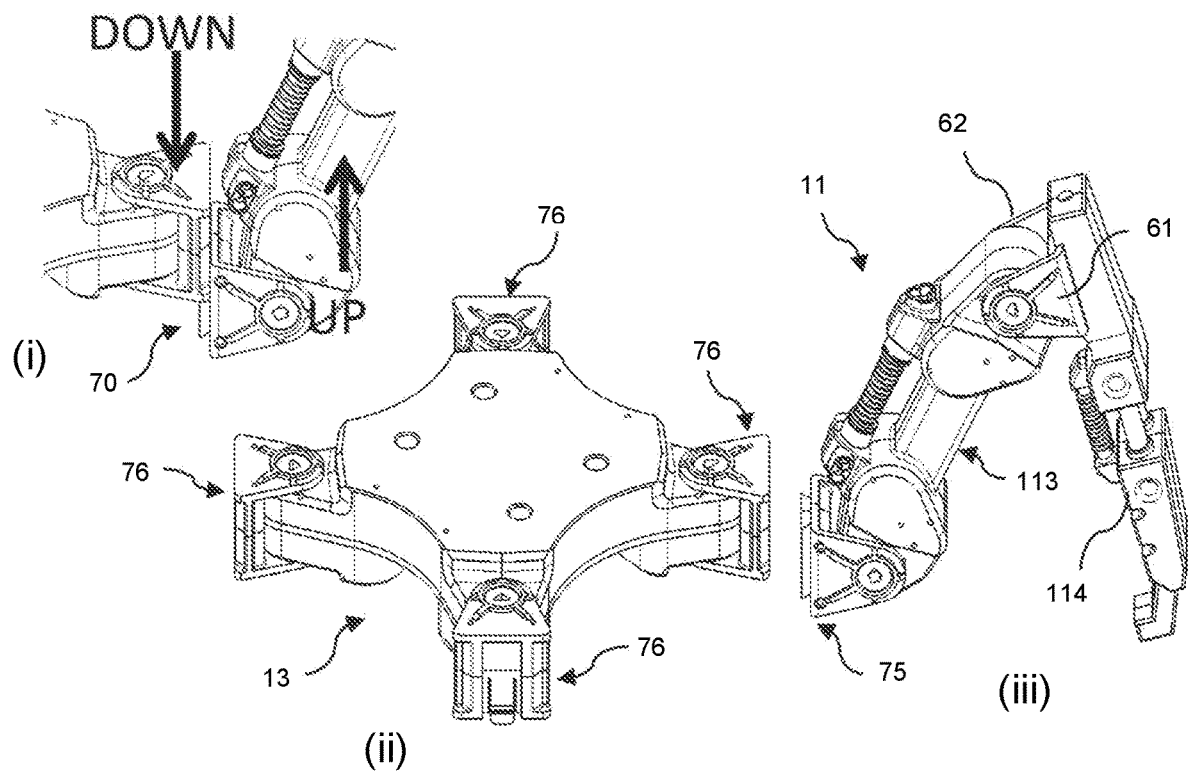
FIG. 7c shows an example link set comprised in the coupling pair of FIG. 7b.

FIG. 7c further illustrates the link set 70. FIG. 7c(ii) depicts the body module 13 with all four couplings 76 providing a mechanical interface with all four prime movers 117 of body module 13. FIG. 7c(iii) depicts one of the four leg modules 11, comprising a coupling 75 which provides a mechanical interface with one of the thigh prime movers. The other thigh prime mover of the leg module 11 mechanically interfaces with the lower leg 114 via a pair of lower leg links 61 and 62. FIG. 7c(i) shows the body module 13 and the leg module 11 in a partially connected state. A link set which creates a mechanical interface in the manner of the link set 70 may also include features which form an electrical interface when the couplings 75 and 76 are in a connected state (not shown in FIGS. 7a-c).

Figure 8:
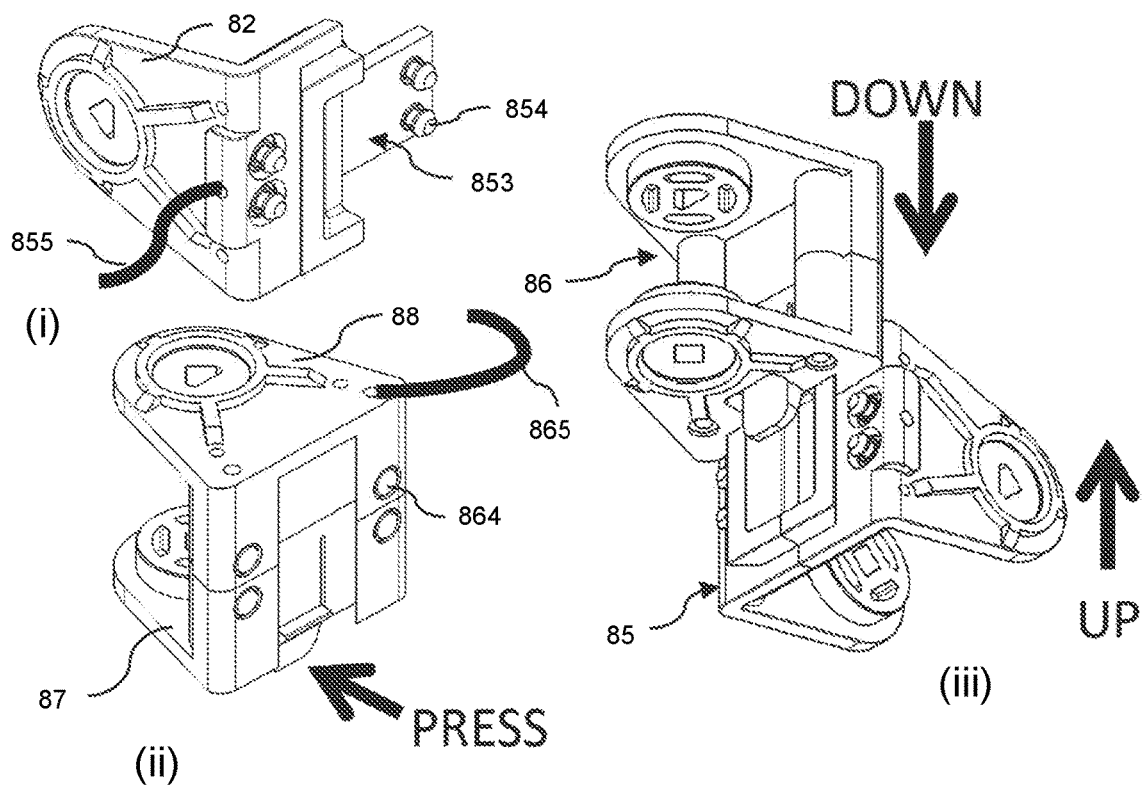
FIG. 8 shows an example coupling pair for connecting two robot modules.

FIG. 8 illustrates how such an electrical interface may be formed simultaneously with forming a mechanical interface described above. FIG. 8 shows a coupling pair 80, which comprises a first coupling 85 comprising a first link (not shown) and a second link 82, and a second coupling 86 comprising a first link 87 and a second link 88. The components of the coupling pair 80 may have any or all of the features of the corresponding components of the coupling pair 70 described above. In the particular illustrated embodiment, coupling 85 includes a printed circuit board 853 retained between both of its links, although for clarity only link 82 is depicted. Printed circuit board 853 comprises, in this example, four spring loaded pins 854 that act as electrical connectors. Printed circuit board 853 is wired to thigh printed circuit board 34 with electrical cables 855. Similarly, coupling 86 includes printed circuit boards (not depicted) retained between both of its links 87 and 88. The printed circuit boards of coupling 86 comprise, in this example, four electrical pads 864 designed to make electrical contact with pins 854. The printed circuit boards of coupling 86 (not depicted) are wired to the body module printed circuit board 44 with electrical cables 865.

Figure 9:
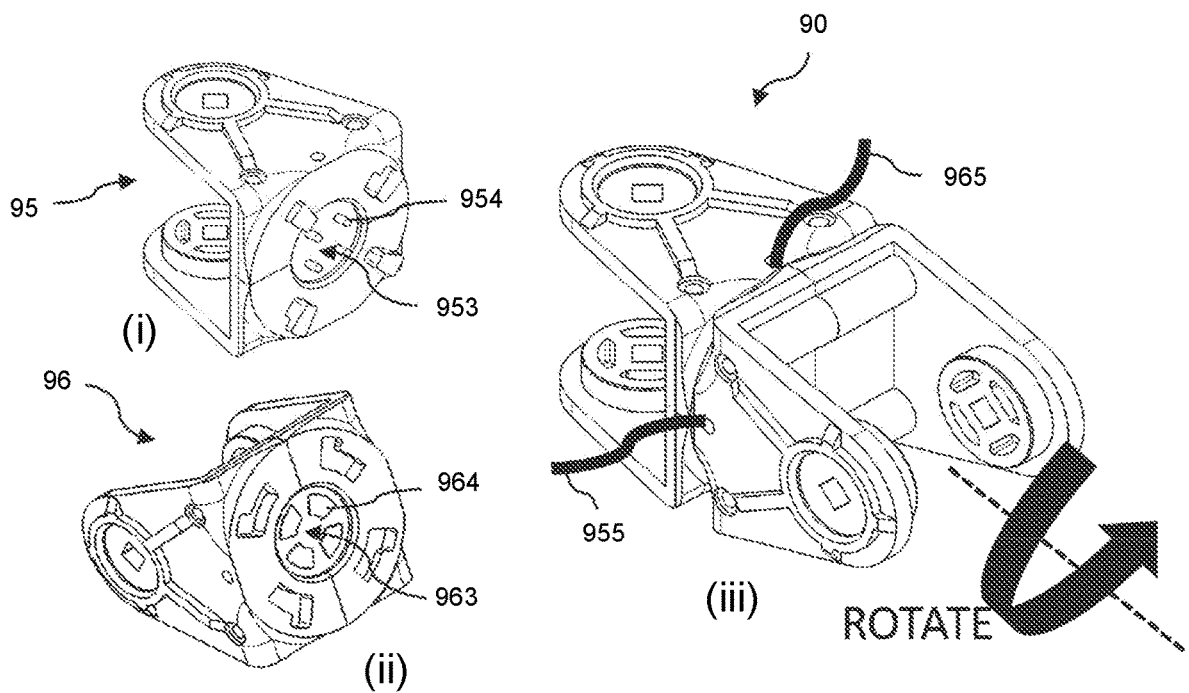
FIG. 9 shows an example coupling pair for connecting two robot modules.

FIG. 9 illustrates another example coupling pair 90 for creating a quick-release mechanical and electric connection between two components of a gaming robot. The coupling pair 90 comprises a first coupling 95 (which comprises a first link and a second link) and a second coupling 96 (which comprises a first link and a second link). In this particular embodiment, coupling 95 includes a printed circuit board 953 retained between both of its links. Printed circuit board 953 comprises, in this example, four spring loaded pins 954 that act as electrical connectors. Printed circuit board 953 is wired to the printed circuit board 34 of the thigh 112 with electrical cables 955. Similarly, coupling 96 includes printed circuit boards 963 retained between both of its links. The printed circuit boards 963 of the coupling 96 comprise, in this example, four electrical pads 964 configured to make electrical contact with pins 954. The printed circuit boards 963 are wired to the printed circuit board 44 of the body module 13 with cables 965. In this particular example, the couplings 95 and 96 are connected/disconnected by twisting (rotating) one of the couplings 95, 96 about the other one of the couplings 95, 96 (as indicated by the arrow in FIG. 9(iii)).

In other embodiments the hip prime mover may be integrated into the leg module, e.g. components 76, 86, 96 may be located at the end of the thigh module 113.

Removable Shield Module Arrangements

As discussed above, a gaming robot may comprise one or more optional or removable secondary modules. These may comprise, for example, one or more of a "weapon" module, a "shield" module, a "head" module and a "display" module. The secondary modules interface with primary modules (e.g. main, body or locomotion modules) to enhance the appearance and functionality of the primary modules. For example, a weapon or head module(s) may be affixed to the main module, and the shield module(s) may be affixed to the locomotion module(s). The secondary modules are optional in the sense that the modular robot does not require any secondary modules to function, e.g. to move, to be controlled by a connective device, or to take part in simulated battles.

For example, in one example configuration of a modular gaming robot, the locomotion modules may consist of four leg modules to form a walking robot. The main module may be of the "Berserker" design (e.g. see FIG. 12a) and may feature a "Heavy Cannon" and a "Shield Booster" weapon modules. The leg module(s) may also feature a "Light" shield module. The battery module may be housed within the "Berserker" main module.

In a second example configuration of a modular gaming robot, the locomotion module may consist of four leg modules to form a walking robot. The main module may be of the "Brute" design (e.g. see FIG. 12b) and may feature a screen module. The leg module(s) may also feature a "Heavy" shield module. The battery module in this case may be housed within the "Brute" main module.

Figure 15A:
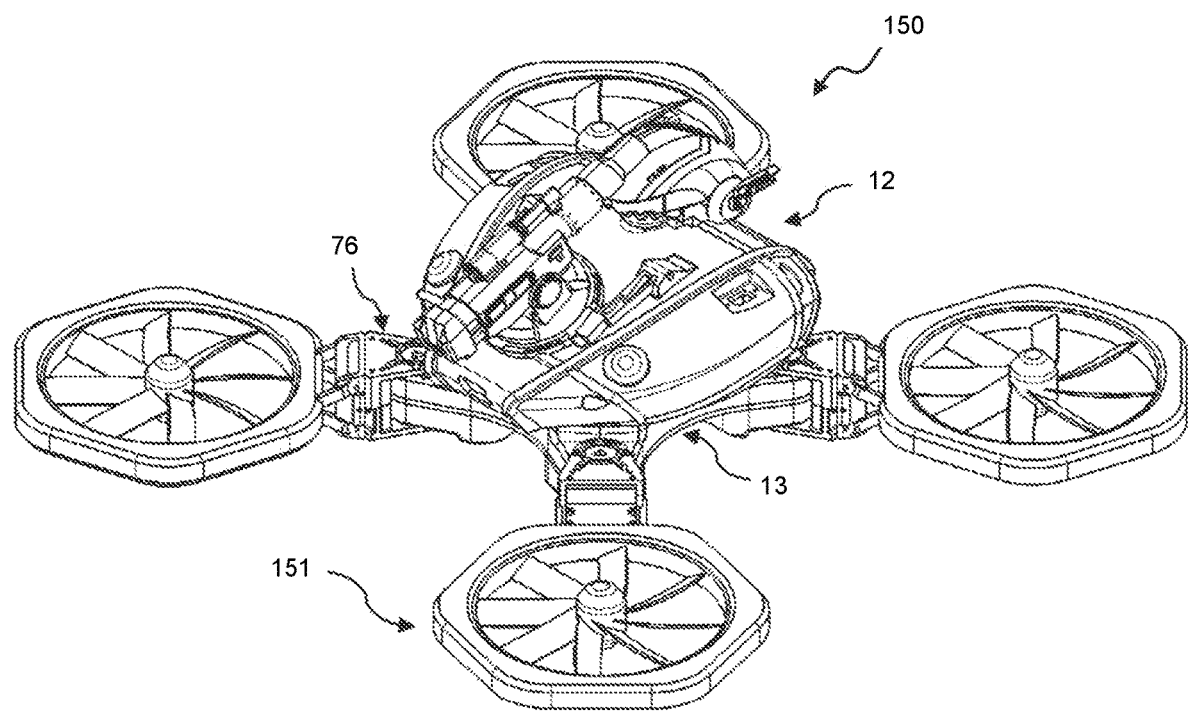
FIG. 15a shows a further example modular gaming robot.

In a third example configuration of a modular gaming robot, the locomotion modules may consist of four propeller modules to form a flying robot (e.g. see FIG. 15a). The main module may be of the "Berserker" design (e.g. see FIG. 12a) and may feature a "Heavy Cannon" weapon modules. The battery module may be housed within the "Berserker" main module.

Example secondary module designs are shown in FIGS. 10a-b, 11 and 16 (the former two Figures showing example shield modules and the latter Figure showing example weapon modules).

Figure 11:
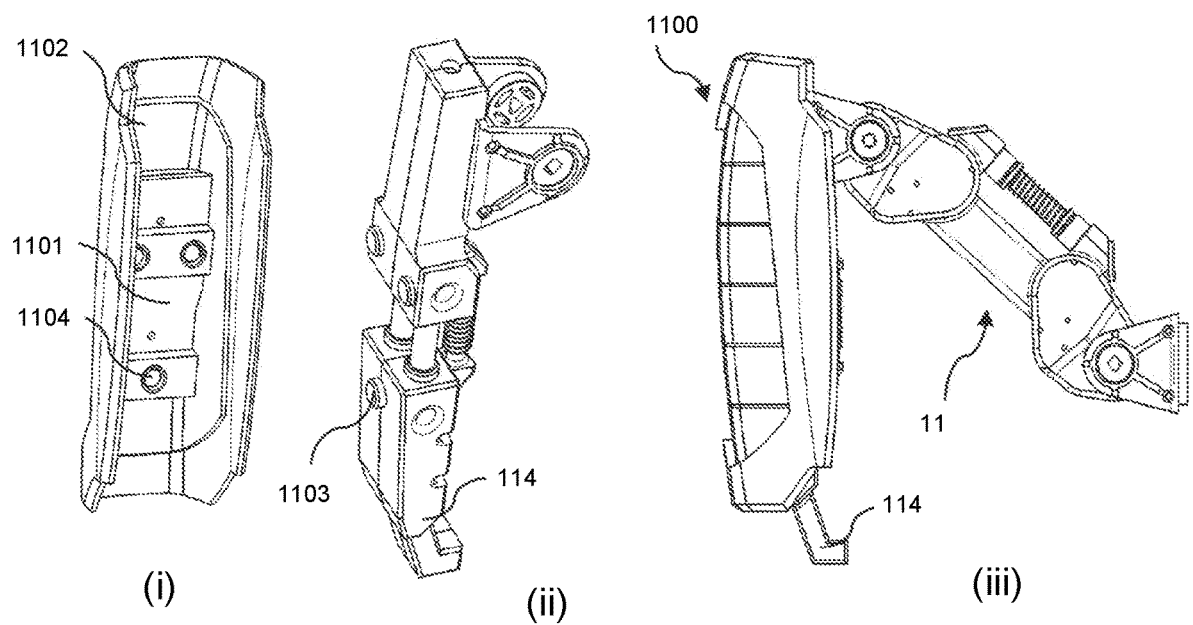
FIG. 11 shows an example leg module and an example shield secondary module.

FIGS. 10a-b and 11 show example removable shield modules for a gaming robot. Shield modules are designed to be attached/detached with ease from the gaming robot primary modules (such as main or locomotion modules) to enhance the robot appearance and its physical and virtual attributes. For example, a strong but heavy/bulky shield capable of protecting the gaming robot against attacks may slow the robot. Conversely, a weaker but lighter/smaller shield offering less protection to the gaming robot would allow the robot to move faster. The alteration of the gaming robot attributes (e.g. additional strength/reduced speed or additional speed/reduced strength) is essentially handled via the gaming robot software interface through which the physical characteristics of the robot are altered/restricted. The physical design of the shield module may comprise a shield shell and a shield bracket. The shield may typically be fastened to the shield shell. The shield bracket is designed to mechanically interface with the robot modules and readily attachable/detachable.

In certain cases, secondary modules may be "active". The term active relates to the fact that the secondary modules include electronic circuits that contain data identifying the secondary module, such as a unique identifier, allowing the robot to automatically identify the modules in use and update the robot attributes automatically via the gaming robot software interface. A main processing module of the gaming robot may obtain this data via an electrical interface that is formed between respective parts of the primary and secondary modules in use. In certain cases, an electronic circuit included as part of the shield module may also be used to supply lights (e.g. LEDs) integrated within the design to enhance the appearance of the shields. The shield module electronic circuit is typically held in place between the shield shell and the shield panel. As the shield assemblies are designed to be easily attached or detached from the robot, the shield bracket has to also feature an electrical interface readily connectable/disconnectable.

The mechanical and electrical interfaces or couplings of each of the primary and secondary modules may be implemented in a number of different ways.

In a first example configuration of a removable shield module designed to interface with the lower leg of a leg module of a walking gaming robot, the shield bracket comprises four spring loaded tabs. The spring loaded tabs of the shield bracket engage with corresponding sockets on the lower leg. The spring loaded tabs are designed to deflect upon being pushed against the lower leg to engage in the lower leg sockets and then spring back into a neutral position to provide a positive interlock. These spring loaded tabs implement a mechanical coupling for the secondary module. A corresponding mechanical coupling, e.g. sockets, is provided on the leg module to mate with the mechanical coupling of the secondary module. Each of the four spring loaded bracket tabs also incorporate an electrical conductor connected to the shield module electronic board. This implements an electrical interface for the secondary module. A corresponding electrical interface, e.g. a conductive pad or the like, is provided on the leg module. The four shield bracket tabs make contact with four matching electrical conductors within the lower leg sockets. This forms an electrical connection. Data may be read over this connection and/or power supplied to active components. This particular configuration provides up to four independent electrical connections between the leg modules of the robot and the shield modules. In this configuration the mechanical coupling and electrical interface are incorporated into a common coupling/interface.

In a second example configuration of a removable shield module designed to interface with the lower leg of the leg module of a walking gaming robot, the shield bracket comprises of four spring loaded tabs. The spring loaded tabs of the shield bracket engage with corresponding sockets on the lower leg. The spring loaded tabs are designed to deflect upon being pushed against the lower leg to engage in the lower leg sockets and then spring back into a neutral position to provide a positive interlock. In this particular the shield bracket spring tabs are non-conductive. Instead the electrical interface between the shield module and the lower leg is achieved by means of three metallic strips attached to the shield electronic circuit board and designed to contact with a matching electrical connector attached to the lower leg electronic circuit board. The springiness of the metal strips brings the compliance required to ensure successful electrical contacts between the shield module and the leg module. This particular configuration provides up to three independent electrical connections between the leg modules of the robot and the shield modules. In this configuration the mechanical coupling and electrical interface are provided separately.

In a third example configuration of a removable shield module designed to interface with the lower leg of the leg module of a walking gaming robot, the shield bracket comprises of three magnets. The magnets of the shield module engage with corresponding magnets of ferromagnetic pads on the lower leg. In addition to providing a mechanical interface and interlock to the shield module, the magnets may also be used as an electrical interface by selecting electrically conductive magnet (e.g. iron, cobalt, nickel, neodymium magnets). This particular arrangement has the advantage of combining both mechanical and electrical interface within a simple and compact package. Conducting electric signals through magnets may at times alter the electrical characteristics of such signal but this could easily be remedied by inserting a non-magnetic conductive core at the centre of the magnets. This particular configuration provides up to three independent electrical connections between the leg modules of the robot and the shield modules. In this configuration the mechanical coupling and electrical interface are incorporated into a common coupling/interface and comprise the common components that provide both functions.

These example configurations are respectively shown in FIGS. 10a, 10b, and 11.

FIGS. 10a and 10b depict leg module 11 together with an example removable "secondary" module that can be attached to the leg module. In the illustrated example, the secondary module is a removable shield assembly 1000 that can be clipped on or off lower leg 114 of the leg module 11. That is, the leg module 11 comprises at least one first coupling which is connectable to a second coupling on the shield secondary module 1003. The first and second couplings are connectable to create a mechanical interface between the leg module 11 and the shield secondary module 1003 and an electrical interface between the leg module 11 and the shield secondary module 1003. The shield assembly 1000 comprises a shield 1002 and a shield bracket 1001 that may be fixed to shield 1002, e.g. using screws. In other examples the shield bracket 1001 may be formed integrally with the shield 1002. The mechanical interface between the shield assembly 1000 and the lower leg 114 is, in this particular example, achieved by means of four plastic spring tabs 1004 built into (that is, formed integrally with) the shield bracket 1001. The spring tabs 1004 are designed to deflect upon engaging with four corresponding sockets 1003 on the lower leg 114.

The shield assembly 1000 depicted in FIGS. 10a and 10b is "active" (that is, it comprises electronic components) and electrically interfaces with the lower leg 114. Both the shield assembly 1000 and the lower leg 114 house a printed circuit board (not depicted) and each of the four tabs 1004 comprises an electric conductor, configured to that plugs into (that is, form an electrical interface with) the four sockets 1003 of lower leg 114, which are also electrically conductive. In this particular example up to four individual electrical connections are possible between the shield assembly 1000 and the lower leg 114. A given individual electrical connection may be used, for example, to supply power to the shield (e.g. to power light emitting diodes (LED) comprised in the shield), or for digital communication between the leg module 11 and the shield assembly 1000 (e.g. during a process of identifying a type of the shield 1002).

FIG. 10b only depicts the shield bracket 1001 and the shield 1002 has been omitted for clarity. Similarly, only one half of the lower shell of the leg module 11 is depicted for clarity. It can therefore be seen that the shield assembly 1000 incorporates a printed circuit board 1005, whilst lower leg 114 incorporates a printed circuit board 1007. Each of these printed circuit boards may comprise a microcontroller. One example microcontroller, that may incorporated within printed circuit boards or circuitry as described herein, is a PIC microcontroller (e.g. a PICx such as PIC10) supplied by Microchip Technology Inc. of Chandler, Ariz., USA. Other microcontrollers may also be used. The microcontroller may comprise a program memory and a data memory. The electrical connection between the shield printed circuit board 1005 and the lower leg printed circuit board 1007 is achieved using a set of electrically conductive spring tabs 1006 on shield printed circuit board 1005 and corresponding connectors 1008 on lower leg printed circuit board 1007. In this particular example, the four electrical connections formed by the tabs 1006 and the connectors 1008 when the shield assembly 1000 is connected to the leg module 11 comprise three electrical connections for providing power to lights (not depicted) comprised in the shield, and a data connection for transmitting shield identification information (i.e. data identifying the secondary module) from the shield assembly 1000 to the leg module 11 (so that the shield identification information may be passed, for example, to the main module 12 of the robot).

In some examples a mechanical interface between the shield assembly 1000 and the lower leg 114 may be achieved by means of magnets. FIG. 11 illustrates one such example. In this particular example, the shield bracket 1101 comprises three magnets 1104. The magnets 1104 are configured to guide the shield assembly 1100 into a connection position, and then hold it in the connection position, upon engaging with three corresponding magnets or ferromagnetic pads 1103 on the lower leg 114. In this embodiment, the magnets 1104 are connected to a printed circuit board (not depicted) located on the shield assembly 1100 and the magnets (or ferromagnetic pads) 1103 are connected to a printed circuit board (not depicted) comprised in the lower leg 114. Magnets (or ferromagnetic pads) 1103 and magnets 1104 are electrically conductive (e.g. iron, cobalt, nickel, neodymium magnets) and therefore also act as electrical connectors between the lower leg 114 and the shield assembly 1100. This embodiment therefore creates both an electrical and a mechanical interface between the leg module 11 and the shield assembly 1100 when the shield assembly 1100 is connected to the leg module 11.

Modular Gaming Robot Examples

Figure 12A:
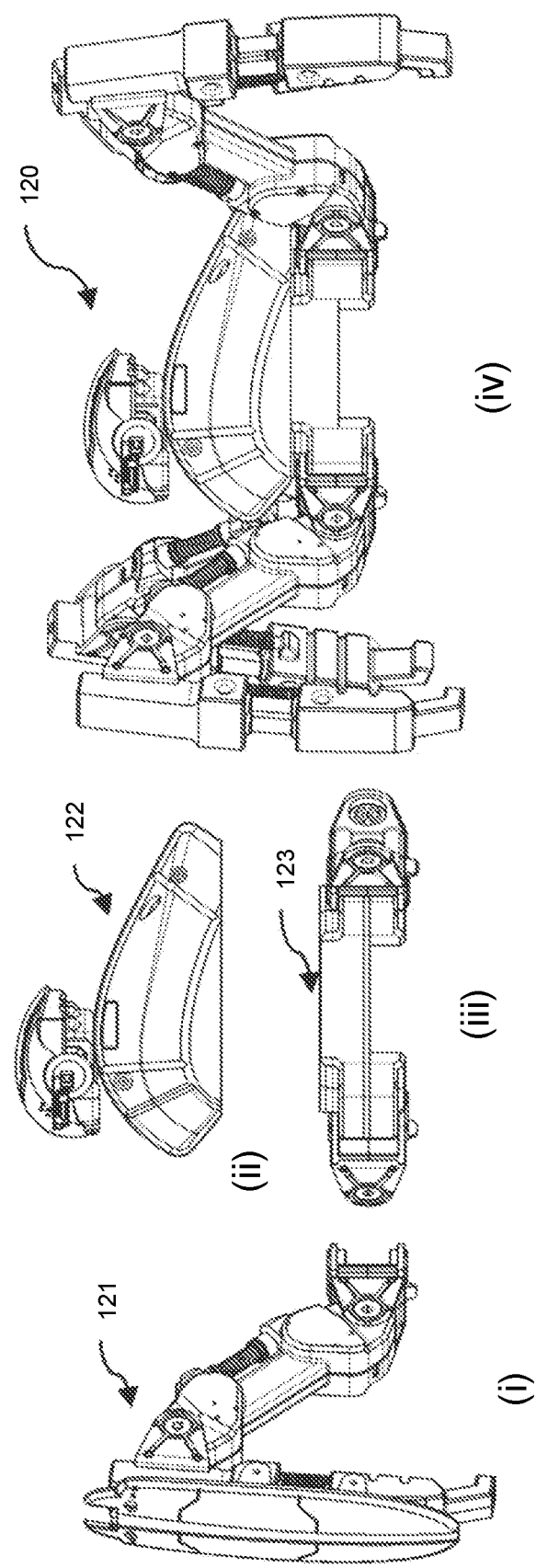
FIG. 12a shows a further example modular gaming robot.
Figure 12B:
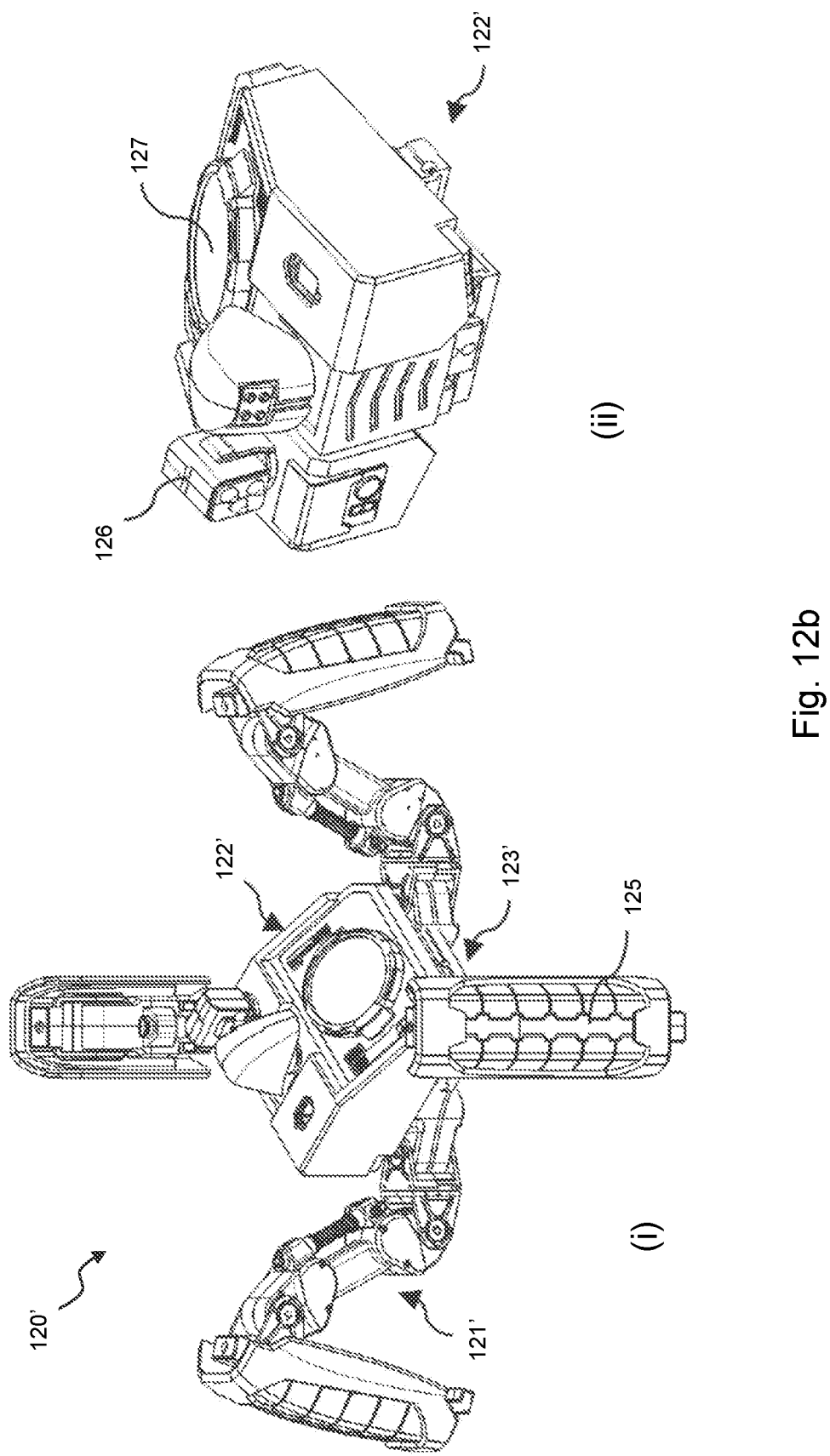
FIG. 12b shows a further example modular gaming robot.

FIGS. 12a and 12b illustrate two different examples of modular gaming robots according to the invention. FIG. 12a illustrates how three types of robot module (leg modules 121, a main module 122, and a body module 123 can be connected together to form a fully assembled modular robot 120 having a first configuration. Each module can be mechanically and electrically connected to and disconnected from the rest of the robot 10 with minimal skills or tools (for example in any of the manners described above in relation to FIGS. 7-11). Although the above description relates to the connection between a leg module 11 and the body module 13, in some examples the main module 12 that contains the "brain" of the robot 10 (e.g. a microcontroller, system on chip or embedded processor) can also be easily connected to and disconnected from the body module 13, both mechanically and electrically.

FIG. 12b illustrates the removable nature of the main module in respect of a second modular robot 120' having a second configuration. The robot 120' comprises a main module 122' that can be easily connected to (and disconnected from) a body module 123' (which in this example is the same as the body module 123 of the robot 150) to form electrical and mechanical interfaces between the main module 122' and the body module 123' (for example in any of the manners described above in relation to FIGS. 7-11). Leg modules 121' of the second modular robot 120' are also connected to the body module 123' using similar quick release connectors to those described above in relation to the robot 10.

FIG. 12b also illustrates how the easily interchangeable modules may be used to personalise a modular gaming robot. The robot 120' has a body module 123' and leg modules 121' that are of the same design as the corresponding body and leg modules 123, 121 of the robot 120. However; the main module 122' (of the "Brute" design in this example) is different in appearance to the main module 122 of the robot 120. The second robot 120' also has different shield assemblies 125 attached to its lower legs. The main module 122' comprises, in this example, a removable weapon module 126 and a display screen 127 that may be used to display information about the robot, and in certain cases modify robot attributes that control the robot, and thereby enhance the game play experience.

Figure 13:
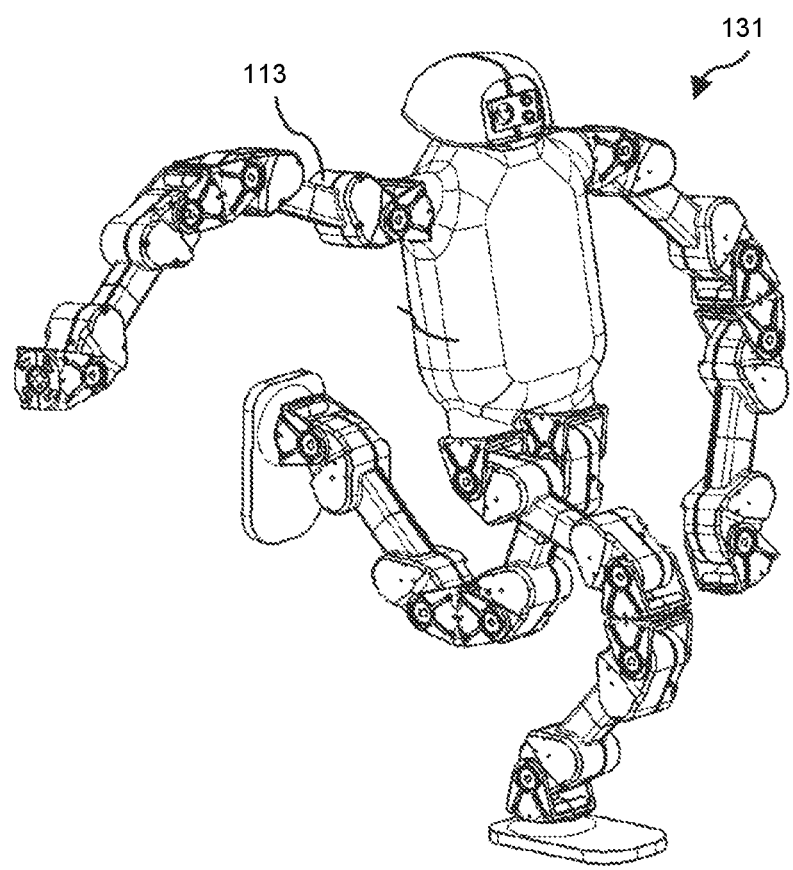
FIG. 13 shows a further example modular gaming robot.

FIGS. 13 to 16 further illustrate how the modular nature of the examples described herein may be used customize a gaming robot. FIG. 13 illustrates how thighs 113, which are normally used within leg locomotion modules of the same type as the leg module 11 described above, may be used to form a different type of locomotion module. The thighs 113 may be configured to be fully autonomous, such that they only require an external power supply to become fully functional. A plurality of thighs 113 can therefore be connected together to create a snake-like chain robot (e.g. one "limb" of FIG. 13) or a multi-jointed limb for a humanoid robot 161 as shown in FIG. 13. The connections between the thighs 113 in these examples may be effected by quick-release connectors, such as any of the connectors described above in relation to FIGS. 6-9.

Figure 14A:
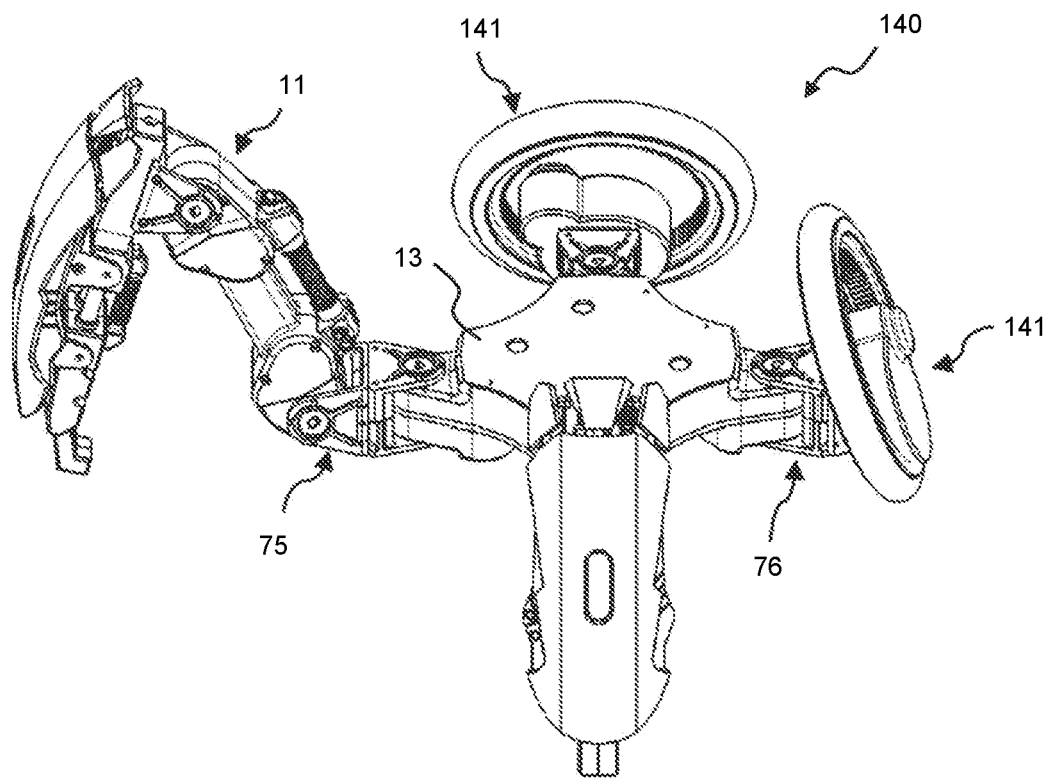
FIG. 14a shows a further example modular gaming robot.
Figure 14B:
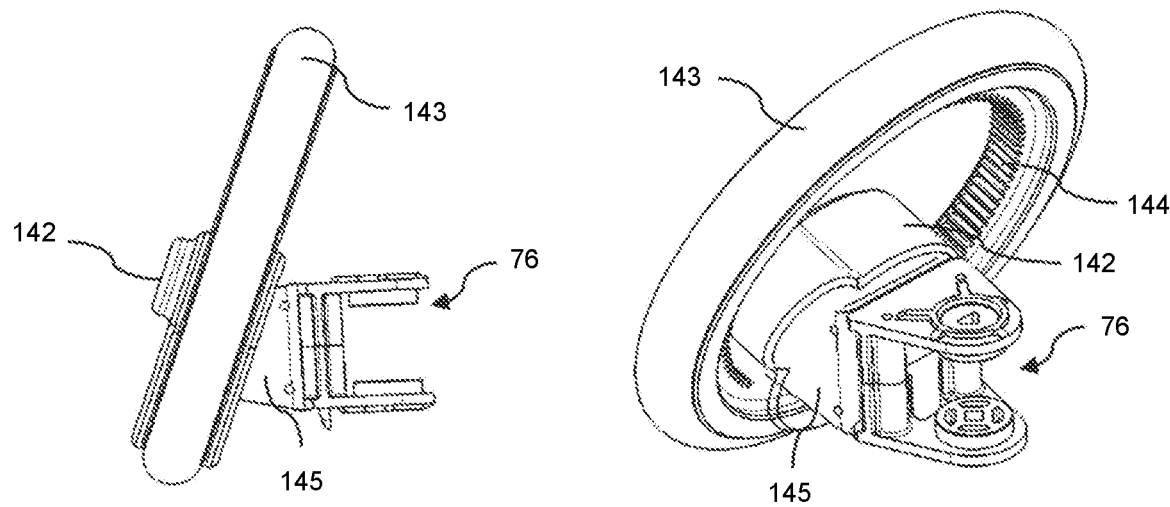

FIGS. 14a and 14b show an example wheeled robot 140. In this example the robot 140 comprises four locomotion modules, two of which comprise leg modules 11 (which in this example are the same as the leg modules of the robot 10 described above), and two of which comprise wheel modules 141. The wheel modules 141 (and the leg modules 11) mechanically and electrically interface with a robot body module 13 (which in this example is the same as the body module 13 of the robot 10 described above) using quick-release connectors, such as any of the connectors described above in relation to FIGS. 6-9. FIG. 14b shows in detail an example wheel module 141. The example wheel module 141 comprises a main gearbox and motor 142 and a hub-less wheel 143. The wheel 143 features an additional internal gear 144 and a coupling 145 compatible with the couplings 76 of the body module 13. The electrical connection between the wheel module 141 and the body module 13 is as described above in relation to FIG. 9. In a case, where the hip joint is mounted within the leg module, the interface 76 of the wheel module may vary accordingly. In one case, electronic circuitry within the wheel module 141 may comprise data identifying the module as such, e.g. that is read or otherwise obtained by the main processing module. In this manner, the control provided by the main processing module may be adapted based on the obtained data, e.g. a single PWM signal to control the wheel motor rather than two or three signals to control leg joint prime movers.

Figure 15B:
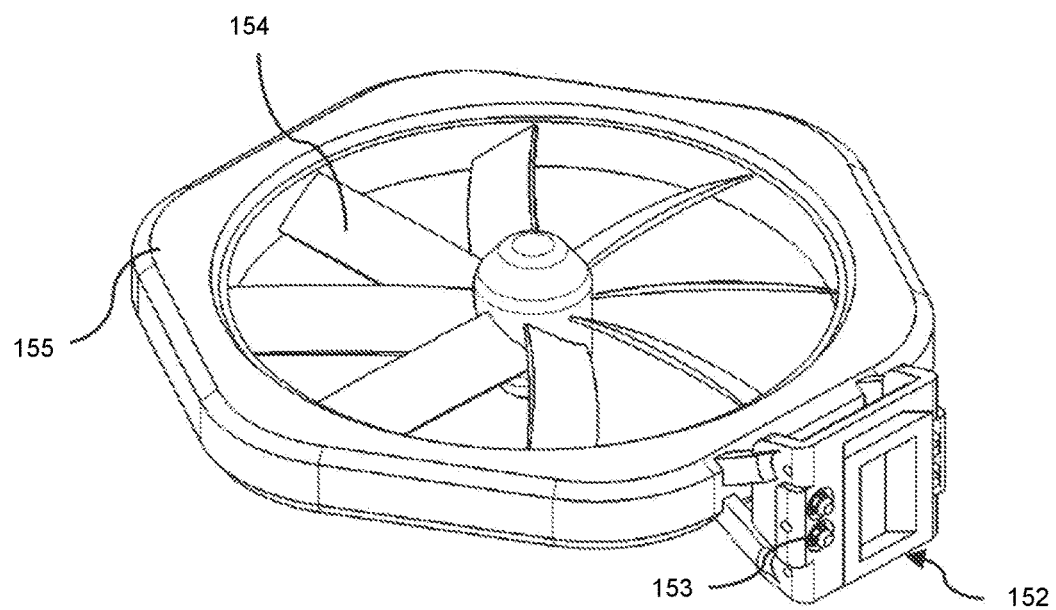

FIGS. 15a and 15b show an example flying robot 150 comprising four locomotion modules. In this example, all four locomotion modules comprise flying modules 151 that mechanically and electrically interface with a robot body module 13 (which in this example is the same as the body module 13 of the robot 10 described above) using quick-release connectors, such as any of the connectors described above in relation to FIGS. 6-9. The flying robot 150 also comprises a main module 12, which in this example is the same as the main module 12 of the robot 10 described above). FIG. 15b shows in detail an example flying module 151. The example flying module 151 comprises of a main casing 155 housing a motor and gearbox (not depicted), and a hub-less multi-bladed rotor 154. The example flying module 151 also comprises a coupling 152 compatible with the couplings 76 of the body module 13. The electrical connection 153 between the wheel module 151 and the body module 13 is as described above in relation to FIG. 9. In a case, where the hip joint is mounted within the leg module, the interface 76 of the wheel module may vary accordingly. In one case, electronic circuitry within the flying module 151 may comprise data identifying the module as such, e.g. that is read by the main processing module. In this manner, the control provided by the main processing module may be adapted based on the obtained data, e.g. a signal to control the propeller motor rather than two or three signals to control leg joint prime movers.

Figure 16:
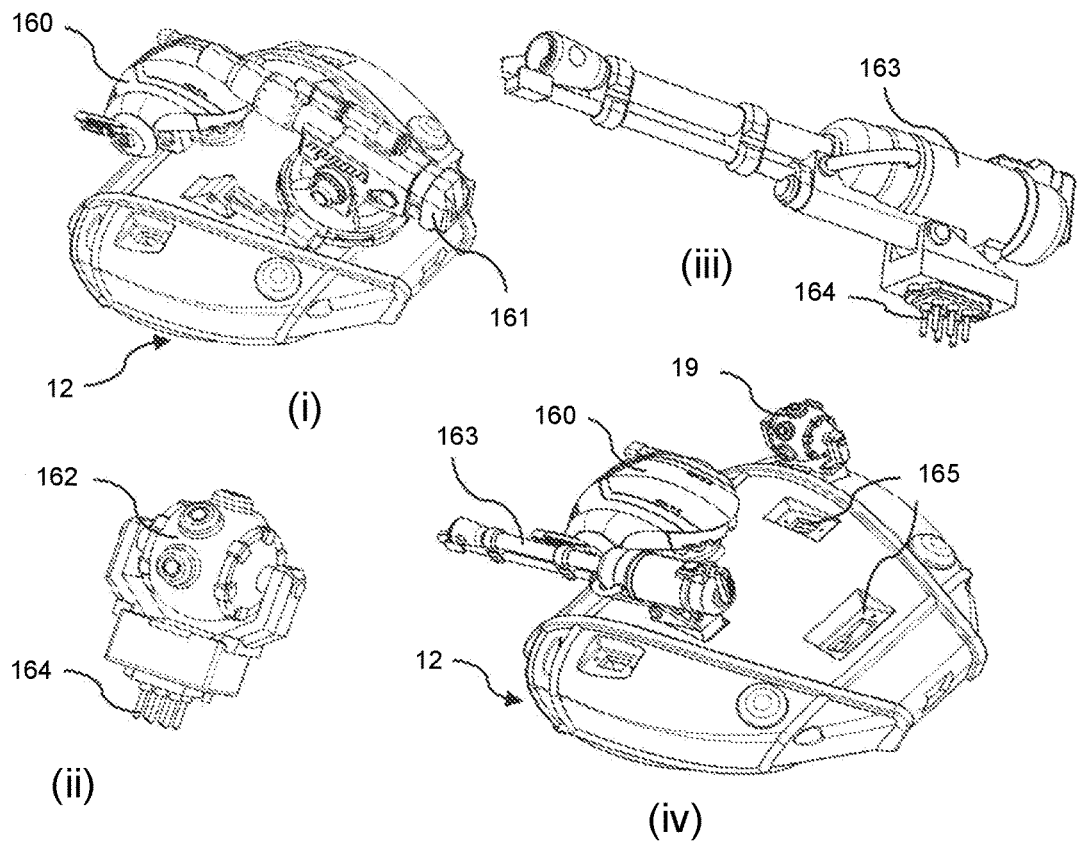
FIG. 16 shows various different weapon secondary modules for an example gaming robot.

FIG. 16 illustrates how a modular gaming robot (which in the illustrated example is the robot 10) can be further customized by connecting removable secondary modules to the main module 12 of the robot 10. Three different example types of secondary module are shown in FIG. 16. FIG. 16(i) shows a "Heavy Cannon" type weapon module 161, FIG. 16(ii) shows a "Shield Booster" type weapon module 162, FIG. 16(iii) shows a "Flamethrower" type weapon module 163, and FIG. 16(iv) shows a body module 12 having both a Shield Booster module 162 and a Flamethrower module 163 attached to it. Each of the secondary modules 161, 162, 163 can be plugged into a socket 165 on the shell of the main module 12 shell. That is, the main module 12 comprises at least one first coupling (i.e. the sockets 165, of which there are three in the present example) which is connectable to a second coupling on a secondary module 161, 162, 163. The first and second couplings are connectable to create a mechanical interface between the main module and the secondary module and an electrical interface between the main module and the secondary module.

Similarly to the shield assemblies 1000 described above in relation to FIGS. 10 and 11, the weapon secondary modules 161, 162 and 163 are active. In the example depicted in FIG. 16 an electrical connection (interface) (e.g. for power supply and data communication) is achieved using pins 164 (comprised in the second couplings), which are designed to plug into corresponding sockets comprised in each of the first couplings/sockets 165). The secondary modules are interchangeable, such that any of the secondary modules 161, 162, 163 may be plugged into any of the sockets 165 of the main module 12. As with the shield secondary modules 1000, the electrical connections between the main module 12 and the weapon secondary modules 161, 162, 163 can be used to power lights (LEDs) comprised in the weapon secondary modules 161, 162, 163 and/or to transmit weapon module identification information from a weapon secondary module assembly 161, 162, 163 to the main module 12. FIG. 16 also shows an example robot head module 160 connected to the main module 12 (e.g. using a connector of the same type used to connect the secondary modules 161, 162, 163 to the body module 12, or a quick-release connector as described above in relation to FIGS. 6-9). The head module 160 may be interchanged with another design of head module, or another type of module.

Intelligent Gaming Robot

Figure 17:
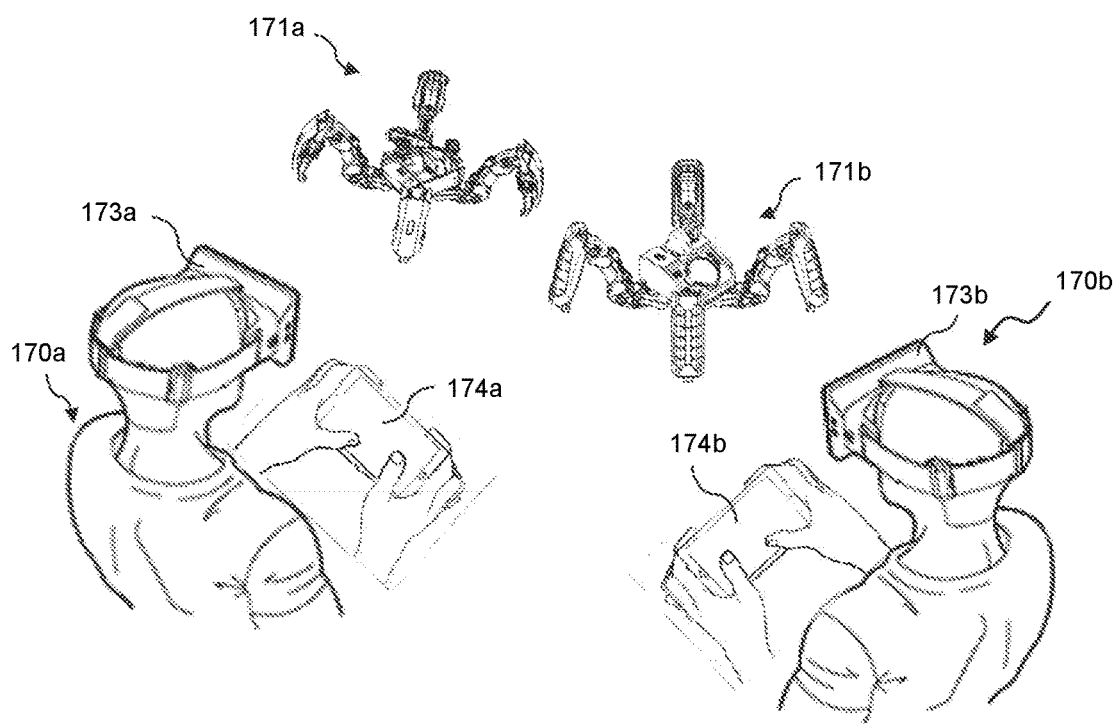
FIG. 17 shows two gaming robots being controlled by two users.

The examples disclosed herein relate in particular to gaming robots. The concept of a gaming robot will now be described in more detail with reference to FIGS. 17-19. FIG. 17 depicts two gaming robots 171a and 171b controlled by two users (players) 170a and 170b (that is, each gaming robot 171a, 171b is controlled by a different one of the two users 170a, 170b). However; it is possible for a single player to play with a single robot, or for any number of players to battle their robots 171 (in such situations, each player may have an associated gaming robot). Each gaming robot 171a, 171b is controlled using a connective device. A connective device may be, for example, a pair of augmented reality goggles 173, a mobile phone/computer tablet 174, or a combination of both. In the illustrated example, each player 170a, 170b is using a pair of augmented reality goggles 173a, 173b, and a mobile phone 174a, 174b. The connective devices 173a, 173b, 174a, 174b are able to transmit and receive information to and from the gaming robots 171a, 171b using wireless transmission (for example "WiFi" or "Bluetooth"). The connective devices 173a, 173b, 174a, 174b of each player 170a, 170b may also be interconnected to further enhance the player experience.

In certain embodiments involving use of augmented reality goggles, the processing capability of the goggles may be insufficient to achieve desired performance and may be supplemented with another device with adequate computing power (e.g., a desktop/laptop computer or a video game console).

In one configuration of the gaming robot environment of FIG. 17, two robots may be controlled by two users using their smartphones equipped with a tactile screen acting both as a display for the gaming user interface and a virtual gamepad to allow each user to control his/her robot using his/her thumbs. In this configuration the robots and the smartphones are connected using a type of radiofrequency transmission called Bluetooth. In addition, the smartphones are also interconnected using WiFi to allow both users to battle each other's robots. If an active wireless internet connection is present each user is able to connect to the cloud during gameplay in order to access each other's profile from the cloud database or purchase additional virtual items from a cloud market place. They are also able to exchange information with other members of the community via the cloud community portal or access third party games via the external entity interface of the cloud. An active internet connection is however not essential to allow the users to battle each other as their connective devices and intelligent robots are self-sufficient and embed all the data, processing capability and software applications required for gaming. The intelligent gaming robot infrastructure is designed to store all relevant data within each of the devices until a wireless connection to the cloud can be made to update databases, skills and analytics. The market place may also be accessed via a stand-alone computer connected to the internet. When multiple users "battle" their robots, a gaming robot software application may be present on one or more connective devices. In one case, such as that shown in FIG. 17, two connective devices may be used where each runs a gaming robot software applications. The applications may be synchronised by peer-to-peer communication between the connective devices, e.g. over a WiFi network, via a gaming server, e.g. via Internet connections to the gaming server, or via the gaming robots themselves, e.g. via Bluetooth and/or infra-red communication channels.

Figure 18A:
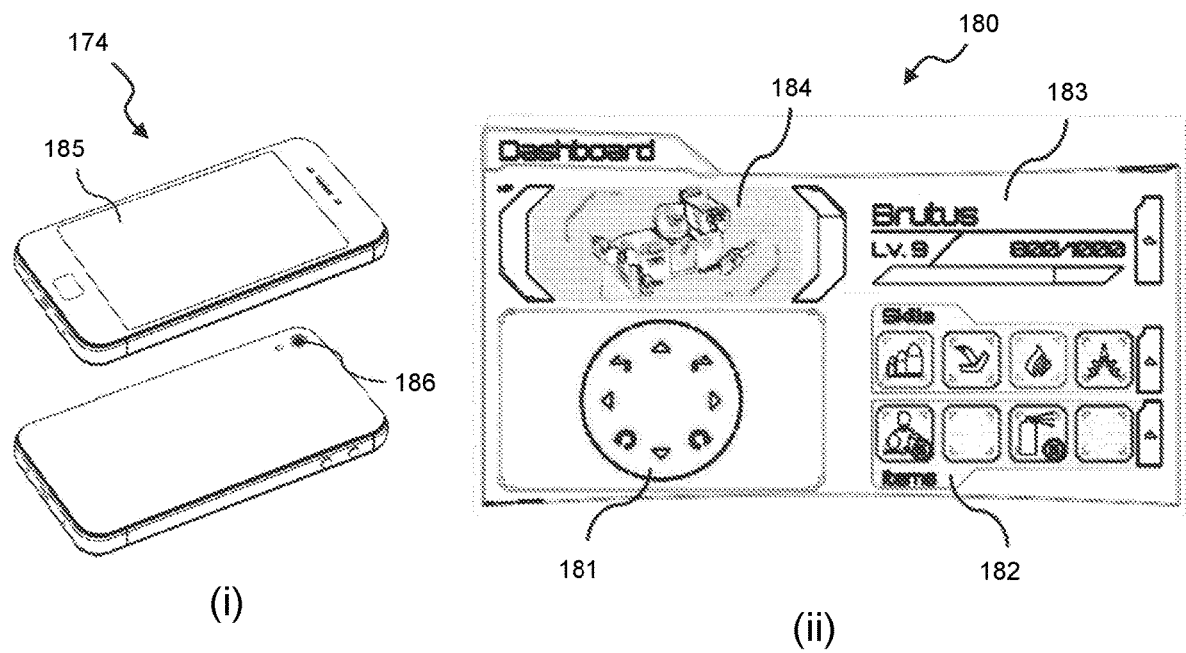
FIG. 18a shows an example remote computing device for controlling a gaming robot.
Figure 19A:
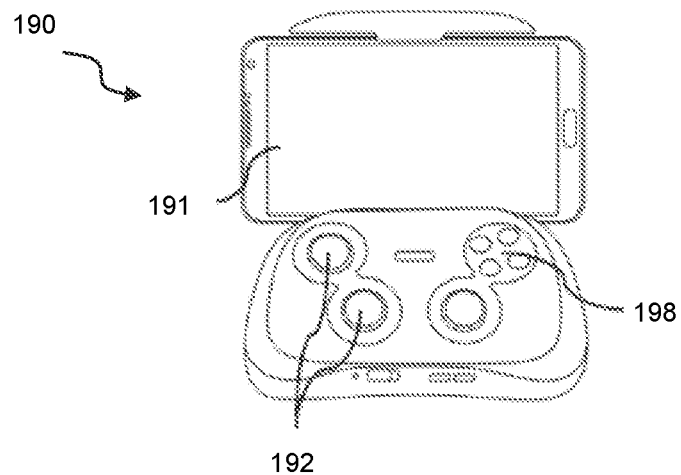
FIGS. 19a-b show example game controllers according to certain examples.
Figure 19B:
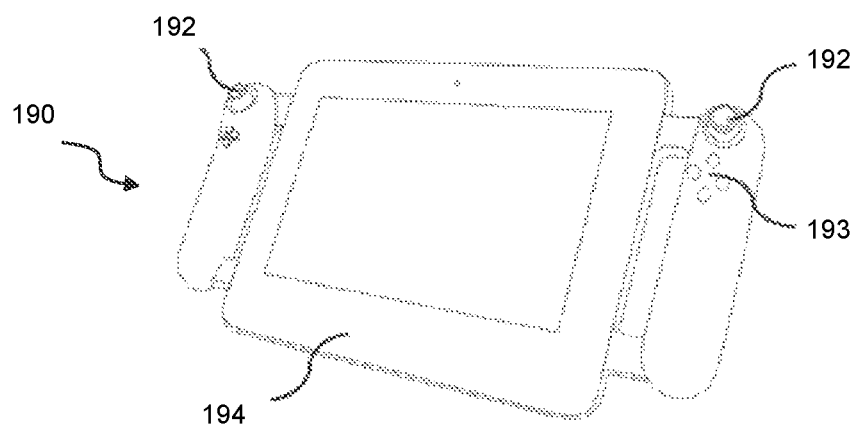

FIG. 18a depicts a mobile phone 174 that may be used as a connective device to control a gaming robot. Mobile phone 174 features a tactile display screen 185 on its front and a video camera 186 on its back. The display 185 of mobile phone 174 displays a user interface 180 (shown in detail in FIG. 18a(ii)). The gaming robot 181 user interface 180 comprises, in this example, a first thumb operated (via the tactile screen 185) control pad 181 that is used to direct the gaming robot 171 in all directions (forward, backward, left, right, clockwise rotation, counter-clockwise rotation for example). The user interface 180 also comprises, in this example, a second thumb operated (via the tactile screen 185) control pad 182 that is used to select various skills and items that may be used during game play (weapons, healing power, opponent scanning, additional life for example). One or more of these control pads 181, 182 implement a game controller as discussed herein, e.g. the tactile screen 185 and user interface 180 comprise the game controller. The user interface 180 is provided as an example only, and the configuration may change depending on the implementation of the gaming robot software application.

The user interface 180 also comprises a "status" display 183 of the robot status as well as an "augmented reality" display 184. The "augmented reality" display 184 is used in conjunction with the video camera 186. Augmented reality display 184 broadcasts a real-time picture of the physical gaming robot 171 and its environment as captured within the field of view of camera 186, augmented with virtual reality features such as virtual opponents, a virtual environment/surroundings, and/or or virtual weapon effects. These virtual weapon effects may be synchronised with physical movement effects or sequences (so-called physical "animations") of the gaming robot.

Figure 18B:
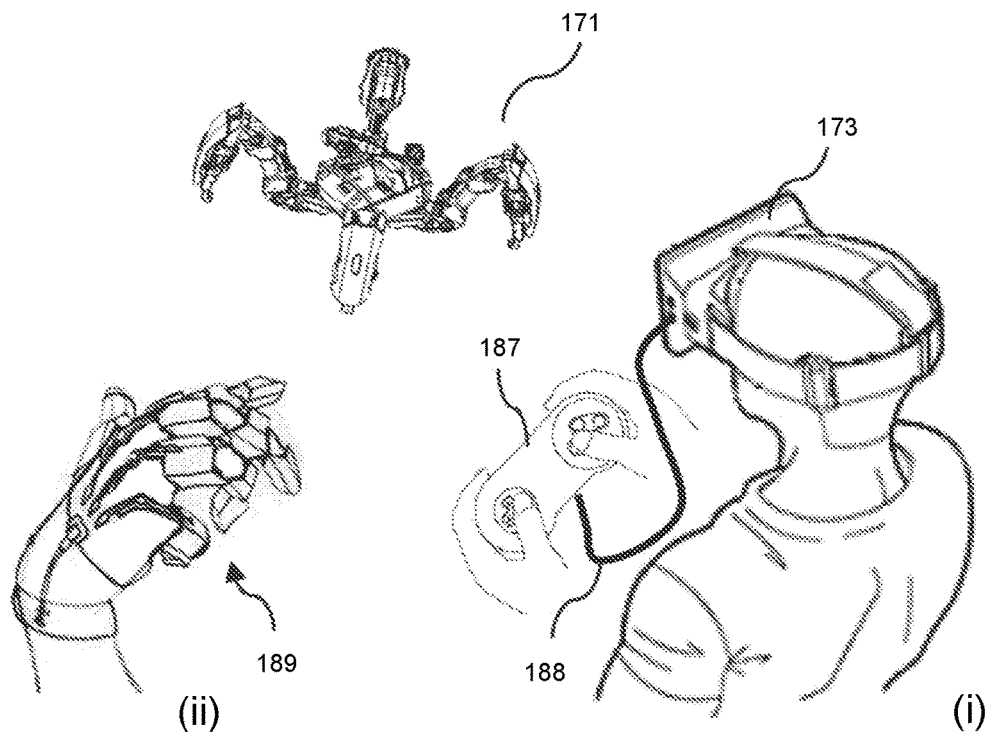
FIG. 18b shows further example remote computing devices for controlling a gaming robot.

FIG. 18b depicts a pair of augmented reality goggles 173 that may be used as a connective device to control a gaming robot. In the illustrated example the user interface 180 (which in this example is the same as the user interface 180 displayed by the mobile phone 174 of FIG. 17a) is displayed on the screen of goggles 173. The user 170 may still require an additional hand operated remote control to control the robot 171 device. Such a hand operated remote control may, for example, be similar to a controller normally used to play video games such as a gamepad 187 (as shown in FIG. 18b(i) or a connected glove 189 designed to control the robot 171 by moving fingers in a predefined manner (as shown in in FIG. 18b(ii)). In such examples, the gamepad 187 or glove 189 may be plugged into the goggles 173 with an electric cable 188, or alternatively may be wirelessly connected to the goggles 173 using wireless transmission (for example "WiFi" or "Bluetooth"). In certain cases, the augmented reality googles 173 may comprise an embedded computing device, e.g. a processor similar to that found in a smartphone, and as such a separate connective device may not be required.

In some examples (not illustrated) a mobile phone or tablet may be docked with a docking station comprising control buttons and/or one or more joysticks, to provide the user with a more ergonomic gamepad (i.e. similar to that of a video game controller) and/or in order to free-up space on the display of the mobile phone/tablet and thereby enhance gameplay. As such a game controller may be provided by a computing device or by a computing device plus additional components.

In one configuration of a gaming robot, the robots may be controlled with dedicated remote controllers with limited functionality to reduce the cost to the user. In this configuration the remote controllers may use cheaper wireless communication method such as infrared and have no provision to connect to the internet or to wireless networks. In this configuration the robot would act as interface with the cloud. This configuration would offer a solution where the user does not require a smartphone, tablet computer or a pair of augmented reality goggles. Instead an affordable remote controller with limited connectivity or processing power would be supplied with the robot. In this case, the computing device may comprise a gaming server located in the cloud (e.g. that implements the gaming robot software application) and/or an embedded controller within the remote controllers.

Figure 20:
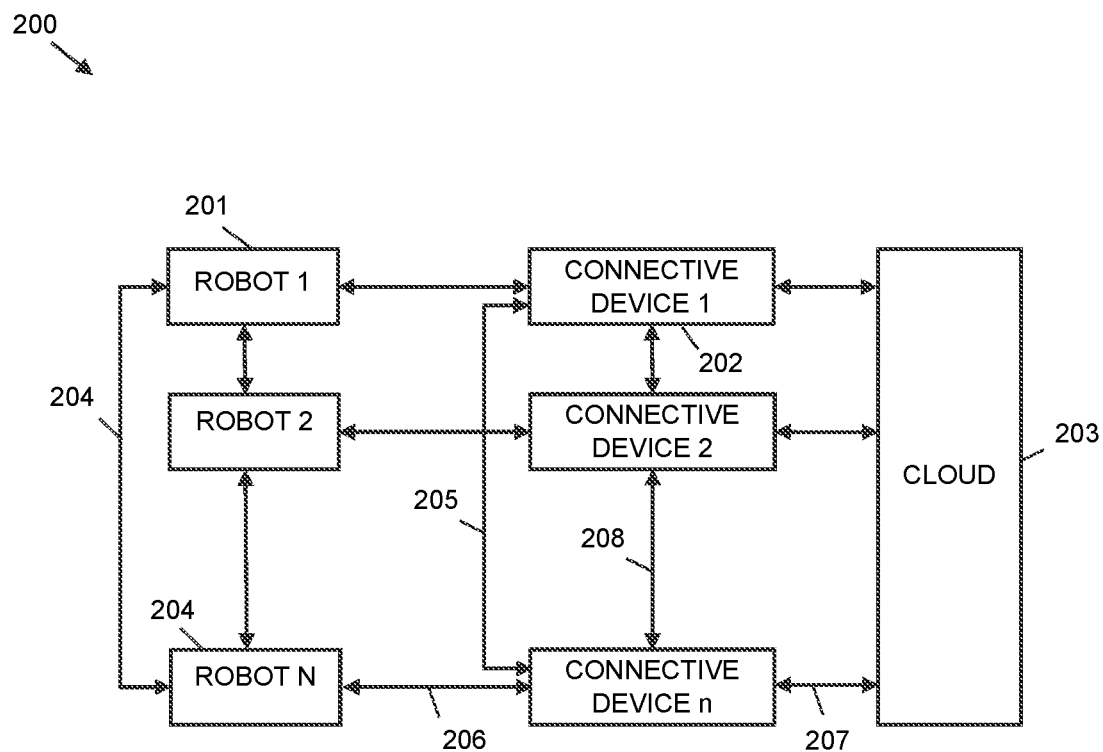
FIG. 20 is a schematic diagram of an example architecture for a gaming robot communication infrastructure.

FIG. 20 illustrates an example top level architecture of the gaming robot communication infrastructure 200. An unlimited number of gaming robots 201 may be used at any moment in time. Each gaming robot 201 is controlled by a player using a connective device 202 (e.g. smartphone, a computer tablet or a pair of augmented reality goggles). The robots 201 are able to communicate with each other via a wireless (e.g. WiFi or Bluetooth) data transmission 204. The connective device 202 are also able to communicate with each other via a wireless (e.g. WiFi or Bluetooth) data transmission 205. It may also be possible for each connective device 202 to interrogate directly any robot 201 via a wireless (e.g. WiFi or Bluetooth) data transmission 206. In this instance any connective device 202 may be used to interrogate any robot 201 to access robot information such as identification and ownership however at any moment in time only one connective device 202 is able to control one robot 201. This interrogation may be made according to a gaming robot communication protocol configured to structure communications between a main processing module of a gaming robot and a gaming robot software application operating on a connective device. Each connective device 202 may also be connected to a data server (e.g. the cloud or a gaming server) 203 via an active internet connection 207. The cloud 203 stores a number of gaming robot variables such as statistical data or player/robot profiles. The cloud 203 also acts as a market place where new skills, attributes or components may be purchased by the user via the connective device 202. If robot 201 is within range of a wireless network connection, it may also be possible for the robot to directly communicate with cloud 203. This may be the case where a gaming robot is provided with a WiFi interface upon the main processing module.

In one example, location information may be exchanged between gaming robots 204 via wireless data transmission channel 204. In other examples, this may also comprise an infra-red channel. Wireless data transmission channel 206, e.g. a Bluetooth channel, may be used to exchange data identifying gaming robots, e.g. primary and secondary modules including main processing modules, and to send control data between the gaming robots and controlling connective devices. Game information may be synchronised over a wireless communication channel 208 between connective devices, e.g. over a local wireless (WiFi) network. Game information may comprise robot positions (e.g. in a co-ordinate system for the game environment) and battle data (e.g. attack and defence points). Game statistics, health and identifying data may be sent over active internet connection 207 to a data server implementing the cloud. In certain cases, user may be able to take part in games using connective devices even if they do not have an associated gaming robot. For example, in a virtual world users may be able to "throw" weapons such as "bombs" to inflict damage on robots or entities in the game environment.

Figure 21:
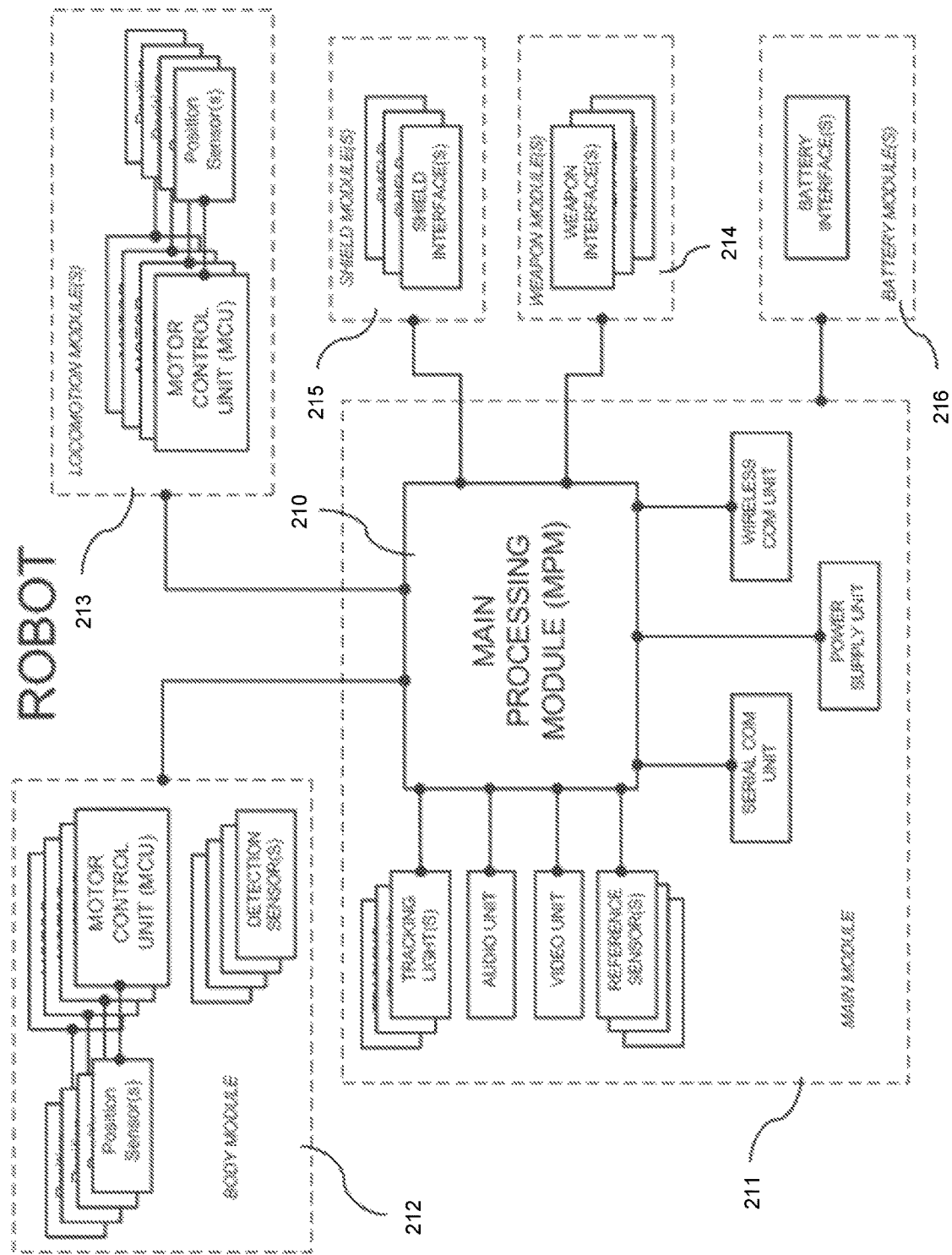
FIG. 21 is a schematic diagram of an example system architecture for a gaming robot.

FIG. 21 depicts a detailed view of the robot 201 system architecture. The architecture of robot 201 essentially revolves around a main processing module (known as MPM) 210 housed within the main module 211 of robot 201.

The main processing module may comprise a reduced instruction set computer (RISC) using a Microprocessor without Interlocked Pipeline Stages (MIPS) instruction set. It may comprise a number of registers (e.g. 32) and be, for example, 32 or 64-bit. Control firmware for the main processing module may be written in C/C++ and compiled using a suitably adapted C compiler. In one example implementation, the main processing module comprises a PIC32x microcontroller. Other microcontrollers may be used in other implementations. In this example, within the main module 211 of robot 201, the main processing module 210 interfaces with tracking lights, audio and video devices, reference sensors, wired and wireless communication units and the power supply unit. As part of the main module 211 of robot 201, the main processing module 210 also interfaces with other robot modules and in particular the body module 212, the locomotion modules 213, the shield modules 215, the weapon modules 214 and the battery module 216. In an alternate embodiment, the body module 212 components may be integrated into the locomotion module components 213, e.g. a motor control unit (MCU) for at least one prime mover of a hip joint may be co-located in a leg module with a motor control unit (MCU) for the plurality of prime movers in the thigh joints. Each MCU may interface with a separate set of position sensors, where each position sensor may sense the position of a corresponding joint prime mover (or joint structure). Examples of position sensors are described above with reference to FIGS. 3-9. In this alternate embodiment the detection sensors may remain in the body module 212, or may be incorporated into the main module 211. The MCU may form part of a locomotion microcontroller. The locomotion microcontroller may comprise a 16-bit microcontroller. In one example implementation, the locomotion microcontroller comprises a PIC16x microcontroller. Other microcontrollers may be used in other implementations.

In one case, the shield interface(s) 215 may be provided by an electrical connection that passes through the locomotion module. In one case, a microcontroller that implements the MCU of a locomotion module may also be configured to provide a shield interface 215 for that particular locomotion module, e.g. the microcontroller may read and store data identifying the shield module on startup after attachment, wherein the main processing module 210 may request said data from the microcontroller of the locomotion module. In another implementation, the main processing module may be able to read data identifying the shield module via a data line communicatively coupled to the main processing module that passes through the locomotion module. The data line may comprise a conductive path through the locomotion module to a shield memory or microcontroller, e.g. wherein the data is read as bits of data via asynchronous communication by a universal asynchronous receiver/transmitter (UART) device. The data line may form part of a system bus for the robot, such as a Controller Area Network (CAN) bus. In one case, the shield interface 215 may comprise an interface similar to that shown in FIG. 26b.

Figure 22:
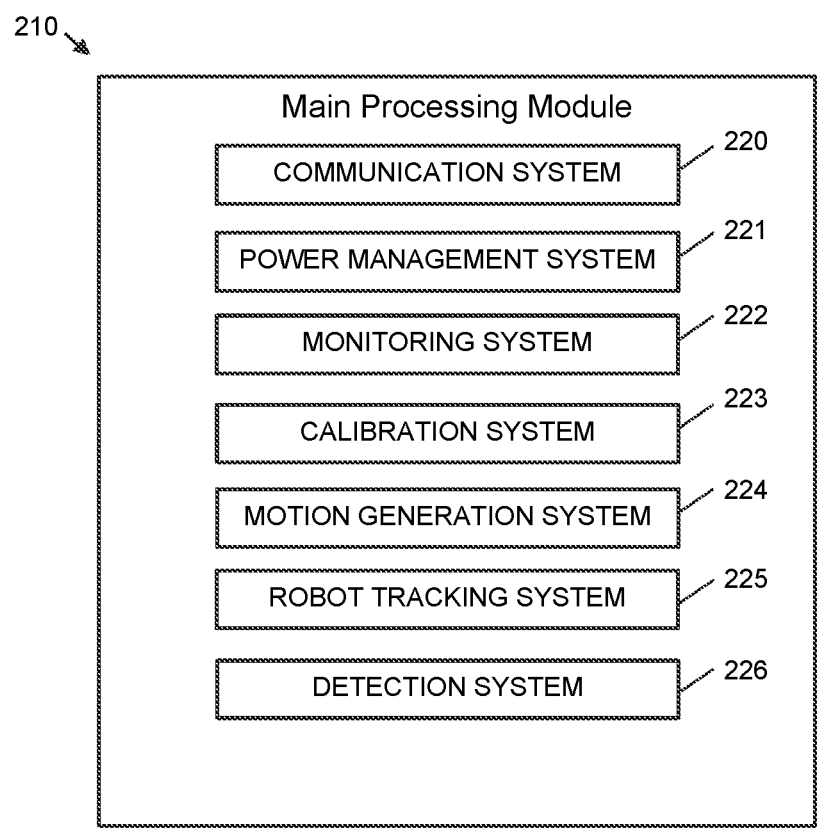
FIG. 22 is a schematic diagram of the systems of an example gaming robot main processing module.

FIG. 22 further details the systems found in the main processing module 210 and the functions these systems perform. As discussed above, communication may take place over a system bus and/or individual data lines (e.g. for serial communications).

The function of the Communication System 220 is to handle all wired (e.g. USB during programming) and wireless (e.g. Bluetooth, WiFi during game play) communications between the robot 201 and its connected environment.

The function of the Power Management System 221 to supply the robot 201 with both primary and secondary power supplies, this is achieved by regulating the battery module 226 voltage from a typical 9 Vdc supply down to 6 Vdc for the motors supply and 3.3 Vdc for other electronic components. Another function of the Power Management System 221 is to manage the charge and discharge of rechargeable batteries as required.

The function of the Monitoring System 222 is to provide a status of the health of the robot 201 including for example power bus voltage, motors current draw, robot power consumption, battery discharge rate or the temperature of key components. The Monitoring System 222 may receive information from components of the primary and/or secondary modules, e.g. from locomotion module(s) 213 or body module 212. Temperature may be provided as a current, maximum and/or minimum temperature measurement (e.g. over a defined period or since a value reset). Breaches of a temperature safety threshold as measured by one or more electrical circuit thermistors may also be reported. Other fault information may also be reported to the Monitoring System 222, e.g. in the form of communication or motor driver errors. Fault information may also comprise electrical measures, e.g. current thresholds breached The Monitoring System 222 may also compute and store a measure of joint movement, e.g. a distance travelled in miles, kilometres, yards or metres. This may be provided per prime mover from locomotion module MCUs based on rotation counts, e.g. using position sensors.

The function of the Calibration System 223 is to calibrate the robot 201 sensors during game play and in particular the compass used as part of the tracking system as well as accelerometers, gyroscope, GPS or altimeter (e.g. for a flying robot) as required. The Calibration System 223 may instruct locomotion modules 213 to perform calibration routines and provide calibration measurements. For example, a locomotion module or prime mover may be instructed to move a set distance and the time for the movement may be measured. The locomotion modules 213 may comprise accelerometers that provide data during these calibration routines. A calibration routine may comprise a compound movement of two or more prime movers, e.g. a "lift, rotate and drop" movement of a leg. The Calibration System 223 may also receive calibration information from coupled primary and/or secondary modules, e.g. factory offsets for joint position measurements. The Calibration System 223 may also be configured to obtain firmware updates for the main processing module 210 or other modules 212-216. In one case, the main processing module 210 may obtain firmware updates for one or modules 212-216, e.g. from a cloud data server, and communicate these updates to microcontrollers of said modules (e.g. during an update mode of said microcontrollers).

The function of the Motion Generation System 224 is to generate low level commands to the robot joints (e.g. prime movers outputs) in response to high-level commands received from the phone or goggles 202 used to control the robot 201. This is achieved using a kinematics engine and kinematic, e.g. position/speed, feedback from each of the prime movers motor controllers/position sensors. The low level commands may comprise joint position and speed commands, e.g. move joint or prime mover P to rotary position R at speed S (or by time T). During motion the kinematic feedback may be used to adjust control, such as adjust the low level commands (e.g. increasing the speed if the joint or prime mover is not at a predefined position at a predefined time). The low level commands that are supplied by the main processing module 210 may be further processed by the MCUs of each locomotion module 213. For example, one level of feedback adjustment may be enacted by the MCU and a higher level of feedback enacted by the Motion Generation System 224. In this way, each locomotion module 213 may perform low level parallel computation under the control of the main processing module 211. Position information may be provided in the form of a current angle of a joint, as calibrated by the locomotion module MCU and the main processing module. In one case, depending on a desired joint position, an MCU may determine a current leg position and then determine how much power to apply to the prime mover. In certain cases, an MCU may apply gravity compensation based on data accessible to the MCU indicating leg position (e.g. data stored in a memory of the MCU). In certain cases, dead band filters may be used to reduce leg jitter when a measured leg position is close to a desired leg position.

In certain implementations, the kinematics engine of the Motion Generation System 224 is used to enact dynamically-generated motion, e.g. motion initiated under the control of the user using a game controller such as "move forward", "move left", "rotate". In these cases, the Motion Generation System 224 may also comprise a memory to store one or more movement programs. These movement programs comprise a sequence of prime mover actions to implement a repeated motion. A movement program may be associated with a particular secondary module and/or "skill". For example, a "stomp" motion (e.g. raising one or more legs and then lowering said legs with a fast speed and/or high acceleration) may be associated with a "stomp" skill. This skill may only be available after attaching a particular secondary module. The user may be presented with a "skill" button, e.g. on a touchscreen interface or gamepad, such that when the button is pressed or activated the connective device sends a command to the Motion Generation System 224 to activate and implement the "stomp" movement program. This motion may be repeated every time the user presses the appropriate button. In other cases, a movement program may be associated with a game event (e.g. victory, loss, power-up), battle move (e.g. defence and/or weapon firing) and/or physical movement (e.g. a particular sequence of button presses).

The function of the Robot Tracking System 225 is to assist the phone or goggles 252 in tracking the robot in space during game play, in particular for the purpose of augmenting the reality of the game. This is achieved primarily by sequencing/controlling tracking lights throughout gaming robot 201 (typically on the main module 211 and/or on the locomotion modules 213) to compute a position and a direction. The tracking may be enhanced by the use of on-board sensors, when available, such as a compass, gyroscope or accelerometers.

The function of the Detection System 226 is to allow the robot to detect opponents (e.g. other robots) as well as its environment (e.g. obstacles) during game play. This is achieved by using detection sensors (e.g. infrared LED and receivers, typically in body module 212) to compute directions as well as on-board camera (typically inside the head of the robot 201 on main module 211) to compute distances. The audio unit (e.g. speaker and microphone) housed with main module 211 may also be used to detect an opponent by emitting and listening to specific sound patterns.

The function of the Smart Module System 227 is to detect the presence and identification of shields or weapons attached to the robot and to relay the information to the phone or goggle 202 used to control the robot 201 in order to update the attributes of the robot within the game environment. The Smart Module System 227 thus obtains data from the secondary module via the electrical interface, and transmits the data to the connective computing device. In one case the Smart Module System 227 may send a request to read the data to a microcontroller embedded in the secondary module, wherein the microcontroller responds with data such as that shown in FIG. 27. Alternatively, the Smart Module System 227 may request this data from microcontrollers embedded in locomotion or other primary modules, wherein the data is read by those microcontrollers upon attaching the secondary module and powering up the gaming robot (e.g. a series of requests for data may be made on a supplied data channel as part of a boot routine).

Another function of the Smart Module System 227 is to control the lights that may be embed within the shield module(s) 215 and the weapon module(s) 214 to add visual effects during game play.

Another function of the Smart Module System 227 is also to identify the type of locomotion module 213 connected to robot 201 (e.g. legs, wheels or propellers) to inform the Motion Generation System 224 of the configuration of the robot (e.g. walking, rolling or flying). For example, a microcontroller embedded in the locomotion module 213 may comprise a memory that also stores data store data identifying the locomotion module, e.g. in a similar manner to obtaining the data identifying the secondary modules.

Figure 23:
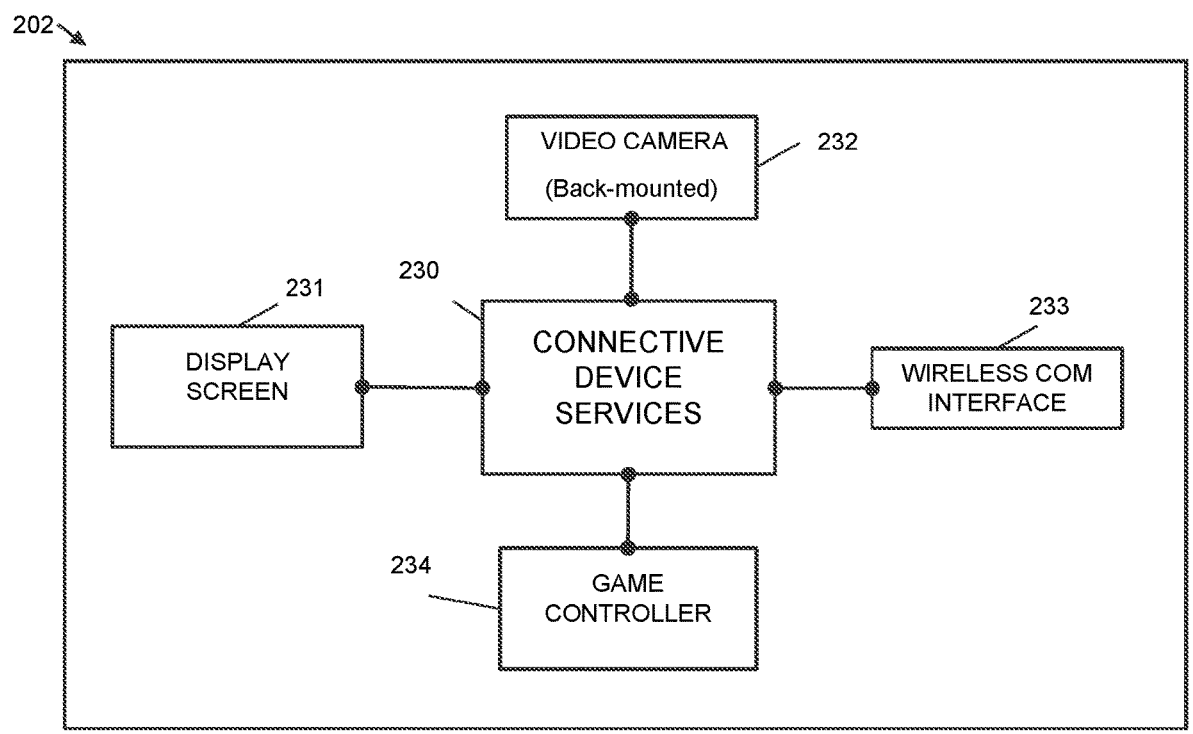
FIG. 23 is a schematic diagram of an example system architecture for a remote computing device for controlling a gaming robot.

FIG. 23 depicts a schematic view of the system architecture of connective device 202. The architecture of connective device 202 is based around the core processing unit 230 (known as CPU) of the connective device (e.g. mobile phone, tablet or augmented reality goggles). The CPU 230 implements the connective device services, i.e. the gaming robot software application. The connective device 202 is equipped with a display screen 231 that acts as a user interface with robot 201. A game controller 234 is also required to allow the user to control robot 201. A wireless communication interface 233 (e.g. WiFi or Bluetooth) is used to wirelessly control robot 201. An optional video camera 232 may be provided if augmented reality is enabled. Game controller 234 may take several forms depending on the type of connective device 202 used to control robot 201. When using a phone 174 as a connective device 202, the thumb operated tactile screen 185 of phone 174 may be used, as depicted in FIG. 17 and FIG. 18A, and would essentially constitute of a virtual (on screen) gamepad. To further enhance user experience, a docking station 190 may be used to dock a phone 191 or a tablet 194 and provide the user with a physical gamepad, as further depicted in FIG. 19*a-b*.

One of the benefits of having a docking station 190 is that it frees space on phone 191 or tablet 194 display 185 to enhance the gaming experience, in particular if augmented reality is implemented. If augmented reality goggles 173 are used instead of phone 191 or tablet 194, then either a gamepad 187 or connected gloves 189 may be used as a game controller 234. A tactile screen 185 of phone 174 may also be used, e.g. it may be thumb-operated and used instead of, or together with, gamepad 187 or connected gloves 189.

Figure 24:
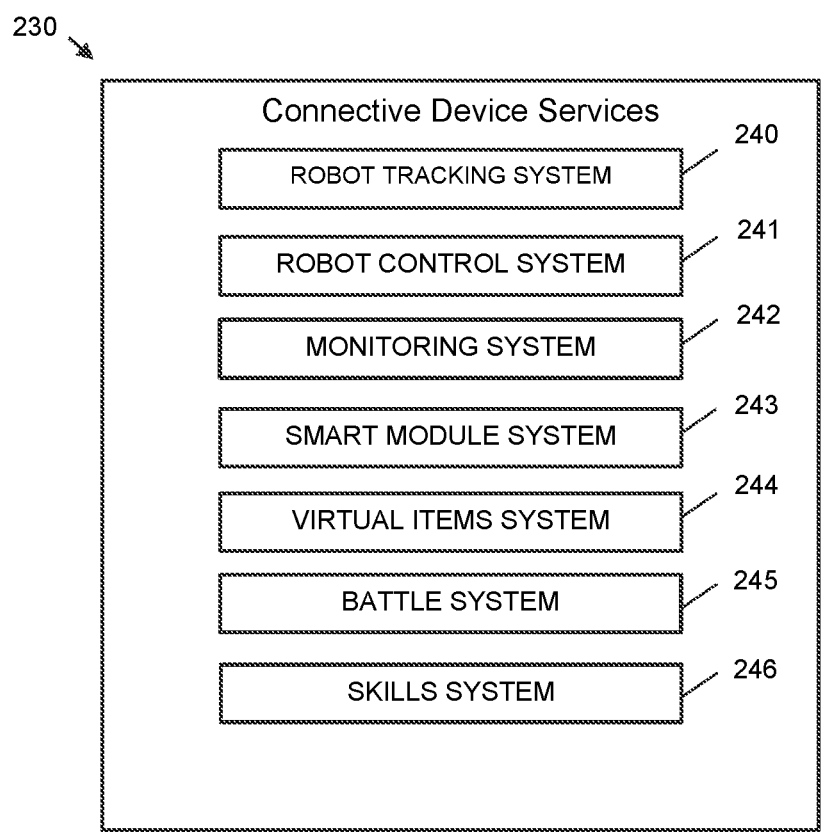
FIG. 24 is a schematic diagram of the systems of an example remote computing device for controlling a gaming robot.

FIG. 24 further details Connective Device Services 230 and the functions these services perform.

The function of the Robot Tracking System 240 is to incorporate into the game the position, orientation, scale and attitude of the robot based on the tracking data provided by robot 201 and to use this information to augment reality during gameplay on the display of connective device 202 (phone/table/goggle). This may take the form of additional characters or obstacles as well as special effects such as flames, laser beam or explosions.

The function of the Robot Control System 241 is to send the high-level commands inputted by the user via game controller 234 to robot 201 wirelessly. In one case, the Robot Control System 241 may be configured to compute a homogeneous transformation matrix. This matrix may effect an affine transformation. Values within the homogeneous transformation matrix may be communicated to the gaming robot as high-level commands, e.g. to be performed in a given time period of t seconds. In one case, the movement of the gaming robot may be assumed to take place in a two-dimensional (floor) plane, as such movement may be determined in a two-dimensional space. This dimensional space may not be explicitly visualised in the gaming robot software application, for example it may model the physical space as a framework for an augmented reality display (e.g. virtual features overlaid over a video feed). Given a current angle of rotation for the gaming robot θ (e.g. with respect to a "forward" facing direction of the robot), and a current x and y co-ordinate of the robot (e.g. a centre point) in the two-dimensional space representing a floor plane, then a weighted homogeneous transformation matrix may be computed as:

$$\begin{pmatrix} \cos\theta \cdot \omega_t & -\sin\theta \cdot \omega_t & x \cdot v_t \\ \sin\theta \cdot \omega_t & \cos\theta \cdot \omega_t & y \cdot v_t \\ 0 & 0 & 1 \end{pmatrix}$$

where $v_t$ is a translation velocity computed as:

$$v_t = (v_{last} + a \cdot t) \cdot s_v$$

where $v_{last}$ is a previous or last velocity of the gaming robot, e.g. the velocity at the start of a fixed interval of t seconds in which the gaming robot is to perform the transformation operation, $s_v$ is a normalised velocity scaling factor representing game-mechanic features, and a is a constant translation acceleration. The constant translation acceleration, a, may be computed as:

$$a = \frac{1}{m} \cdot s_a$$

where m is a normalised mass of the gaming robot, and $s_a$ is a normalised translation acceleration scaling factor representing game-mechanic features. The mass is normalised with respect to a maximum carrying mass of the robot. The angular (i.e. rotational) velocity for the gaming robot, $\omega_t$, is computed in a similar manner, e.g. as:

$$\omega_t = (\omega_{last} + \alpha \cdot t) \cdot s_\omega$$

where $\omega_{last}$ is a previous or last angular velocity of the gaming robot, e.g. the angular velocity at the start of a fixed interval of t seconds in which the gaming robot is to perform the transformation operation, $s_\omega$ is a normalised angular velocity scaling factor representing game-mechanic features, and α is a constant angular (i.e. rotational) acceleration. The constant angular acceleration, α, may be computed as:

$$a = \frac{1}{m} \cdot s_a$$

where m is a normalised mass of the gaming robot, and $s_\alpha$ is a normalised angular acceleration scaling factor representing game-mechanic features. Using these equations, robot attributes may either be used to change the normalised mass of the gaming robot, m, or by changing one or more of the scaling factors: $s_v$, $s_a$, $s_\omega$, and $s_\alpha$. For example, a current configuration of the gaming robot, as determined during a start-up routine where data identifying modules is retrieved from module memory, is used to calculate either the normalised mass or one or more of the scaling factors, these variable values then being used by the gaming robot software application to compute high-level commands. This may be performed by the Smart Module System 243 as described below. In certain cases, virtual items and/or other game effects may also modify one or more of the normalised mass and one or more of the scaling factors, e.g. they may further modulate or change these values.

The function of the Robot Monitoring System 242 is to collect data on the health/status of robot 201 and update the robot status 183 on the user interface 180 with basic status information as described in FIG. 18A. More comprehensive health/status data is also uploaded to cloud 203 for storage and analysis.

The function of the Smart Module System 243 is to collect a status of the modules (e.g. weapons, shields, screen, type of locomotion module) attached to robot 201. The Smart Module System 243 provides inputs to the Battle System 245 that updates the gameplay accordingly by altering robot 201 attributes.

The function of the Virtual Items System 244 is to collect a status of the virtual items owned by the user (e.g. cooling potion, healing potion, damage booster or speed booster). The Virtual Items System 244 provides inputs to the Battle System 245. Unlike physical smart modules (e.g. shields or weapons), virtual items are non-physical and cannot be "detected" by the robot. Instead virtual items are stored against a player/robot profile stored into cloud 203 and on connective device 202. Virtual items can be purchased online from a market place within cloud 203.

The function of the Battle System 245 is to compute the outcome of a battle based on data from other systems of robot 201. The outcome of a battle would for example be computed based on data from the Robot Tracking System 240, data from the Skills System 246 as well as data from the smart module system 243. For example upon detecting that a "Heavy" shield is installed, the Battle System 245 would make robot 201 more resilient to attacks and more tolerant to damages but the Battle System 245 would also slow robot 201 movements to reflect the bulk and weight of the "Heavy" shield.

The function of the Skills System 246 is to manage the skills that may become available to the player/robot over time. Skills (also known as perks) can be earned by the player/robot as he or she progresses (also known as levelling up) through the game. These skills can grant gameplay benefits to the player. For example, new skills may give the player/robot the ability to perform a new action, or giving a boost to one of the player/robot attributes. Skills are an input to the Battle System 245 and assist in computing the outcome of a battle. For example, as a gaming robot reaches a particular level (e.g. as stored in the robot profile and calculated based on the number of battles won or the like), new movement programs may become available. These may be "signature" moves, e.g. that are activated when a battle is won or when a particular weapon is fired. For example, at one level a gaming robot may unlock a "duck" move that enables evasion of particular weapon attacks. This may have an associated movement program that is downloaded by the main processing module when the level is unlocked. Hence, as a gaming robot is used, its physical behaviour evolves.

In one case, events in a virtual game environment may also effect the physical movement of a gaming robot. For example, damage may slow down a gaming robot by modifying robot attributes in a similar way to attached secondary modules. Damage may also activate particular movement programs, e.g. a sequence of movements may simulate a damaged leg module by reducing the range and speed of movement of the leg. Similarly, items collected in the game environment, such as power-ups, may increase speed of movement or unlock new movements. Virtual objects in a game environment may also effect the physical movement of a gaming robot. For example, a virtual wall or object, such as a cube located on a floor plane, may be interpreted by the gaming robot as a real physical object in the space surrounding the robot, such that it navigates around the virtual object in the physical space. This may be implemented by computing, within the gaming robot software application, a virtual bounding volume around a tracked gaming robot. This then is used to test for intersections with the virtual scene, e.g. movements of the gaming robot and computed to avoid intersections of a bounding volume representing the extent of the gaming robot in the virtual game environment and any present virtual objects. From a viewpoint of a user, when walking up to a virtual object in an augmented reality world, the gaming robot would behave similarly to walking up against a real object in the physical world.

Figure 25:
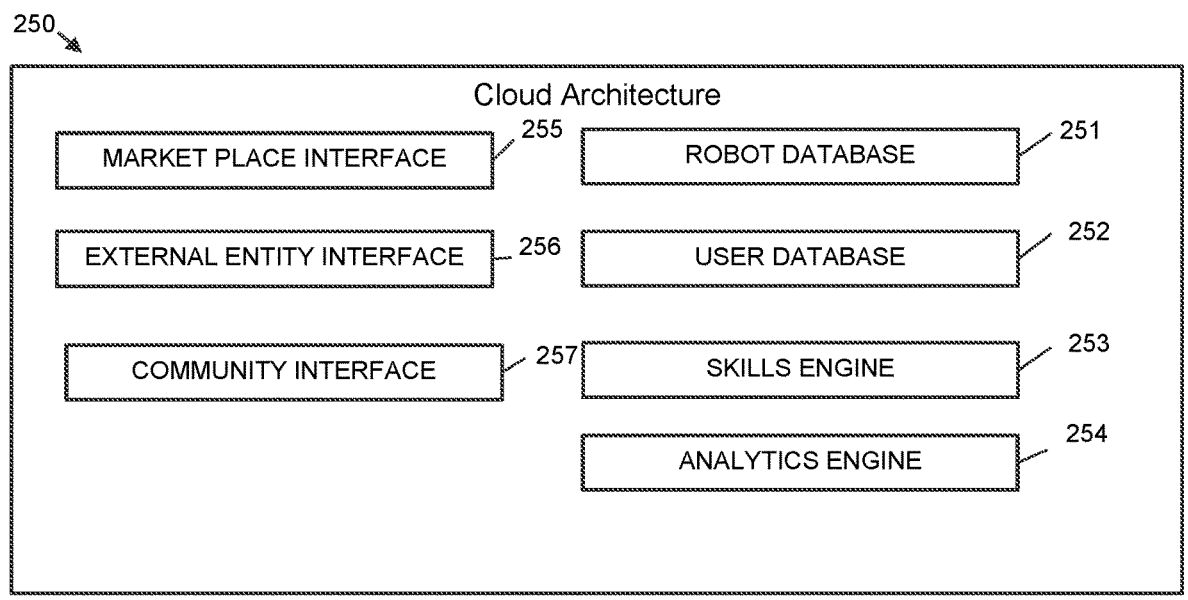
FIG. 25 is schematic diagram of an example architecture of a cloud-based computing system for use with a gaming robot.

FIG. 25 details the architecture 250 of cloud 203 and its specific functions.

The function of the Robot Database 251 is to store data relating to each and every robot 201 and in particular skills, smart modules, virtual items available and game statistics. The Robot Database 251 data is used as part of the game analytics and some of the data may be accessed by other users and members of the Community 257. An important aspect of the robot database is to collect the unique identifiers of each robot 201 and each robot smart module (e.g. locomotion module 213, body module 212, weapon module 214, shields 215) to verify the legitimacy of each robots and protect against counterfeiting as well as assist with customer support, warranty claims or product recalls for example.

The function of the User Database 252 is to store data relating to each and every user 170, for example the status and profile of a user, usage statistics and robot ownership (if such user owns more than one robot). The User Database 252 data is used as part of the game analytics and some of the data may be accessed by other users and members of the community.

The function of the Skills Engine 253 is to pool all available skills (also known as perks) and manage the allocation/granting of skills to users/robots based on the data available from the Robot Database 251 and the User Database 252. Skills may be earned by the user as he or she progresses through the game.

The function of the Game Analytics Engine 254 is to utilise all the data collected for example via the Robot Database 251 and User Database 252 analyse and improve gameplay and user experience. An example of metrics used by the Game Analytics Engine 254 may be Playing time and frequency, preferred weapons, most effective shields, success rate, game progression, demographics. These metrics may be used to identify patterns and improve game play and user experience as a whole but may also be used to tailor the contents offered to each and every user by analysing individual data stored in databases 251 and 252.

In certain examples, the Games Analytics Engine 254 may analyse gameplay data and modify robot attributes based on this analysis. For example, attributes may be adjusted to effect virtual ageing of a gaming robot. This may manifest in slower robot movements, similar to the effect of "heavy" secondary modules. For example, it may be determined that a gaming robot has walked M miles or completed B battles, and robot attributes that are stored in a robot profile may be modified in proportion to these metrics, e.g. by increasing mass or decreasing an in-game scaling factor. In one case, prime mover performance may naturally degrade with use; in this case, physical speed of movement may also reduce independently of any modification of robot attributes. However, to often damage and to extend the life of prime movers, physical robot speed may be reduced by a greater amount than occurs through physical degradation, for example by halving a prime mover speed a number of playable battles before replacement may be extended. Similarly, newly replaced modules, e.g. leg modules, may have an enhanced speed (beyond that naturally provided by new motors) as set by the robot attributes to indicate a rejuvenation effect.

The Games Analytics Engine 254 may also indicate that certain modules need replacing, e.g. based on received health and fault data as stored within the robot profile. This data may also facilitate repair, e.g. a module may be taken to a repair shop where an identifier for the module may be read. Using the identifier the robot profile for the part may be retrieved. By analysing fault and health information a diagnosis may be made as to what is wrong with the part and an appropriate repair operation instructed (e.g. motor driver error may indicate a faulty microcontroller or firmware, whereas a high maximum temperature may indicate a malfunctioning electrical component on a printed circuit board). In one case, predictive analytics may be applied based on an analysis of multiple gaming robots, e.g. certain patterns of control data may indicate a known problem. A user may then be notified in advance or a replacement module may be shipped.

The function of the External Entity Interface 256 is to allow the user access to licensed contents providers and for example purchase new games or access to authorised licensed retailers and purchase additional smart modules. The External Entity Interface 256 may also allow authorised advertisement during gameplay or be used to exchange/sell data with external partners.

The function of the Community Interface 257 is to allow user/players to exchange information via forums or social media, share robots/users profiles, manage/organise events such as tournaments.

Figure 26A:
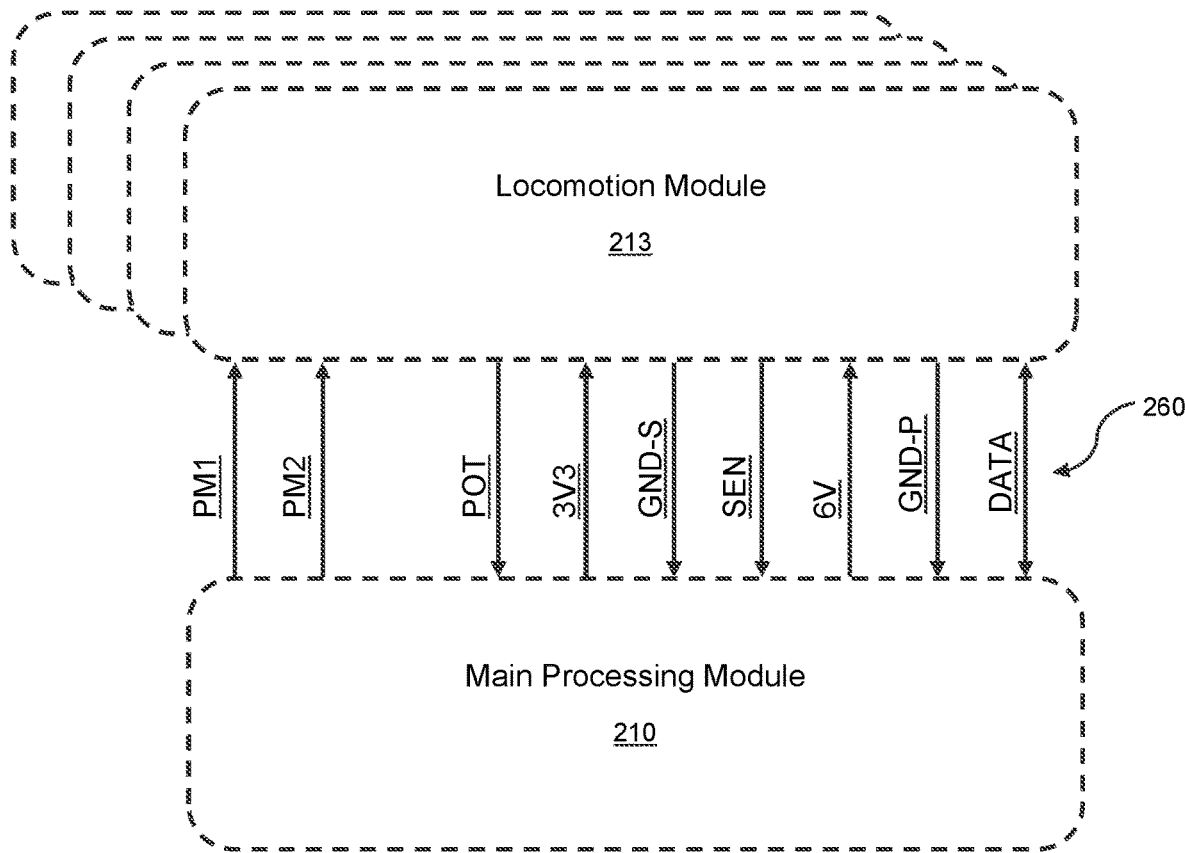
FIG. 26a is a schematic diagram showing an example set of electrical connections for a locomotion module coupling in a gaming robot.
Figure 26B:
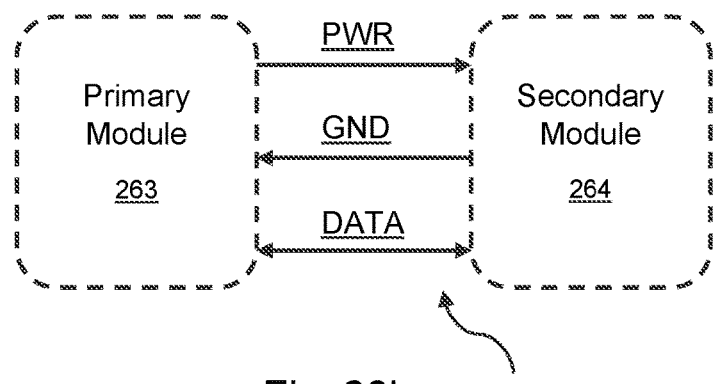
FIG. 26b is a schematic diagram showing an example set of electrical connections for a secondary module coupling in a gaming robot.

FIGS. 26a and 26b schematically illustrate the electrical connections between example primary and secondary modules.

FIG. 26a shows a main processing module 210 that is electrically coupled to a locomotion module 213. The locomotion module 213 may comprise a leg module as described above. The connections may be duplicated four times to control four separate leg modules. The connections may form part of a main-to-leg module interface. In FIG. 26a, the leg module includes both the thigh prime movers and the hip prime movers as described above, in other cases the leg module may include the thigh prime movers without the hip prime movers. FIG. 26a shows ten separate electrical connections 260: PM1—a connection for a first prime mover control signal; PM2—a connection for a second prime mover control signal; POT—a connection for a position feedback signal; 3V3—a 3.3 Volt direct current power supply; GND-S—a ground channel for the 3.3 V supply; SEN—a connection for a sensing channel indicating the presence of a leg module; 6V—a 6 Volt direct current power supply; GND-P—a ground channel for the 6 V supply; and DATA—a connection for a serial data communication channel. One of PM1 or PM2 may carry a PWM signal to control a motor for hip rotation (e.g. about axis 16; another of PM1 or PM2 may carry a PWM signal to control a motor for thigh rotation (e.g. about axis 15) or a PWM signal to control a motor for foot rotation (e.g. about axis 14), wherein in the latter case two motor signals may share a common line (in other implementations additional control lines may be provided). In certain cases, the signals may directly control the prime mover; in other cases one or more of the signals may comprise control data for a hip or thigh MCU, wherein the MCU computes a PWM signal from said control data. The POT connection may carry position data from each of the position sensors on the leg module (e.g. supplied serially). Alternatively, three separate channels may be provided in other implementations. The 3V3 and 6V connections, and the corresponding GND return connections may be used to power the prime movers and one or more active electronic components (e.g. motors or LEDs on secondary modules). The SEN connection may be used by the main processing module 210 to detect the presence of a leg module 213. In a simple case, the SEN connection may simply be a return for the 3V3 power supply. Hence, when no locomotion module 213 is attached there is no voltage on this connection, however when the locomotion module 213 is attached the SEN connection is raised to a voltage of 3V3 (or below). The DATA channel may be used to obtain data identifying the locomotion modules and data identifying any attached secondary modules. It may also be used to send other commands and requests to the control logic of the locomotion module 213. The DATA channel may be a UART or other serial data channel. The DATA channel may also communicate data between the microcontrollers (or processors) of the primary and secondary modules, e.g. between a processor of the main processing module and microcontrollers in at least one of a locomotion module and a secondary module. The DATA channel may also be used for firmware upgrades.

FIG. 26*b* shows an example electrical interface 262 between a primary module 263 and a secondary module 264. This electrical interface 262 may be provided by connecting pins 164 and sockets 165 as shown in FIG. 16; or by shield interfaces 1003 and 1004, 1006 and 1008, or 1103 and 1104. At least three connections are provided: a first channel PWR carrying a power supply; a second channel GND for a ground signal; and a third channel DATA for data exchange. For secondary modules that are coupled to a locomotion module, e.g. the shields of FIGS. 10*a-b* and 11, the connections 262 may be respectively electrically coupled to the 6V, GND-P and DATA connections of 260. This allows the main processing module 263 to read or otherwise obtain data identifying the secondary module 264 from a memory of said module.

Figure 27:
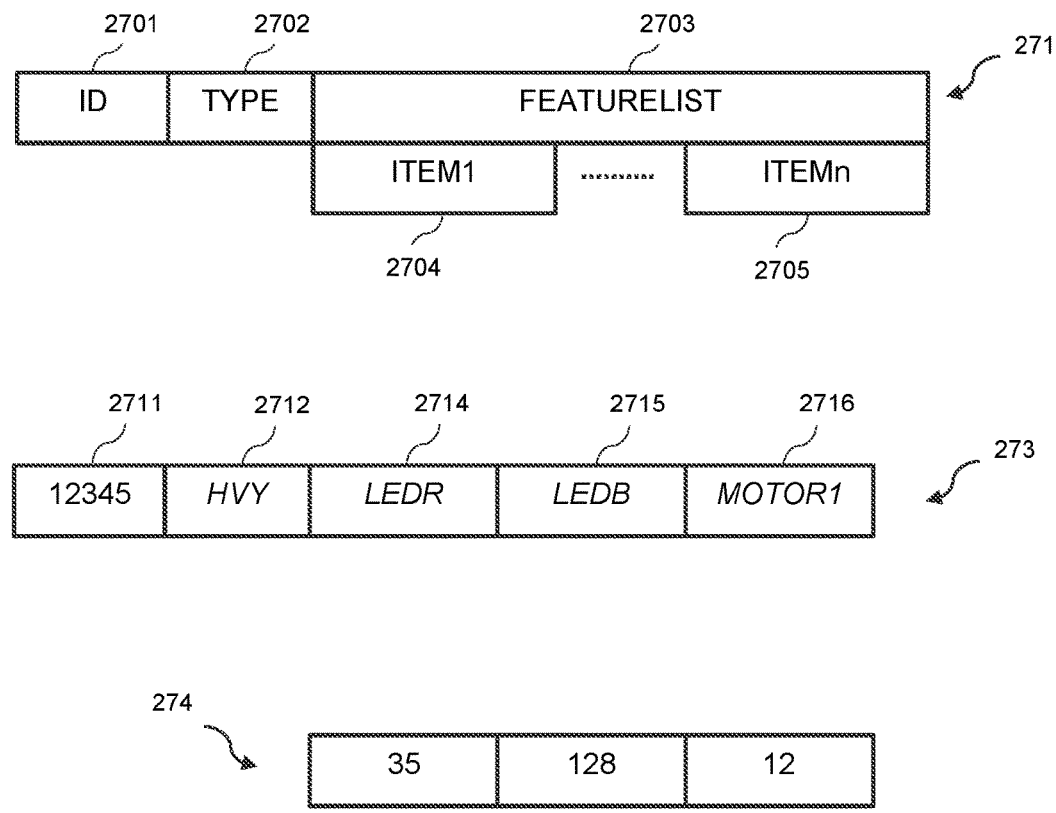
FIG. 27 is a schematic diagram showing an example data packet to implement data identifying a secondary module.

FIG. 27 shows a schematic illustration of a data packet format 271 and example data 273, 274 that may be communicated over the DATA connection of 260 or 262.

The data packet format 271 shown in FIG. 27 comprises an identifier (ID) 2701, a type string (TYPE) 2702 and a feature list (FEATURELIST) 2703. The feature list 2703 comprises a data structure having zero or more items; in FIG. 27 a first item (ITEM1) 2704 to an nth item (ITEMn) 2705 are shown, however the list need not have any items (in this case the list may be empty). Each of data 2701 to 2703 may be a fixed length (e.g. a fixed number of bits) or may be variable length data structure marked by start and stop bit sequences. The data packet format 271 may be used to communicate data identifying a primary or secondary module. The identifier 2701 may be a globally unique identifier for the secondary module. The type string 2702 may be used by the main processing module to determine a secondary module type so as to retrieve corresponding control routines to control said module. In certain cases the type string 2702 may be omitted, for example control information may be alternatively retrieved based on a look-up operation by main processing module using identifier 2701

Example data 273 that conforms to the data packet format 271. An identifier 2701 value of "12345" is set. The identifier may be a 16, 32 or 64-bit sequence, such as an integer. In other embodiments the identifier may comprise a 256, 512 or larger bit sequence representing an encrypted value or result of a cryptographic function. The type string 2702 is set as a string value of "HVY" 2712, e.g. indicating a "heavy" shield or weapon. The feature list of example data 273 comprises three items: a string value "LEDR" 2714 indicating that the secondary module comprises a red LED and that control values for this LED should be provided as a first data item; a string value "LEDB" 2715 indicating that the secondary module comprises a blue LED and that control values for this LED should be provided as a second data item; and a string value "MOTOR1" 2716 indicating that the secondary module comprises a motor and that control values for this motor should be provided as a third data item.

Example data 273 may be read by the main processing module 210 from a memory of an attached secondary module, or obtained in response to a request to a microcontroller housed within a locomotion module, the locomotion module having previously read said data from the memory. Similar data may be used to identify a removable primary module, such as interchangeable leg or main modules. The main processing module 210 transmits this data to a coupled computing device to set attributes of the gaming robot. If a computing device is not connected then the main processing module 210 may cache this data for later transmission. For example, a simulated mass of the gaming robot may be set based on the "HVY" type 2712 or based on a lookup using the identifier 2711 (e.g. the type may be implicit in the identifier).

Example data 274 may be sent to the secondary module from the main processing module 210 as a data packet to control the active electronic components set out in feature list 2703. Example data, in this case, comprises three 8-bit data values that are received serially by a microcontroller of the secondary module (the values being "35", "128" and "12"). The value "35" controls a level of the red LED identified by item 2714; the value "128" controls a level of the blue LED identified by item 2715; and value "12" controls a position or speed of the motor identified by item 2716.

When a new locomotion module with an attached secondary shield module is attached to a body module the following sequence may take place. First, the locomotion module may be detected by the main processing module based on a voltage on the SEN channel. Then the main processing module may obtain the identifier of the locomotion module. The main processing module may then set any control variables in the locomotion microcontroller, e.g. based on a current configuration stored on the main processing module. A current position of the attached locomotion module may be measured, e.g. via the POT channel, and used to set position data in the main processing module.

Concurrently, or following this sequence, the data identifying the secondary module may be obtained by the main processing module. A current configuration of the gaming robot, including the identifiers of all attached primary and secondary modules may then be transmitted to a connective device (when communicatively coupled). The connective device (when communicatively coupled to a data server) may verify the identifiers to check that the attached components are valid, and store the details of the parts in a robot profile for the current gaming robot in the robot database. Health and calibration data may also be sent from the main processing module to the data server to be stored in the robot profile. The gaming robot may then be activated (e.g. via a response from data server to the connective device) and be ready to be controlled via a gaming robot software application on the connective device, e.g. may be ready to take part in simulated battles. Activating the gaming robot may comprise downloading to the main processing module any movement programs that are enabled by the presence of the secondary modules (e.g. weapon firing or movement "animations"), data may be transferred from the connective device, wherein the connective device may in turn download the movement programs from the data server if they are not already stored as part of the control data for the gaming robot software application. In one implementation, a gaming robot may store up to 30 movement programs (although more programs may be stored depending on the size of the main processing module memory). Data exchange between the gaming robot and the gaming robot software application may occur in the background when the gaming robot is switched on and the application is loaded on the connective device. If any severe faults are detected by analysis of received health and calibration data (either by the connective device or data server), a user may be notified via the gaming robot software application (e.g. via a message on the user interface 180 and control of the gaming robot may be inhibited.

Figure 28A:
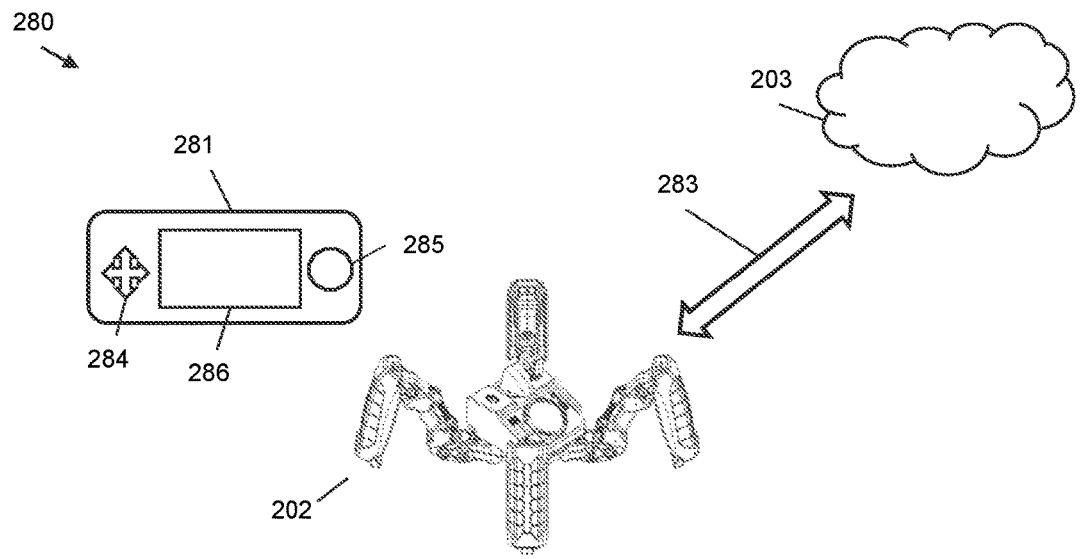
FIG. 28a shows an example gaming robot system.
Figure 28B:
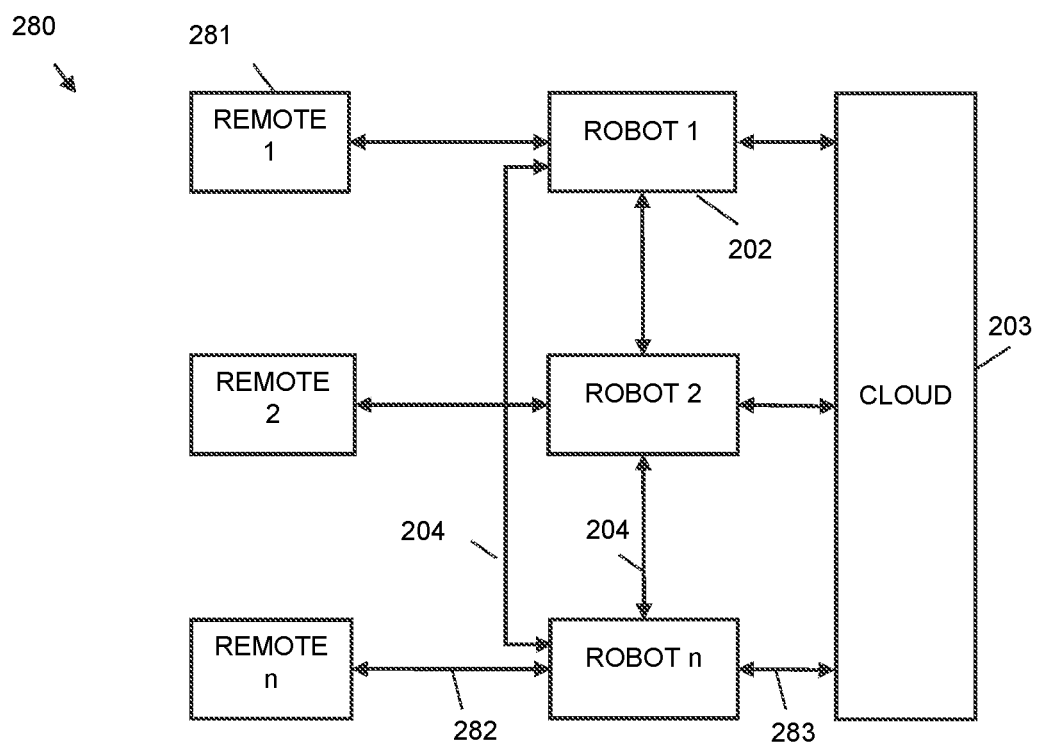

FIGS. 28A and 28B depicts a simpler version of a gaming robot 280. In this example, connective device 281 consists of a dedicated remote controller with only limited functionalities and therefore reduced cost. In this embodiment, connective device 281 comprises of an affordable non-tactile display 286 and features multiple control buttons 284 and one or more joysticks 285. Connective device 281 has minimal processing power and minimal connectivity to limit cost. The wireless communication system of connective device 281 may rely on potentially cheaper infrared technology (e.g. IR) to control robot 202 instead of more expensive radiofrequency technology (e.g. WiFi or Bluetooth). In this particular embodiment of a gaming robot 280, processing and wireless communication 283 with cloud 203 is handled by robot 202 directly. During multiplayer games, connective devices 281 may not be able to communicate with each other and instead interconnection between players/robots would be handled by robots 202.

The above features are to be understood as illustrative examples of the invention. Further embodiments and examples of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A gaming robot comprising:
a body comprising a control system to control locomotion of the gaming robot in response to commands received from a computing device; and
a plurality of legs to provide said locomotion, each leg comprising a plurality of prime movers to rotate portions of the leg about a respective plurality of axes,
wherein at least one leg comprises:
a removable-part mechanical coupling for connecting a removable part, and
a removable-part electrical interface for accessing data stored within electronic circuitry of the removable part, said data identifying the removable part;
wherein the control system comprises a processor configured to:
obtain the data from the removable part via the electrical interface;
transmit the data to the computing device;
receive high-level commands from the computing device; and
receive kinematic feedback from control circuitry within each leg,
wherein the control system comprises a kinematics engine to generate low-level commands in response to the high-level commands using the received kinematic feedback, and
wherein the control system receives high-level commands from the computing device that are different from high-level commands received when the removable part is not connected, the high-level commands being altered by the computing device based on the data obtained from the removable part, such that control of at least ones leg is modified based on connection of the removable part.

2. The gaming robot of claim 1,
wherein a first removable part is connectable to the removable-part mechanical coupling and commands received from the computing device control at least one of the legs to move at a first speed based on data identifying the first removable part transmitted by the control system, and
wherein a second removable part is connectable to the removable part mechanical coupling and commands received from the computing device control at least one of the legs to move at a second speed based on data identifying the second removable part transmitted by the control system.

3. The gaming robot of claim 1, wherein:
the removable-part electrical interface comprises a power supply interface and a data communication interface, the removable part comprises one or more active electronic components that are powered via the power supply interface; and the control system is configured to control said active electronic components.

4. The gaming robot of claim 1, wherein the removable part comprises one of a shield and a weapon.

5. The gaming robot of claim 1, wherein the control system comprises a memory and is configured to:
receive a movement program, the movement program comprising a sequence of prime mover actions and being associated with the removable part;
store said movement program in the memory; and
selectively load and implement the movement program in response to at least one command from the computing device if the removable part is connected.

6. The gaming robot of claim 1,
wherein the body comprises:
a set of leg mechanical couplings and leg electrical interfaces for connecting the plurality of legs to the body,
wherein each leg comprises:
a leg microcontroller comprising a memory to store data identifying the leg;
a body mechanical coupling for connecting the leg to one of the leg mechanical couplings of the body; and
a body electrical interface for electrically coupling the leg to one of the leg electrical interfaces of the body;
wherein the leg microcontroller is in electrical communication with the control system via the body electrical interface.

7. The gaming robot of claim 6, wherein the body electrical interface of each leg comprises at least one power line and at least one data line that are electrically coupled to a respective removable-part electrical interface of each leg, and wherein each leg electrical interface comprises a data line to indicate that a leg is connected.

8. The gaming robot of claim 6, wherein each leg microcontroller transmits data to the control system over the body electrical interface, the data comprising:
a unique identifier for the leg;
joint status data; and
removable part data including data identifying any connected removable parts,
wherein the control system is configured to transmit joint movement data to a given leg microcontroller, said joint movement data indicating a desired position and speed of a prime mover.

9. The gaming robot of claim 1, wherein the data identifying the removable part comprises at least one of:
a unique identifier;
an identifier indicating a type of removable part; and
an indication of active electronic features forming part of the removable part.

10. A gaming robot system comprising:
a gaming robot comprising:
a plurality of legs, each leg comprising a plurality of prime movers to rotate portions of the leg about a respective plurality of axes;
a body comprising a control system to control said plurality of legs;
at least one removable part comprising:
a mechanical coupling engaged, in use, with a mechanical coupling on one of the plurality of legs or the body;
an electrical interface electrically coupled, in use, with an electrical interface on one of the plurality of legs or the body; and
electronic circuitry to store a unique identifier identifying the removable part;
a connective device communicatively coupled to the gaming robot comprising:
a processor implementing a gaming robot software application, said gaming robot software application being configured to send high-level commands to the control system of the gaming robot to control said plurality of legs; and
a game controller to submit user commands to the gaming robot software application;
wherein the control system of the gaming robot comprises a processor configured to:
obtain the unique identifier from the removable part via the electrical interface, and
transmit the unique identifier to the gaming robot software application implemented on the connective device;
wherein the gaming robot software application is configured to:
update attributes of the gaming robot in a game environment within the gaming robot software application based on the unique identifier;
compute high-level movement commands based on the updated attributes and user commands received from the game controller; and
transmit the high-level movement commands to the control system of the gaming robot,
wherein the processor is further configured to compute low-level commands to control the prime movers of the plurality of legs based on the received high-level movement commands.

11. The gaming robot system of claim 10, wherein the connective device comprises:
a wireless interface for communicating with the control system of the gaming robot; and
a display screen to display a user interface of the gaming robot software application.

12. The gaming robot system of claim 11, wherein the connective device is configured to transmit a high-level command to the control system via the wireless interface, the high-level command indicating at least desired spatial position for the gaming robot, wherein the processor of the control system is configured to convert said high-level command to a low-level command indicating at least a desired joint position for at least one leg.

13. The gaming robot system of claim 12, wherein the gaming robot software application is configured to:
receive a user command from the game controller, the user command indicating at least a desired direction of movement for the gaming robot; and
compute the high-level command for the gaming robot using a kinematic function, the kinematic function taking as input attributes of the gaming robot retrieved using the data obtained from the removable part.

14. The gaming robot system of claim 10, wherein the gaming robot software application comprises:
a smart module system to collect a status of any removeable parts connected to the gaming robot based on data received from the control system of the gaming robot via the wireless interface; and
a battle system to receive data from the smart module system and compute an outcome of a simulated battle involving at least the gaming robot based on the data from the smart module system.

15. The gaming robot system of claim 10, comprising:
a data server communicatively coupled to the connective device via an active internet connection, the data server comprising a robot database to store data relating to the gaming robot,
wherein data server receives the data identifying the removable part from the connective device, verifies said data and stores said data in the robot database.

16. The gaming robot system of claim 15, wherein the control system is configured to transmit gaming robot status data to the connective device, and the connective device is configured to transmit said data to the data server for storage in a robot profile in the robot database and wherein the gaming robot status data comprises at least one of:
- distance travelled by the gaming robot;
- calibration data for the gaming robot;
- faults experienced by the gaming robot; and
- removable parts connected to gaming robot.

17. A method of controlling a gaming robot comprising:
- receiving, at a computing device from the gaming robot, data identifying a removable part of the gaming robot, the removable part being mechanically and electrically coupled to the gaming robot, the data being obtained from an electronic component of the removable part;
- updating, at the computing device, attributes of the gaming robot in a game environment implemented by the computing device based on the data received from the gaming robot;
- receiving, at the computing device, a user command entered using a game controller of the computing device;
- computing, at the computing device, commands for the gaming robot as a function of the attributes of the gaming robot and the user command;
- transmitting, from the computing device to the gaming robot, said commands, wherein said commands are useable to control movement of the gaming robot in response to the user command;
- receiving, at a processor of the gaming robot, the commands from the computing device;
- converting, by the processor, the commands into kinematic commands for one or more prime movers using a kinematics engine; and
- controlling, at the gaming robot, said one or more prime movers using the kinematic commands to effect a movement of the gaming robot in response to the user command, wherein the movement is dependent on the mechanical and electrical coupling of the removable part.

18. The method of claim 17, comprising:
- disconnecting the removable part from the robot device;
- receiving, at the computing device from the gaming robot, an indication of the absence of the removable part;
- updating, at the computing device, the attributes of the gaming robot based on said indication;
- wherein said updated attributes are used by the computing device to generate an altered set of comments to control movement of the gaming robot in response to the user command.

19. The method of claim 17, wherein the removable part comprises a first removable part and the method comprises:
- disconnecting the first removable part from the gaming robot;
- connecting a second removable part to the gaming robot;
- receiving, at the computing device from the gaming robot, data identifying the second removable part, the data being obtained from an electronic component of the second removable part;
- updating, at the computing device, the attributes of the gaming robot based on data identifying the second removable part;
- wherein said updated attributes are used by the computing device to generate an altered set of comments to control movement of the gaming robot in response to the user command.

20. The method of claim 17, wherein the data identifying the removable part comprises a unique identifier and the method comprises:
- cross referencing, at the computing device, the unique identifier against a database to verify a legitimacy of the removable part.

* * * * *